(12) United States Patent
Koren et al.

(10) Patent No.: US 8,120,991 B2
(45) Date of Patent: Feb. 21, 2012

(54) SYSTEM AND METHOD FOR FULL AZIMUTH ANGLE DOMAIN IMAGING IN REDUCED DIMENSIONAL COORDINATE SYSTEMS

(75) Inventors: Zvi Koren, Raanana (IL); Igor Ravve, Caesarea (IL)

(73) Assignee: Paradigm Geophysical (Luxembourg) S.A.R.L., Luxembourg (LU)

( * ) Notice: Subject to any disclaimer, the term of this patent is extended or adjusted under 35 U.S.C. 154(b) by 525 days.

(21) Appl. No.: 11/798,996

(22) Filed: May 18, 2007

(65) Prior Publication Data
US 2008/0109168 A1 May 8, 2008

Related U.S. Application Data

(60) Provisional application No. 60/856,303, filed on Nov. 3, 2006.

(51) Int. Cl.
*G01V 1/00* (2006.01)
*G06T 17/00* (2006.01)
(52) U.S. Cl. ............... 367/72; 367/68; 702/16; 345/428
(58) Field of Classification Search .................... 367/68, 367/72, 73; 702/16
See application file for complete search history.

(56) References Cited

U.S. PATENT DOCUMENTS

| | | | |
|---|---|---|---|
| 4,504,438 A | 3/1985 | Levy et al. | |
| 4,672,546 A | 6/1987 | Flinchbaugh | |
| 4,935,905 A * | 6/1990 | Gassaway | 367/59 |
| 6,075,752 A | 6/2000 | de Bazelaire | |
| RE38,229 E * | 8/2003 | Marfurt et al. | 702/16 |
| 6,820,032 B2 * | 11/2004 | Wenzel et al. | 702/167 |
| 6,947,042 B2 * | 9/2005 | Brand | 345/428 |
| 7,376,539 B2 * | 5/2008 | Lecomte | 702/16 |
| 2002/0146172 A1 * | 10/2002 | Nair et al. | 382/195 |
| 2005/0171700 A1 | 8/2005 | Dean | |
| 2006/0235666 A1 | 10/2006 | Assa et al. | |
| 2006/0282220 A1 * | 12/2006 | Young et al. | 702/14 |
| 2007/0234230 A1 * | 10/2007 | Pedersen | 715/783 |

OTHER PUBLICATIONS

A new and efficient NF-FF transformation with spherical spiral scanning. IEEE 2001.*
Brandsberg-Dahl et al., "Focusing on dip and AVA comensation on scattering angle/azimuth common image gathers", Geophysics 68 (1), pp. 232-254, 2003.*
Bleistein, N., "On the imaging of reflectors in the earth: Geophysics 52 (7)", pp. 931-942, 1987.
Biondi, B.L., "3D Seismic Imaging, Series: Investigation in Geophysics, published by Society of Exploration Geophysics", Tulsa., 2006.
Brandsberg-Dahl, S., M.V. De Hoop, and B. Ursin, "Focusing on dip and AVA compensation on scattering angle/azimuth common image gathers: Geophysics 68 (1)", pp. 232-254, 2003.

(Continued)

*Primary Examiner* — Jack Keith
*Assistant Examiner* — Krystine Breier
(74) *Attorney, Agent, or Firm* — Pearl Cohen Zedek Latzer, LLP

(57) ABSTRACT

Embodiments of the invention provide a system and method for converting coordinate systems for representing image data such as for example seismic data, including accepting a first set of seismic data, mapping the first set of seismic data to a second set of seismic data, where the dimensionality of the second set of seismic data is less than the dimensionality of the first set of seismic data, and generating image data by processing the second set of seismic data.

47 Claims, 16 Drawing Sheets

OTHER PUBLICATIONS

Chen, L., R.S. Wu, and Y. Chen, "Target-oriented beamlet migration based on Gaber-Daubechies frame decomposition: Geophysics 71 (2)", pp. 37-52, 2006.

Han, Q., and R.S. Wu, "Common image gathers in the plane-wave domain: A prestack Gaussian beam migration algorithm: Expanded Abstracts", SEG International Exposition and $75^{th}$ Annual Meeting, Houston, TX., 2005.

Hill, N. R., 2001,"Prestack Gaussian-beam depth migration: Geophysics 66 (4)", pp. 1240-1250, Jul.-Aug. 2001.

Koren, Z., S. Xu, and D. Kosloff, "Target-oriented Common Reflection Angle Migration: Expanded Abstracts", SEG International Exposition and $72^{nd}$ Annual Meeting, Salt Lake City, Utah, 2002.

Prucha, M.L., B.L. Biondi, and W.W. Symes, "Angle domain common image gathers by wave-equation migration: Expanded Abstracts", SEG International Exposition and $69^{th}$ Annual Meeting, 1999.

Sava, P.C., and S. Fomel, "Angle-domain common-image gathers by wave-field extrapolation method: Geophysics 68 (3)", pp. 1065-1074, 2003.

Soubaras, R, "Angle gathers for shot-record migration by local harmonic decomposition: Expanded Abstracts", SEG International Exposition and $73^{rd}$ Annual Meeting, 2003.

Solid A., and B. Ursin, "Scattering-angle migration of ocean-bottom seismic data in weakly anisotropic area: Geophysics 68 (2)", pp. 641-655, 2003.

Xu, S., H. Chauris, G. Lambaré, and M. Noble, "Common-angle migration: A strategy for imaging complex media: Geophysics 66 (6)", pp. 1877-1894, 2001.

Ursin, B., "Parameter inversion and angle migration in anisotropic elastic media: Geophysics 69 (5)", pp. 1125-1142, 2004.

Weisstein, E.W., 2003, Archimedes' Spiral, From *MathWorld*, A Wolfram Web Resource, http://mathworld.wolfram.com/ArchimedesSpiral.html.

Wu, R.S., and L. Chen, "Prestack depth migration in angle-domain using beamlet decomposition: Local image matrix and local AVA, Expanded Abstracts", SEG International Exposition and $73^{rd}$ Annual Meeting, 2003.

Wu, R.S., and L. Chen, "Directional illumination analysis using beamlet decomposition and propagation: Geophysics 71 (4)", pp. S147-S159, 2006.

Yilmaz, O., "Seismic Data Processing", published by Society of Exploration Geophysics, Tulsa, 1994.

Zhang, Y., J. Sun, C. Notfors, S.H. Gray, L. Chernis, and J. Young, "Delayed-shot 3D depth migration: Geophysics 70 (5)", pp. E21-E28, 2005.

International Search Report of Application No. PCT/IL07/01335 issued on Oct. 14, 2008.

Brandsbery-Dahol et al., "Focusing in dip and AVA compensation on scattering-angle/azimuth common image gathers", Geophysics, vol. 68, No. 1, Jan.-Feb. 2003.

Leng et al., "Visualization of Spherical Geometric Product by Large Scale Simulation on the Cray T3E at Manchester, UK", Aug. 1, 2001.

U.S. Appl. No. 12/663,326, filed Dec. 7, 2009, Koren, Zvi et al.

* cited by examiner

SYSTEM AND METHOD FOR FULL AZIMUTH ANGLE DOMAIN IMAGING IN REDUCED DIMENSIONAL COORDINATE SYSTEMS

PRIOR APPLICATION DATA

The present application claims benefit of prior provisional application Ser. No. 60/856,303, filed on Nov. 3, 2006, entitled "Uniform Spherical Spiral Imaging", incorporated by reference herein in its entirety.

FIELD OF THE INVENTION

The present invention relates to the representation and processing of image data, such as three-dimensional seismic data.

BACKGROUND OF THE INVENTION

A transmitter located on the earth's surface or elsewhere may transmit signals, such as acoustic waves, compression waves or other energy rays or waves, that may travel through subsurface structures. The transmitted signals may become incident signals that are incident to subsurface structures. The incident signals may reflect at various transition zones or geological discontinuities throughout the subsurface structures. The reflected signals may include seismic events. Seismic events including, for example, primary (P) waves and shear (S) waves (e.g., transverse waves in which particle motion may be perpendicular to the direction of propagation of the wave) may be used to image subsurface geological structures, for example, transition surfaces or geological discontinuities. A receiver may collect and record data, for example, reflected seismic events.

Surveys may use large numbers of transmitters and receivers to record signals across large geophysical regions. Seismic surveyed regions may, for example, extend to several hundred square kilometers. In some surveys, the distance between transmitters and receivers may be, for example, about twenty meters, transmitted signals may travel up to about ten kilometers, and frequencies of transmitted signals may be about fifty Hertz. Other values or parameters may be used. Recorded data may be collected over intervals of time, for example, ten second intervals, and may be digitized every 4 milliseconds, although other parameters are also possible. For example, the receiver may collect and/or record several tens or hundreds of terabytes of data. Once collected, the recorded data may be stored and/or transmitted to a storage or data processing device such as a memory, server or computing system.

Some seismic acquisition methods, such as multi-azimuth or wide-azimuth data acquisition methods, may significantly increase the number of transmitted and received signals used in order to enhance the illumination of reservoirs below complex structures and increase the precision of geophysical detection. For such methods, single parameters (e.g., pressure or vertical displacement) or multiple parameters (e.g., pressure and three displacement components) may be recorded. Both P waves and S waves may be recorded. Other types of waves and other data may be recorded. Such methods may increase the amount of data recorded for imaging subsurface regions. To accommodate the increased amount of data, systems that record, process, image, or otherwise use the data may require increased storage size, increased speed for access to input and/or output devices, and/or high performance computation (HPC) hardware or the like. Such systems may provide computationally and/or power intensive services.

Exploration of geophysical regions may include imaging seismic data recorded from surveying regions in the subsurface of the earth in order to locate for example hydrocarbon reservoirs. Seismic imaging methods, which may be referred to as seismic migrations, may be classified for example into two main categories: wave equation migrations and ray-based Kirchhoff migrations. Both types of migrations may be used to generate images of the subsurface of the earth. Wave equation migration mechanisms may use numerical solutions to the wave equation to extrapolate the recorded wavefields into the subsurface of the earth. At each level of depth, imaging conditions may be applied to the incident and reflected wavefields. Ray-based Kirchhoff migrations may be performed in two stages: ray tracing and imaging. Ray tracing may model the propagation of waves (e.g., rays), for example, in a direction from a surface towards an image point in a subsurface region, and/or in a direction from an image point in a subsurface region towards a surface. Ray attributes, such as traveltimes, ray trajectories, slowness vectors, amplitude and phase factors, may be computed along the traced rays. In the imaging stage, the ray attributes may be used to obtain an image of the earth's subsurface from the recorded seismic data.

Both wave equation and ray-based Kirchhoff migrations may generate common image gathers (CIG). CIGs may include multiple image traces at a given lateral location. Each image trace may be generated using a portion of the recorded data that has a common geometrical attribute. For example, an offset domain common image gather (ODCIG) may include multiple image traces, where each trace may be constructed using seismic data points with the same offset or distance between a source and receiver on the earth's surface. An angle domain common image gather (ADCIG) may include multiple image traces, where each trace may be constructed using seismic data points with the same opening angle between the incident and reflected rays at the reflection point.

CIGs generated using traces that share a single azimuth (e.g., offset, opening angle, etc.) may image geophysical structures with insufficient accuracy. For example, anisotropy effects show that images obtained from different azimuth angles may be significantly different. Imaging geophysical structures, such as faults, small vertical displacements, and sub-seismic scale fractures (e.g., fractures measuring less than tens of meters, which may be below the resolution for detection of typical receivers or other detection instruments), with desired accuracy, may require imaging along substantially each azimuth angle (which may be referred to for example as full-azimuth imaging). Wide-azimuth seismic data may be especially valuable for imaging, for example, below salt dome or salt laden structures, such as those in the Gulf of Mexico. Imaging geophysical structures using, for example, three-dimensional (multi-azimuth) CIGs, instead of commonly used two-dimensional (e.g., single or narrow azimuth) CIGs, may improve image accuracy and provide additional information about the structures. For example, 3D ODCIGs may include multiple image traces that have substantially different azimuth angles on the earth's surface, in addition to substantially different source-receiver offsets. The offset may be a two-dimensional vector, for example, having values for a length and an azimuth. Similarly, 3D ADCIGs may include multiple image traces that have substantially different opening azimuth angles at the reflecting surface, in addition to substantially different opening angles. Although three-dimensional CIGs may increase imaging accuracy, they may also increase the computational complexity of imaging, visualization, and/or interpretation systems using such gathers. Operation of three-dimensional CIGs may also require extensive memory and storage capacity.

CIGs may be used, for example, in the kinematic and dynamic analysis of subsurface structures. For example, kinematic analysis may be used to build and update geophysical models using tomography mechanisms. Tomography mechanisms may be used to find a set of model parameters that substantially minimize travel time errors along specular rays (e.g., ray-pairs that obey principles of Snell's law at the reflecting surfaces). The travel time errors may for example be measured from the differences between locations of the reflection events along the CIGs. Substantially each reflection event within a given CIG may be related to a specific depth. If a "true" reflector (e.g., a reflection surface element) is located at a definite depth and the model parameters are "correct", then the reflector elements are typically at the same depth irrespectively of the reflection angle or the offset indicated by the specific trace. When reflection events are not located at substantially the same depth (e.g., when reflection events along the CIGs are not substantially flat), the measured or picked differences between the reflection depths of different reflection events may be used to estimate the travel time errors along the specular rays associated with each trace. A model may be substantially correct when the seismic reflection events along the CIGs are substantially horizontally flat. In order to obtain an accurate model, for example, using an anisotropy model representation, specular rays and the corresponding travel time errors from varying opening angles (or e.g., offsets) for example, from substantially all azimuths may be used. In some embodiments, such 3D CIGs may provide information about the azimuthal dependent travel time errors.

Dynamic analysis may include determining physical and/or material parameters or properties of target subsurface structures using changes in the amplitude and phase of reflected signals measured, for example, along the CIGs. Multi-azimuth CIGs may make it possible to perform azimuthal analysis of amplitude variations with respect to angle (or e.g., offset), which may result in an accurate reconstruction of anisotropy parameters and small scale fractures.

Imaging other than seismic or subsurface imaging for the exploration and production of oil and gas, such as for example, shallow seismic imaging for environmental studies, archeology and construction engineering, may be performed. These other methods may similarly generate large amounts of data and have large computational needs. Other types of imaging, such as medical imaging, may also use a relatively large number of transmitters and detectors and therefore may also use a relatively large amount of data, which may require large storage and intensive computational efforts.

A need exists for more efficient use, storage, processing, imaging, data analysis, visualization and interpretation of data.

SUMMARY

Embodiments of the invention provide a system and method for converting coordinate systems (e.g., angle domain coordinate systems) for representing image data such as for example seismic data, including accepting a first set of seismic data, mapping the first set of seismic data to a second set of seismic data using for example spherical spiral geometry or the like, where the dimensionality of the second set of seismic data may be less than the dimensionality of the first set of seismic data, and generating image data by processing the second set of seismic data.

BRIEF DESCRIPTION OF THE DRAWINGS

The principles and operation of the system, apparatus, and method according to embodiments of the present invention may be better understood with reference to the drawings and the following description, it being understood that these drawings are given for illustrative purposes only and are not meant to be limiting.

Figure 1:
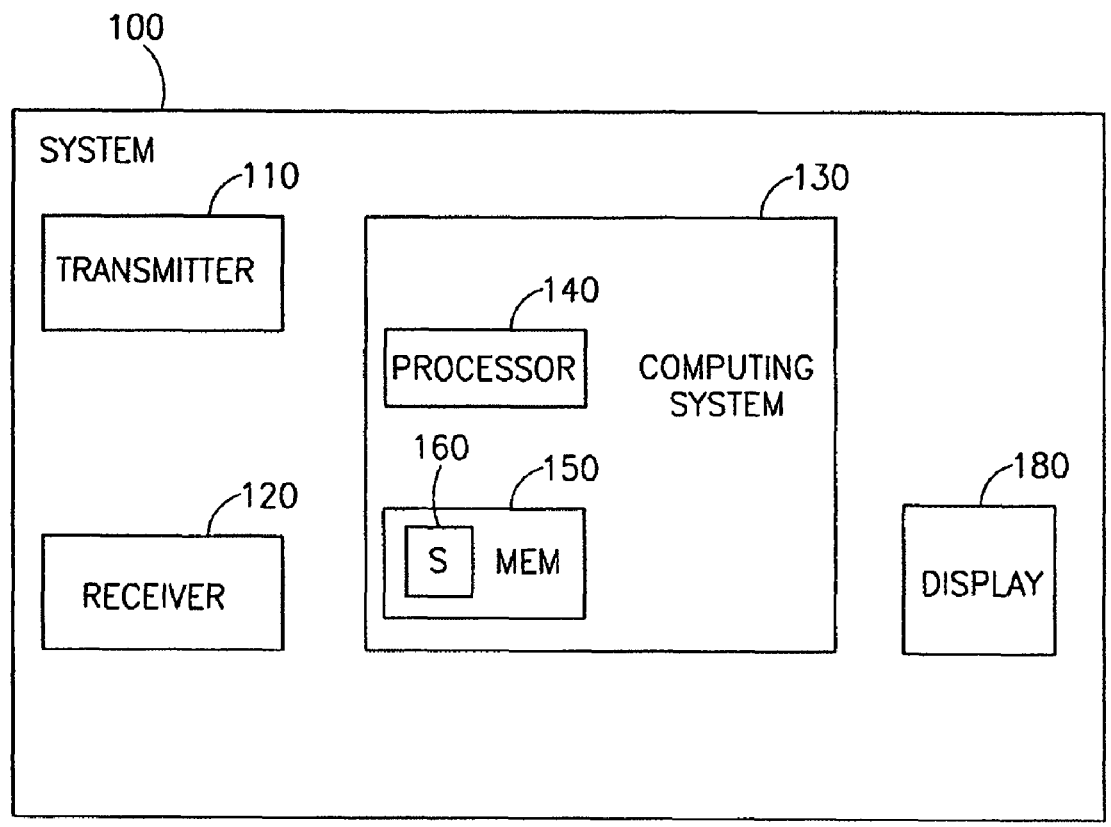
FIG. 1 is a schematic illustration of a system, including a transmitter, a receiver and a computing system in accordance with an embodiment of the present invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

Introduction

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention. Unless specifically stated otherwise, as apparent from the following discussions, it is appreciated that throughout the specification discussions, utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other, such as information storage, transmission or display devices. The term "display" may be used herein to describe a visual representation and/or a device for depicting such a representation. In addition, the term "plurality" may be used throughout the specification to describe two or more components, devices, elements, parameters and the like.

Seismic data may include or represent seismic events (or e.g., signals) that reflect and/or diffract at discontinuous objects and/or continuous horizons. Continuous horizons may include, for example, interfaces between layers. Discontinuous objects may include, for example, small scale diffractors, faults, or small scale fractures.

Some embodiments of the present invention describe a system and method for enhancing or increasing the efficiency and accuracy of angle dependent seismic processing, imaging and analysis systems, for example, those commonly used in the exploration and production of oil and gas. Embodiments of the invention may include improved or optimal representations of multiple angle systems, for example, systems that process, image or otherwise use multiple angled data. Multiple angle systems, such as reflection imaging systems, may use, for example, rays (alternately referred to as "waves"), such as pairs of rays, to generate or simulate angle dependent images of the interior earth. The seismic data may be acquired, for example, along the earth's surface where a ray pair may include an incident ray and reflected ray. Each ray may itself be represented by multiple variables. For example, at image points, the directions of the incident ray or the direction of the reflected and/or diffracted ray of a ray pair may each be represented by two angles (e.g., polar angles), and thus, the ray pair may be represented by four angles. In other embodiments, a ray pair may be represented by four other angles which may define two separate dual-angle systems, for example, one system for the direction of the ray pair normal (e.g., represented by a dip and an azimuth angle) and the other system for the reflection angles of the ray pair (e.g., represented by an opening angle and an opening azimuth angle).

Imaging systems may contain multi-dimensional data sets (e.g., represented in polar or Cartesian coordinate systems) which can be divided into several two-dimensional subsets. Each two-dimensional subset may be represented by a polar coordinate system. Embodiments of the invention provide a system and method for converting a two-dimensional set into a one-dimensional set, e.g., represented in an alternate, transformed, and reduced dimensional coordinate system such as a Uniform Spherical Spiral coordinate system, various embodiments of which are described herein. Such representations reduce the dimensionality of each coordinate system subset. Due to the fact that in embodiments of the proposed reduced dimensional coordinate system, for example, a uniform spherical spiral, both components of the polar angles (zenith and azimuth) simultaneously change in a continuous fashion, the amount of data required for obtaining optimal image may be substantially reduced. The potential for reducing the amount of data points may be explained in the following way: a uniform spherical spiral discretization having substantially equal area segments leads to approximately equal arc lengths between successive spiral nodes and thus approximately the same aspect ratio along the whole unit sphere. Aspect ratios may be important geometrical parameters that may define the shape of the area segments, which may be calculated as a ratio of the distance between successive nodes and the distance between successive coils measured along meridian lines. For imaging purposes, in one embodiment, both the aspect ratio and the area of the discretized segments along the unit sphere are supposed to be approximately constant. In particular, the uniform area of segments may simplify computing of full azimuth illumination. Keeping both the aspect ratio and the segment area constant may reduce the amount of sample points required for substantially accurate imaging. Conventional two-dimensional angle grids do not typically provide these conditions, and may lead to an over-concentration of sample points, for example, near the poles of the spiral. The uniform spherical spiral transformation may result in more reliable and accurate data, which may be used to obtain better image quality with less computational efforts and fewer memory requirements. A uniform spherical spiral data representation may furthermore provide more reliable and accurate data than conventional coordinate systems, for example, by substantially minimizing or eliminating an increase in the density of grid points or nodes in the proximity of poles, for example, used in conventional coordinate systems or grids. The uniform spherical spiral data coordinate systems may have a uniform density of grid points or nodes throughout the unit sphere coordinate space, for example, including regions in the proximity of poles. Furthermore, the uniform spherical spiral data representation may provide intuitively clearer image displays than are conventionally used. According to some embodiments of the invention, in this type of display the zenith angle may be, for example, monotonously increased and the azimuth angle may be, for example periodic.

Embodiments of the invention include the use of the transformation for reducing dimensionality and number of data points, for example, the use of the uniform spherical spiral transformation, for the generation, analysis, display and interpretation of seismic images.

It may be appreciated by those skilled in the art that embodiments of the present invention may be applied to any dual-angle system involved in seismic processing and imaging. Embodiments of the present invention may be used for imaging in various areas or fields, such as, for example, exploration and production of oil and gas, imaging of the shallow earth model for environmental study (e.g., using data collected using seismic and/or ground penetration radar (GPR) methods), construction engineering (e.g., to identify locations of pipes), construction safety and security (e.g., to identify holes and channels), medical imaging (e.g., using CT, MRI, and ultra-sound devices), non-destructive material inspection, inspection of internal items for security reasons (e.g., homeland security), marine sonar, antenna and radar systems.

Wide-Azimuth Data Acquisition and Full Azimuth Angle Domain Imaging

Embodiments of the invention provide a system and method for full azimuth angle dependent seismic imaging using, for example, seismic data recorded through wide azimuth data acquisition. Imaging systems, which use seismic data collected from wide azimuth acquisition surveys, may improve reservoir imaging and provide a detailed definition of structural features, such as faults, small vertical displacements or other geological discontinuities. In addition, angle-dependent azimuthal anisotropy may be detected, providing valuable information about the material properties and orientation and spatial characteristics of heterogeneously distributed geological discontinuities, such as sub-seismic fractures. Wide azimuth data acquisition of land and marine geophysical surveys may record a single component (e.g., pressure) or multiple components (e.g., pressure and three components of the particle displacement). Wide-azimuth acquisition may use a relatively large number of sources, compared with narrow azimuth data acquisition. Throughout seismic acquisition surveys, the acquired seismic signals may include waves propagating through the subsurface, reflecting or diffracting at target reflectors or diffractors for example, due to geological discontinuities. The reflecting or diffracting waves may be recorded by a system of receivers and stored in a storage area in a computing system.

A wide-azimuth dataset may be used to improve key imaging and analysis stages throughout the seismic method workflow. For example, a wide-azimuth dataset may be used for regional imaging to better image and locate subsurface reservoirs. A wide-azimuth dataset may also be used for enhancing reservoir characteristics using target oriented high resolution angle dependent imaging and analysis tools. In the vicinity of existing wells, the imaging resolution may be enhanced, reducing dominant wavelengths of geological parameters, for example, by correlating the seismic waves with the sonic waves measured along the wells. Such methods may substantially improve high pore pressure prediction (e.g., using high resolution local velocity inversions), and provide information about geo-mechanical rock properties.

Embodiments of the invention provide a system and method for imaging using seismic data acquired through wide-azimuth data acquisition. Mechanisms or terms used herein may be referred to, for example, as a uniform spherical spiral, spiral, spiral line, Spiral-I, Spiral-R, Spiral-D, Wide-Eye or the like. Embodiments of the invention may include generating distinct full-azimuth, angle-dependent image gathers for each of different types of data (e.g., directional data and reflection angle data of ray pairs). Data represented by the image gathers may be displayed and may provide additional, accurate and/or detailed depiction of the geophysical structure being imaged.

Embodiments of the invention may provide a system and method for imaging in reduced dimensional coordinate systems, for example, a uniform spherical spiral coordinate system. Imaging in reduced dimensional coordinate systems may, for example, provide an alternate representation of image data, using relatively lower dimensional and/or less data than when imaging in dual-angle coordinates systems, for example, to represent seismic waves, traveling to, and reflecting from, target horizons.

Embodiments of the invention provide a system and method for mapping recorded surface-based seismic data, gathered in space and time, (e.g., using wide azimuth dataset), to subsurface, angle-dependent reflectivity, at image or target points. Embodiments of the invention may generate single parameter, full-azimuth, angle domain common image gathers (ADCIG) to image the target subsurface regions. Embodiment of the invention may provide unique displays of the single-parameter, full-azimuth, ADCIGs. Such displays, with for example monotonously increasing zenith angle and periodic azimuth, may be used, for example, for generating (e.g., creating and updating) anisotropic velocity models, detecting geophysical discontinuities, such as horizons, faults, and small-scale fractures, imaging reservoirs with relatively high-resolution, and determining and/or predicting pore pressures and/or geo-mechanical rock properties of geophysical structures.

Reduced Dimensional Coordinate Systems

Embodiments of the present invention describe a system and method for converting data from a first coordinate system to a second coordinate system, where the dimension of the first coordinate system may be greater than the dimension of the second coordinate system, and where there may be a transformation from the first to the second coordinate system with a one-to-one correspondence. In some embodiments, the conversion may include, for example, mapping the data from the first coordinate system to the second coordinate system using a map (e.g., a transformation) that may be a continuous and/or a one-to-one function. The second coordinate system may, for example, be defined or represented by data points or nodes along a spiraling geometry, such as a uniform or non-uniform, spherical, ellipsoidal, elliptical, or otherwise shaped, spiral. In some embodiments, the conversion may include, for example, mapping the data to a second set of data, where for example the second set of data may be represented by data points or nodes along a spiraling geometry.

Embodiments of the present invention may include a system and method for converting data from the first coordinate system to the second coordinate system by implementing a parametric representation of a dual-angle coordinate system, for example, including zenith and azimuth angles, to different imaging systems. The zenith and the azimuth may define a polar angle vector for each variable in a multi-variable system. In one embodiment, the parameterization may reduce a two-dimensional representation of data to a single dimensional representation, thereby reducing the quantity of information required to represent imaging data such as geophysical data, and possibly reducing processing required. Some embodiments of the invention describe conversions, mappings, parameterizations, representations, and the like, using a coordinate system which may be referred to as a "uniform spherical spiral" coordinate system, which may be used, for example, to reduce the dimensionality of data points from a two-dimensional data representation to a one-dimensional data representation. However, it will be appreciated by those skilled in the art that conversions, mappings, parameterizations and the like, according to embodiments of the present invention, may describe reducing the dimensionality of the data points from a data representation of any dimension to a data representation of any relatively lower dimension. Some embodiments of the invention describe using a set of data. It will be appreciated by those skilled in the art that a set of data may include one or more data points.

Embodiments of the invention may provide a system and method for converting coordinate systems for representing image data such as seismic data, including accepting a first set of seismic data, mapping or converting the first set of seismic data to a second set of seismic data, where the dimensionality of the second set of seismic data may be less than the dimensionality of the first set of seismic data, and generating image data by processing the second set of seismic data. Embodiments of the invention may provide a system and method for converting coordinate systems that represent seismic data, including converting the set of seismic data from the first coordinate system to the second coordinate system. In some embodiments, the dimension of the first coordinate system may be greater than the dimension of the second coordinate system. In some embodiments, there may be a transform from the first coordinate system to the second with a one-to-one correspondence. In some embodiments, mapping or converting may include converting coordinate systems from the first coordinate system to the second coordinate system, the second coordinate system having a lower dimension than that of the first coordinate system. In some embodiments, mapping or converting may include reducing the dimensionality of a set of image data such as seismic data or reducing the dimensionality of a coordinate system used to represent image data, for example, by an integer value that may be at least one. In some embodiments, a volume of a set of seismic data may be greater than a volume of a corresponding converted set of seismic data, for example, by a factor of about ten; other factors may be used. In some embodiments, an integral computed in one variable over a length of the spiral line in the converted coordinate system may be equivalent to an integral computed in two variables over a corresponding surface or area in the non-converted coordinate system.

In some embodiments, mapping may include applying a map or a function to a set of data or a coordinate system. In some embodiments, the map may define a parameterization of two or more variables of the coordinate system. In some embodiments, the map may convert a data set in an n-dimensional space to a data set in an m-dimensional space, where n may be greater than m. In some embodiments, the map or function may be continuous and/or one-to-one. In some embodiments, converted seismic data may be represented by data points along a spiraling geometry or by nodes along an arc length of a spiraling geometry. In some embodiments, the spiraling geometry may conform to the shape of a continuous three-dimensional surface, such as a sphere, spheroid, ellipsoid, hyperboloid, or the like. In some embodiments, the spiraling geometry may include or may conform to the shape of a uniform spherical spiral. In some embodiments, the dimensionality of converted data may be less than that of data that is not converted.

In some embodiments, the non-converted seismic data may include several data points, which may each be represented by a ray pair. In some embodiments, each of the data points may include, for example, reflection angles and/or directional angles.

In some embodiments, data points may include angle dependent reflected and/or diffracted seismic waves which may be measured or simulated directly at image points (e.g., using local surface elements) and represented by ray pairs (e.g., including incident and reflected and/or diffracted rays). Each data point may for example be represented by four angles, two representing the direction (e.g., including a zenith and azimuth) of the incident ray and two angles (e.g., including a zenith and azimuth) represent the direction of the reflected or diffracted ray. Alternatively, four other angles may be used, for example, including two angles (e.g., including a zenith and azimuth) that define the direction of the ray pair normal and two angles that define the opening angle between the rays and the opening azimuth of the ray pair. Embodiments of the invention may include the transformation of the four dimensional angle domain imaging coordinate system into two dimensional angle domain coordinate system, where each dual angle system may be transformed (or e.g., mapped) into a single domain system, using for example, a uniform spherical spiral transformation.

In some embodiments, data points may include seismic data, medical imaging data, acoustic data, ultrasonic data, ground penetration radar data, electromagnetic waves, or other suitable data. In some embodiments, a display may be used to visualize data, for example, including seismic data and/or medical imaged data, generated using converted data points.

A parametric representation may be referred to as a "uniform spherical spiral", since in some embodiments a parameterized polar vector angle may be defined by a value along a spherical spiral. In some embodiments, there may be a linear relationship between the two parameterized components of the polar angle vector, for example, the zenith and azimuth angles. Thus, both components of the polar angle vector may vary simultaneously along the spherical spiral. In some embodiments, the parameterization may be defined by a continuous map from a polar coordinate system to a uniform spherical spiral coordinate system. Thus, both components of the polar angle vector may vary continuously along the spherical spiral.

Although embodiments of the invention describe using a coordinate system with a uniform spherical spiral shape for converting data from a conventional coordinate system to the uniform spherical spiral coordinate system, any shape may be used which provides a relationship between two or more variables in the conventional coordinate system, reduces the dimensionality of data points, or has representations of two or more variables of the conventional coordinate system that simultaneously change along a spiral or a spiral-like line. Such shapes may include, for example, a spheroid, an ellipsoid, a torus, a hyperboloid, a paraboloid, an elliptic paraboloid, a hyperbolic paraboloid, and/or a hyperbolic cylinder which may be real or imaginary, symmetric or asymmetric, and regular or irregular, or a planar spiral.

In one embodiment, the uniform spherical spiral coordinate system may include nodes along which data points may be defined. In some embodiments, nodes may be locations or coordinates in a coordinate system, for example, along the spherical spiral line. Each node may be defined by a value for a zenith angle, arc length, area swept by the spiral coils, or other suitable parameter. The area swept by the spherical spiral coils may be, for example, an area of a curved parallelogram on a spherical surface centred and symmetric about the line of the spiral coil (e.g., with a standard width that may correspond to the distance between the coils along the meridian line, and a length that may be substantially the arc length of the spiral coil between the successive nodes). In one embodiment, the nodes may be placed along an arc length of the spherical spiral line according to any of multiple configurations. In one embodiment, the nodes may be positioned along the arc length in such a way that there may be approximately an equal area swept between successive nodes (e.g., described in reference to FIG. 5), or alternatively, an equal arc length between successive nodes, or any other suitable arrangement. Some embodiments of the invention may provide a shape of the uniform spherical spiral so that the zenith and azimuth angles of the polar angle vectors may vary simultaneously along the spherical spiral.

It may be appreciated by those skilled in the art that the uniform spherical spiral representation and the discretization thereof may be used as an example in order to simplify explanatory and demonstrative calculations. However, embodiments of the present invention may not be limited to such parameterizations and may include any alternate parameterization, coordinate system, configurations of nodes, etc. For example, an alternate coordinate system may be defined by nodes along a spheroid, an ellipsoid, an elliptical spiral, a torus spiral, or any other suitable shape.

General Workflow of Seismic Data Acquisition, Processing, Imaging and Analysis

In this section the role and place of a uniform spherical spiral transform within a general workflow for data acquisition, processing, imaging and analysis is described, according to some embodiments of the invention.

Reference is made to FIG. 1, which is a schematic illustration of a system, including a transmitter, a receiver and a computing system in accordance with an embodiment of the present invention. System 100 may be used, for example, to convert coordinate systems for representing image data such as for example seismic data. For example, system 100 may accept a first set of seismic data, map the first set of seismic data to a second set of seismic data, where the dimensionality of the second set of seismic data may be less than the dimensionality of the first set of seismic data, and may generate image data by processing the second set of seismic data. System 100 may generate image data corresponding to each of the points along the spiraling geometry, including, for example, a uniform spherical spiral. System 100 may perform embodiments of any of the methods discussed herein, and/or other operations or computations.

System 100 may include a transmitter 110, a receiver 120, a computing system 130, and a display 180. Transmitter 110 may output any suitable signals, or generate incident signal(s). For example, a series of sonic or seismic energy rays or waves may be emitted from each of multiple locations. Receiver 120 may accept reflected signal(s) that correspond or relate to incident signals, sent by transmitter 110. In the case of imaging in other areas, e.g., medical imaging, transmitter 110 may output energy such as ultrasound, magnetic, x-ray, or other suitable energy.

Computing system 130 may include, for example, processor 140, memory 150 and software 160. Processor 140 may process data, for example, raw data received from receiver 120. Memory 150 may store data, for example, raw or processed seismic data. Operations executed according to embodiments of the invention, such as for example, mapping, converting, reducing dimensionality of data, etc. may be at least partially executed, operated or calculated, for example, by a transformation operator (e.g., implemented in software 160). Other units or processors may perform such operations, or other operations according to embodiments of the present invention.

Display 180 may display data from transmitter 110, receiver 120, computing system 130, or any other suitable systems, devices, or programs, for example, an imaging program or software, or a transmitter or receiver tracking device. Display 180 may include one or more inputs for displaying data from multiple data sources. The system may include multiple displays. Display 180 may display images produced from data. For example, display 180 may display representations or visualizations of seismic or other imaging data, for example, angle dependent CIGs, processes according to embodiments described herein.

Computing system 130 may include, for example, any suitable processing system, computing system, computing device, processing device, computer, processor, and the like, and may be implemented using any suitable combination of hardware and/or software.

Processor 140 may include, for example, one or more processors, controllers or central processing units ("CPUs"). Software 160 may be stored, for example, all or in part, in memory 150. Software 160 may include any suitable software, for example, for processing or imaging according to embodiments of the present invention. Processor 140 may operate at least partially based on instructions in software 160.

System 100 may, for example, image target surfaces, for example, using software 160 and/or processor 140, or other components such as dedicated image or signal processors. A local imaging coordinate system may be used to represent a system of local plane waves, incident on a target surface and reflected thereof.

Polar Angle Coordinate System

Seismic surveys may use a substantially large set of sources and a large set of receivers, located, for example, along the earth's surface. A seismic wavefield, associated with the sources or with the receivers, may be decomposed into a set of plane waves. Each plane wave may be characterized by a definite spatial direction. The direction in 3D space may be represented, for example, by a polar angle. A polar angle may be defined for example by two angle components, such as, a zenith and azimuth.

Figure 2:
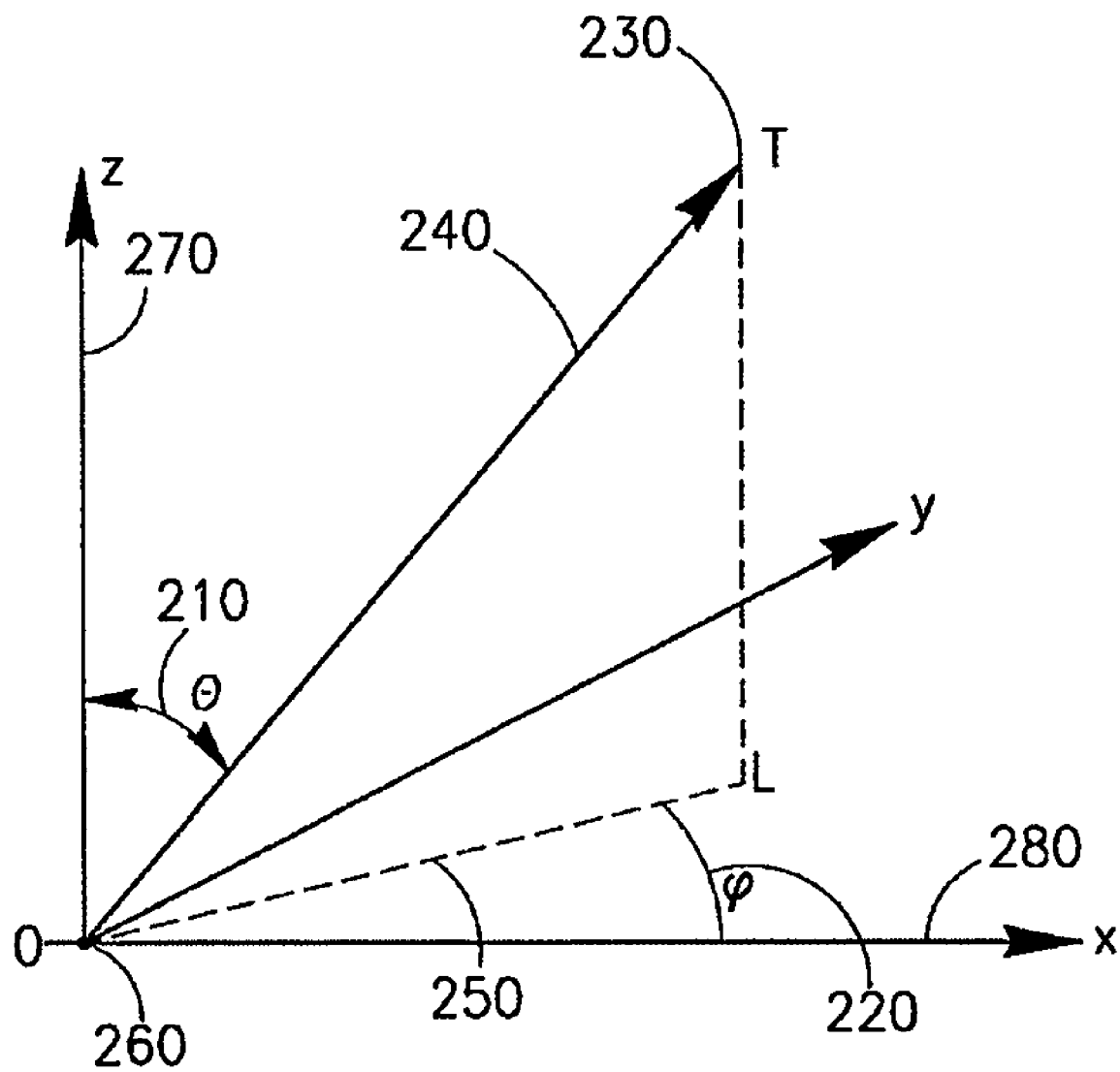
FIG. 2 is a schematic illustration of a dual-angle representation (e.g., a polar angle) of a data point in a dual-angled coordinate system according to an embodiment of the invention.

Reference is made to FIG. 2, which is a schematic illustration of a dual-angle representation (e.g., a polar angle) of a data point in a dual-angled coordinate system according to an embodiment of the invention. The dual-angle coordinate system may be, for example, a polar coordinate system. Other dual-angle coordinate systems may be used. The dual-angle representation may include, for example, a first variable, for example, a zenith angle 210, for example, $\theta$, which may define a first component of a dual-angle coordinate system (e.g., the polar coordinate system), and a second variable, for example, an azimuth angle 220, for example, $\phi$, which may define a second component of a dual-angle coordinate system (e.g., a polar coordinate system). The zenith angle 210 and the azimuth angle 220 may define a polar angle vector for each variable in the dual-variable coordinate system.

For example, a data point 230, T, for example, on a unit sphere, may be defined in relation to an origin 260, O, in the dual-variable coordinate system by two variables, for example, zenith angle 210 and azimuth angle 220. For example, zenith angle 210 of a vector OT 240 may indicate an angle between vector OT 240 and a z-axis 270, and azimuth angle 220 of vector OT 240 may indicate an angle between OL 250, the component of vector OT 240 normal to z-axis 270, and an x-axis 280. For example, azimuth angle 220 may define the orientation of a component OL 250, for example, a projection of vector OT 240 in a horizontal xy plane.

In a demonstrative embodiment, zenith angle 210 may assume values in a range of zero to $\pi$ radians, and azimuth angle 220 may assume values in a range of zero to $2\pi$ radians. For example, $0 \leq \theta \leq \pi$, and $0 \leq \phi < 2\pi$. Other values and/or ranges may be used.

It may be appreciated by those skilled in the art that although a dual-angle representation of data is described, embodiments of the present invention may be applied to any multi-variable representation of data, for example, in a multi-variable coordinate system.

The number of decomposed plane wave directions required for optimal representation of the full wavefield, for example, as estimated in Section B, may be substantially large.

Local Angle Domain (LAD) Coordinate System

The system of incident and reflected waves (rays) at a given image point (local reflecting surface) can be described in a local angle domain (LAD) coordinate system. The LAD coordinate system includes two subsystems: directional and reflection. The directional system includes two components of the polar angle describing the direction of the ray pair normal. The reflection system includes the opening angle between the incident and reflected rays and the opening azimuth. In seismic imaging, the directions of the incident and reflected/diffracted rays are converted into the LAD angles.

Figure 3:
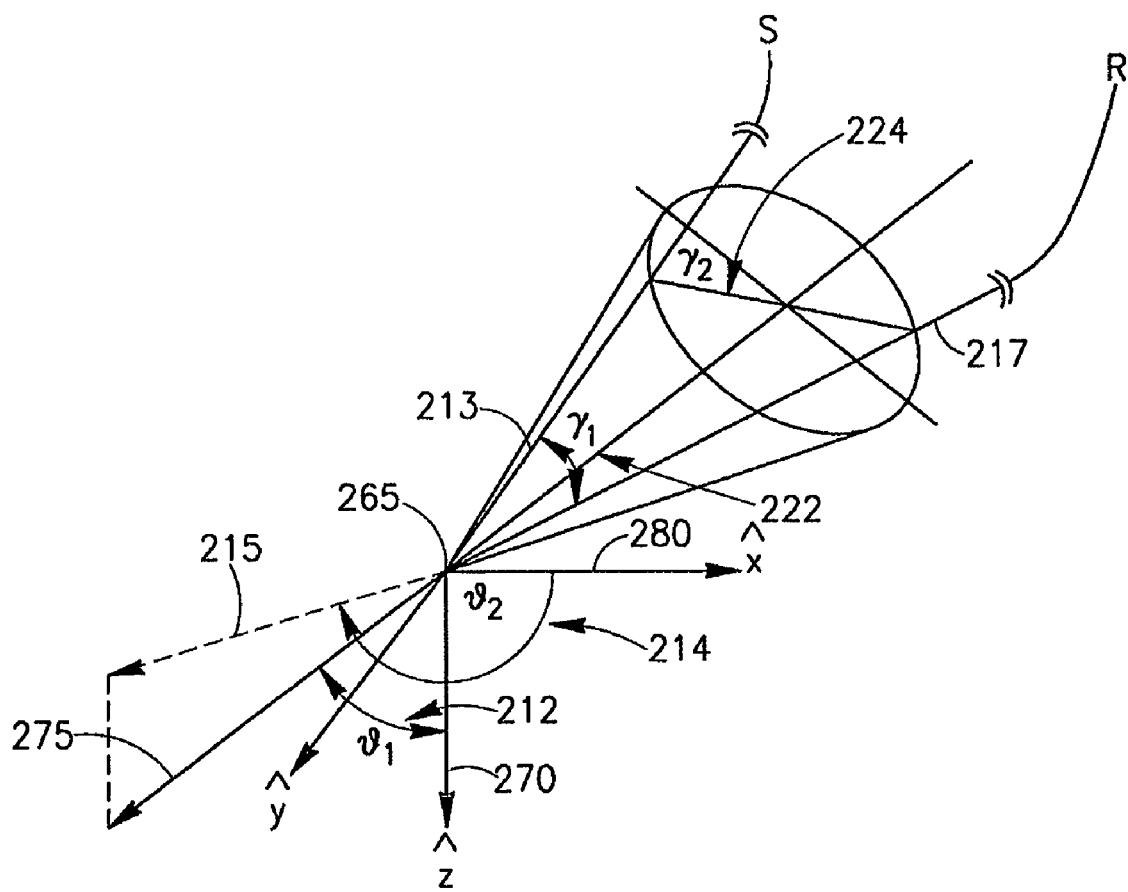
FIG. 3 is a schematic illustration of a Local Angle Domain (LAD) for a given ray pair according to an embodiment of the invention.

Reference is made to FIG. 3, which is a schematic illustration of a Local Angle Domain (LAD) for a given ray pair according to an embodiment of the invention. In one embodiment, each ray pair in the LAD, which may include an incident and reflected ray, may be represented by multiple, for example, four, variables (e.g., $v_1$, $v_2$, $\gamma_1$ and $\gamma_2$). For example, each ray pair may be represented by two direction angles, such as the dip, $v_1$, and azimuth, $v_2$, angles, representing the direction of the ray pair normal, and two reflection angles, such as the opening angle, $\gamma_1$, and the opening azimuth angle, $\gamma_2$, representing the relative orientation of the incident and reflected rays of the ray pair. The direction angles and the reflection angles may be represented by two independent dual-angle systems.

Two rays of the ray pair, incident ray 213 and reflected ray 217, join at an image point 265, for example, located at or set to be an origin of the local frame of reference, $\hat{x}\hat{y}\hat{z}$. Ray pair normal, 275, may be an inward normal to the ray pair reflection surface. A ray pair reflection surface may be a local surface oriented in such a way that, given directions of incident and reflected rays and given medium parameters, the image point may obey Snell's law. The inward ray pair normal 275 may be defined by a dip (e.g., zenith) angle 212, $v_1$, and azimuth angle 214, $v_2$. Dip angle 212 of ray pair normal 275 may be an unsigned angle between the inward ray normal 275 and a local $\hat{z}$ axis 270. Azimuth angle 214 of ray pair normal 275 may be a signed angle between a projection 215 of a normal 275 on the $\hat{x}\hat{y}$ plane and a local $\hat{x}$ axis 280. The direction of each of the two rays in a ray pair, for example, incident ray 213 and reflected ray 217, may be defined by two angles, for example, including a zenith (or dip) angle (e.g., an angle between the direction of the ray and a local vertical axis) and an azimuth angle (e.g., an angle between the projection of the ray onto a plane perpendicular to the local vertical axis and a reference direction in the plane). In addition, any function, for example, the reflectivity function, of a ray pair, that includes for example, incident ray 213 and reflected ray 217, may be defined vs. two angles, for example, including an opening angle 222, $\gamma_1$, (e.g., an angle between the incident ray 213 and reflected ray 217) measured at the image point 265 and an opening azimuth angle 224, $\gamma_2$, (e.g., an orientation of opening angle 222, $\gamma_1$).

In some embodiments, a ray pair, for example, including, an incident ray 213 and a reflected ray 217, may be represented by four angles, which may define two separate dual angle systems, for example, one system for the direction of the ray pair (e.g., represented by a dip angle 212 of a ray pair normal 275 and an azimuth angle 214 of ray pair normal 275) and the other system for the reflection angles of the ray pair (e.g., represented by an opening angle 222 and a opening azimuth angle 224). Such representations of ray pairs, for example, including systems of normal direction to a reflecting object, and magnitude and azimuth of the opening angle, may be referred to as a LAD representation.

The imaging system of coordinates may use alternate or additional multi-variable representations of each ray pair.

Local Frame of Reference

In some embodiments, the target or imaged surface (e.g., including image points 265) may be oriented in various directions, forming a local tilted LAD system. The orientation of the tilted LAD system may be represented by background surface direction angles, for example, defined by a dual-angle system, including dip and azimuth angles of the inward normal to the background reflection surface. The "global frame" of reference with axis z downward may describe the orientation of a local tilted LAD system, which may be referred to as a "local frame", with respect to the global frame. The global and local frames may be defined according to the Cartesian system of coordinates, the polar system of coordinates, or the like, or may be defined by other coordinate systems.

Orientation of TTI Axis of Symmetry

Embodiments of the present invention may use isotropic and/or anisotropic models to image target surfaces; other models may be used. In some embodiments, an anisotropic model, such as a tilted transverse isotropic (TTI) model may be used with a tilted axis of symmetry. In such embodiments, the orientation of the TTI model, including for example, a medium axis of symmetry, may be represented at each location, for example, by a dual-angle system.

Therefore, ray pairs and their relationship to a target surface, for example, in an imaging LAD system, may be defined by multiple, for example, eight, angles, in conventional coordinate systems. In one embodiment, the eight angles may be grouped into four dual-angled systems, for example, a system defining ray pair directional angles, a system defining ray pair reflection angles, a system defining the orientation of the local tilted LAD system, and a system defining a medium axis of symmetry. Embodiments of the present invention may provide a uniform spherical spiral parameterization for each, or some, of the dual-angled systems.

The Uniform Spherical Spiral

Embodiments of the present invention may provide a reduced dimensional representation, for example, a one-dimensional representation, of each dual-angled system to which, for example, the uniform spherical spiral parameterization may be applied, thereby reducing the quantity of data points required to perform optimal angle domain imaging. Such a reduction in data may improve the efficiency of computations needed to image or process the data and may reduce the space and memory needed to store the data on disks, or to store intermediate data through the computation process. (e.g., data used in data processing).

Embodiments of the present invention may provide a separate visualization or display for each of the dual-angled systems described herein, for example, according to the reduced (e.g., one-dimensional) uniform spherical spiral representation. Such displays, which may be referred to as "spherical spiral image gathers" may provide useful information for interpreting geophysical data.

Figure 4:
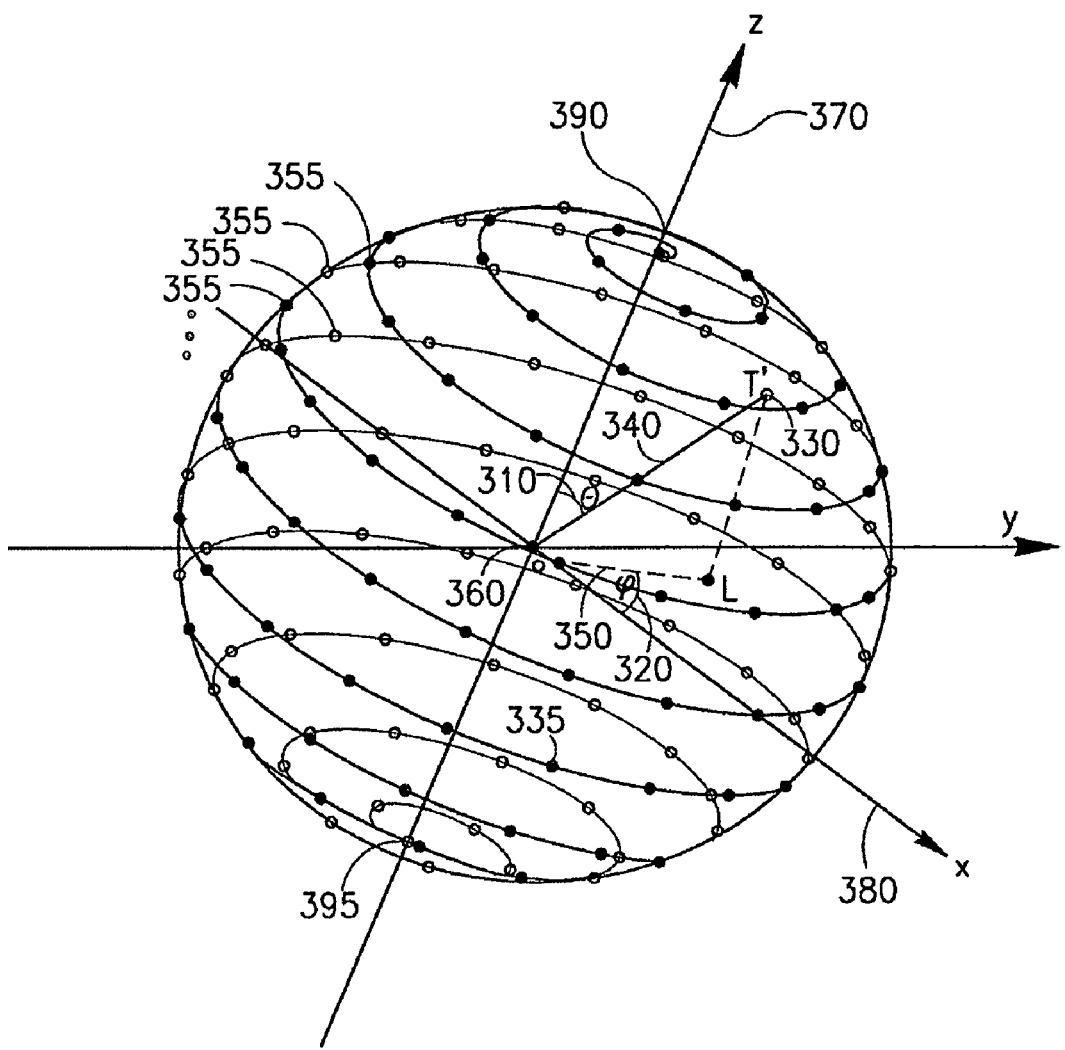
FIG. 4 is a schematic illustration of data points in a uniform spherical spiral coordinate system according to an embodiment of the invention.

Reference is made to FIG. 4, which is a schematic illustration of data points in a uniform spherical spiral coordinate system according to an embodiment of the invention. The uniform spherical spiral representation may be a parameterized representation of the dual-angle representation depicted in reference to FIG. 2. In one embodiment, the parameterization may reduce the two-dimensional representation of data in dual-angled coordinate systems, described in reference to FIG. 2, to a single-dimensional representation, which may reduce the quantity of information required to represent and image geophysical data. Systems operating such mechanisms may be more efficient, require less operation and computation, and use less memory and/or storage space than systems operating conventional mechanisms. Other or different benefits may be achieved.

In a demonstrative embodiment, seismic data, for example, may be represented in a converted, compressed, or reduced dimensional form, using for example the uniform spherical spiral parameterization, according to an embodiment of the invention. The reduced dimension coordinate system, such as the uniform spherical spiral coordinate system, may be defined, for example, by a parameterization of a dual-angle coordinate system.

Parameterization of a Dual-Angle Coordinate System

A parameterization of a dual-angle coordinate system may include a relationship such as, for example:

$$\phi = k \cdot \theta, \quad (1)$$

where k may be a parameter, which may be called an elevation parameter of the spiral, and $\theta$ and $\phi$ may be the dual variables (or e.g., dual angle components), for example, zenith angle $\theta$, 210, and azimuth angle $\phi$, 220, respectively, an example of which is described in reference to FIG. 2. In some embodiments, parameter k may indicate a density of spiral coils on the spherical spiral. In some embodiments, for uniform spherical spirals, the larger the value for the elevation parameter k, the greater density of coils on the spiral. For example, the elevation parameter k may correspond to or measure twice the number of coils spanning a spiral, starting at a north pole 390 and ending at a south pole 395. North pole 390 and south pole 395 may be defined as points or nodes in the spiral coordinate system having zenith angles 310 that are zero and $\pi$ radians, respectively. North pole 390 and south pole 395 may have undefined or negligent values for azimuth angle 320. An equator may include a coil or section of the spiral that may be most or substantially equidistant from north pole 390 and south pole 395. Points or nodes along or close to the equator may have similar values for zenith angles 310 that are approximately $\pi/2$ radians and varying values for azimuth angle 320. In some embodiments, a spiral tilt parameter $\alpha$ may be defined as an angle between the direction of a spiral at the given point and the horizontal plane (e.g., a plane normal to the polar axis of a sphere). The tilt $\alpha$ may be defined vs. the zenith angle, for example, by:

$$\tan\alpha = \frac{dz}{dh} = \frac{dz/d\theta}{dh/d\theta} \quad (2)$$
$$= \frac{dz/d\theta}{\sqrt{(dx/d\theta)^2 + (dy/d\theta)^2}}$$
$$= -\frac{\sin\theta}{\sqrt{1 + (k^2 - 1)\sin^2\theta}}.$$

In some embodiments, the tilt may for example have a value that varies along the length of the uniform spherical spiral. In some embodiments, the tilt may have a negative value, for example, since the uniform spherical spiral line may descend from north pole 390, where z=1, to south pole 395, where z=−1. For example, the tilt may be zero at poles 390 and 395, where the zenith angle may be $\theta$=0 and $\theta$=$\pi$ or radians. The tilt angle may have a maximum absolute value $|\alpha|_{max} \approx \arctan(1/k)$ at points along the equator where the zenith angle, $\theta \approx \pi/2$. Other formulae or series of formulae may be used.

Equation (1) may define a proportionality relationship between $\theta$ and $\phi$, for example, characterized by the scalar elevation parameter, k. Thus, the coordinate system may be referred to as "uniform". The term "uniform" may relate to a uniform linear relationship between the zenith and the azimuth angle throughout a whole spiral. The term "uniform" may also relate to a uniform location (or e.g., spacing) of nodes along the spiral line (e.g., where successive nodes may have uniform arc length between them or, alternatively, may sweep uniform areas). In such embodiments, a data point, for example, represented in the dual-angle coordinate system by two variables (e.g., $\theta$ and $\phi$) may be represented in the uniform spherical spiral coordinate system by a single variable (e.g., either of the two angles, $\theta$ and $\phi$). For example, a zenith angle $\theta$ alone may define any location in a dual-variable coordinate system.

For example, a data point 330, T', for example, on a uniform spherical spiral, may be defined in the uniform spherical spiral coordinate system by a single variable, for example, a zenith angle 310 (or e.g., alternately, an azimuth angle 320). In one embodiment, zenith angle 310, $\theta$, of a vector OT 340 (e.g., an angle between vector OT 340 and a z-axis 370), may define an azimuth angle 320, $\phi$, (e.g., an angle between OL 350, the component of vector OT 340 normal to z-axis 370, and an x-axis 380), for example, according to the relationship in equation (1). Since two variables, for example, angles $\theta$ and $\phi$, may define an arbitrary data point 330, T', in a dual-angle (e.g., polar) coordinate system, using equation (1), a single variable, $\theta$, may approximately define an arbitrary data point 330, T', in the uniform spherical spiral coordinate system. In some embodiments, when two variables, for example, zenith angle 310, $\theta$, and azimuth angle 320, $\phi$, are independent, an arbitrary data point 330, T', may only be defined by both variables. However, when the two variables are dependent, an arbitrary data point 330, T', may be defined by either of the two variables. In some embodiments, an arbitrary data point 330, T', may not be located on the spiral line, or may be located on the spiral line, but typically not at a node of the spiral coordinate system. In such embodiments, the data point may be, for example, binned to the nearest nodal point that lies on the spiral line.

Full and Partial Spherical Spiral

In a demonstrative embodiment, zenith angle 310, $\theta$, may assume values in a range of zero to $\pi$ radians, and azimuth angle 320, $\phi$, may assume values in a range of zero to $2\pi n_{coils}^{\pi}$ radians, where $n_{coils}^{\pi}$ may be the amount of spiral coils in a full spiral, for example, that starts at the north pole and ends at the south pole. A "partial" spiral may start at the north pole and end at some point on the spherical surface other than the south pole. A "full" spiral may first coincide with the partial spiral, up to the point where the partial spiral ends, and then may continue to the south pole for example with the same elevation parameter k. For a full spiral, for example, $0 \leq \theta \leq \pi$, and $0 \leq \phi < 2\pi n_{coils}^{\pi}$. The superscript $\pi$ for the symbol $n_{coils}^{\pi}$ may imply that the amount of coils taken for a full spiral may stretch to the south pole, where the zenith angle, $\theta_{max} = \pi$. Other values and/or ranges may be used. It may be appreciated that $n_{coils}^{\pi}$ may assume non-integer values.

The proportionality defined by equation (1) gives, for example:

$$\phi_{max} = k \cdot \theta_{max}. \quad (3)$$

The maximum zenith angle 310 and azimuth angle 320 may be, for example:

$$\theta_{max} \leq \pi, \text{ and } \phi_{max} = 2\pi n_{coils}, \text{ respectively.} \quad (4)$$

Combining equations (3) and (4), gives, for example:

$$k = \frac{2\pi n_{coils}}{\theta_{max}}. \quad (5)$$

For example, if the uniform spherical spiral has end points at poles 390 and 395 (e.g., the "full" uniform spherical spiral shown in FIG. 4), the maximum zenith angle 310 and azimuth angle 320 may be, for example:

$$\theta_{max} = \pi, \text{ and } \phi_{max} = 2\pi n_{coils}^{\pi}, \text{ respectively.} \quad (6)$$

Thus, equation (5) reduces to, for example:

$$k = 2n_{coils}^{\pi}. \quad (7)$$

For example, if the uniform spherical spiral does not have end point at south pole 395 (e.g., a "partial" uniform spherical spiral), the maximum zenith angle 310 and azimuth angle 320 may be, for example:

$$\theta_{max} \leq \pi, \text{ and } \phi_{max} = k \cdot \theta_{max}, \text{ respectively.} \quad (8)$$

In some embodiments, substantially all spirals, full and partial, may start at north pole 390. However, partial spirals typically do not reach the south pole 395. Partial spirals may end at a point with a smaller zenith angle than full spirals. Thus, substantially only full spirals stretch to the south pole with zenith angle π. In such embodiments, the proportionality constant (or e.g., the elevation parameter), k, may be defined by equation (5).

Other formulae or series of formulae may be used.

Discretization of the Spherical Spiral Nodes

In one embodiment, a uniform spherical spiral coordinate system may include nodes 355 along which data points 330, T', may be defined. In one embodiment, nodes 355 may be placed along an arc length of the spiral sphere according to any of multiple configurations. In one embodiment, nodes 355 may be positioned along the arc length in such a way that there may be approximately an equal area swept between successive nodes 355. Such embodiments may provide a normalization of the uniform spherical spiral coordinate system that may, for example, benefit imaging systems. In one embodiment, during imaging, imaging systems may calculate densities of rays per unit of local area (e.g., flux). The flux of the rays may be compared with flux of various illumination models, for example, to determine which illumination model most accurately resembles the recorded data. Such density or flux measurements may include integrating data values specified at discrete data points 330, T', over the surface area of the sphere, using the mechanism of the uniform spherical spiral. In embodiments where the arrangement of nodes 355 is normalized, with an equal area swept between the successive spiral nodes, such calculations may be substantially simplified. According to an embodiment of the invention, a discretization of nodes may be used as described in reference to FIG. 5. Other types of discretization may be used.

It may be appreciated by those skilled in the art that although various reduced dimension coordinate systems may be used, FIG. 4 depicts a demonstrative embodiment of one such coordinate system. The uniform spherical spiral coordinate system may be relatively simple to use, when compared with other coordinate systems.

Further descriptions of characteristics of the uniform spherical spiral parameterization are described herein. Such characteristics may include, for example, defining and providing a relationship between arc lengths and zenith angles of the uniform spherical spiral, a relationship between swept areas and the zenith angles of the uniform spherical spiral, optimal parameters for the uniform spherical spiral, a function for imaging the uniform spherical spiral, such as an integral having, for example, an arc length or a swept area as an integration variable, and a binning mechanism to parameterize dual-variable data representations to generate single-variable data representations, for example, using normalization methods. Optimal parameters for the uniform spherical spiral may include, for example, an optimal number of coils in the uniform spherical spiral and/or selection of an optimal type for arrangement of nodes along the uniform spherical spiral. There may be, for example, two types of a uniform node discretization, for example, those with the uniform lengths between successive nodes and those with uniform areas swept by spiral coils. The arrangement of nodes may be selected or determined, for example, to normalize or discretize the area swept between successive nodes. The nodes may, for example, be positioned along the arc length in such a way that there may be an equal area swept (e.g., including equal area segments) between successive nodes and approximately equal arc lengths between the successive nodes. Alternatively, nodes may be placed such that there may be equal arc lengths between the successive nodes and approximately an equal area swept between the successive nodes. In some embodiments, nodal discretizations that provide equal area segments may facilitate the calculation of flux.

Equal-Area Discretization

Figure 5:
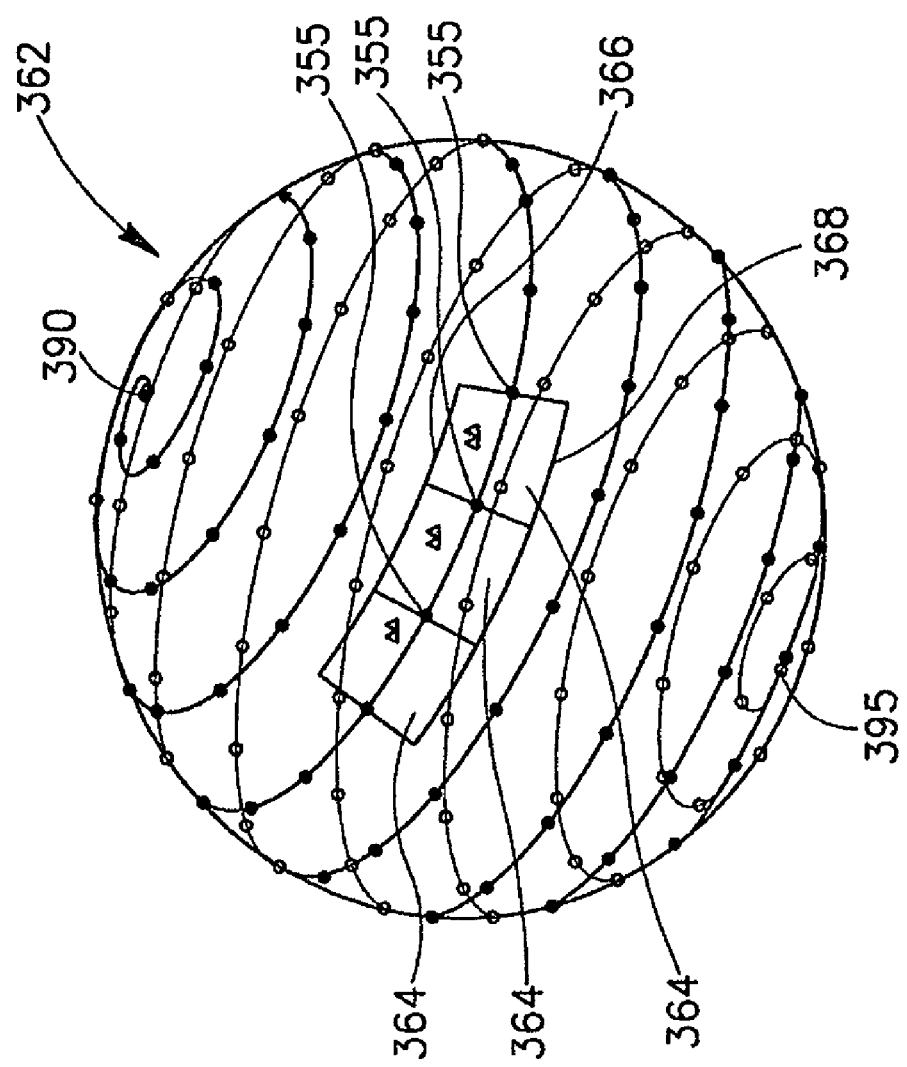
FIG. 5 is a schematic illustration of an equal-area discretization of nodes in the uniform spherical spiral coordinate system according to an embodiment of the invention.

Reference is made to FIG. 5, which is a schematic illustration of an equal-area discretization of nodes in the uniform spherical spiral coordinate system according to an embodiment of the invention. In some embodiments, each of areas swept between successive nodes 364 of uniform spherical spiral coordinate system 362 may be substantially equal. In one embodiment, the area swept between two consecutive nodes 364 along the spiral line may be an area bounded above and below by auxiliary spiral lines 366 and 368, respectively. Auxiliary spiral line 366 may be equidistant between the current coil and an adjacent upper coil. Auxiliary spiral line 368 may be equidistant between the current coil and an adjacent lower coil. In some embodiments, auxiliary spiral line 366 may not be defined for the first coil, and auxiliary spiral line 368 may not be defined for the last coil. The areas swept between successive nodes 364 may be approximated by a surface area, for example, of a curved spherical quadrilateral. The areas swept between successive nodes 364 may indicate a quadrilateral or otherwise shaped region and/or the area thereof. The spherical quadrilateral may be bounded vertically by auxiliary spiral lines 366 and 368, and laterally by meridian lines 355 that pass through the successive nodes. In an equal-area discretized uniform spherical spiral 362, although quadrilaterals 364 between successive nodes may have different shapes, areas 364 swept between successive nodes are typically the same. In other embodiments, areas swept between successive nodes 364 may have different or unequal values for different nodes 355.

In some embodiments, when areas 364 swept between successive nodes have substantially the same value, there may be a non-uniform distance between successive nodes, for example, along the length of the spiral line. Uniform area discretization may provide segments of uniform spherical spiral 362 that are close to the poles with relatively long arc lengths and segments of the spiral that are farther from the poles (e.g., a north pole 390 and a south pole 395), for example, at "moderate latitudes" or near the equatorial region of the spiral with relatively short arc lengths. In some embodiments, areas 364 swept between successive nodes (also referred to as area elements) may be approximated by parallelograms, for example, with length substantially equal to the distance between the successive nodes along the spiral arc length and a lateral side substantially equal to the distance between the successive coils along a meridian direction, with a varying angle between the adjacent sides, as described in reference to FIG. 6. Area elements 364 or areas swept between successive nodes may have other shapes or boundaries. Although discretization describes normalizing the areas 364 swept between successive nodes, in other embodiments, discretization may include normalizing a distance between successive nodes, for example, along the length of the spiral line.

In one embodiment, "an area swept by coils" at a node 355 may refer to an accumulated sum of areas swept between successive nodes before the node 355 along the spiral line. In one embodiment, for a node 355, a relationship may be defined between the area swept by coils at the node 355, and an area referred to as a "polar hat" of the node 355. In some embodiments, the polar hat of the node 355 may be a surface of an upper part of the sphere separated from the lower part of the sphere by a plane that may be normal to the polar axis of the sphere and passes through the spiral node 355. Thus, when the polar axis of the sphere is vertical (e.g., an axis z), a horizontal plane may be substantially normal to the polar axis. The horizontal plane that passes through a given node of the spiral may split the sphere into two surfaces. The two surfaces may be referred to as polar hats, for example the northern polar hat and the southern polar hat. In some embodiments, only the northern polar hat may be considered. In one embodiment, for a point on uniform spherical spiral 355 line, a northern polar hat area, A, of a node 355 may be for example:

$$A = 2\pi RH = 2\pi R(R-z) = 2\pi(1-z) = 2\pi(1-\cos\theta) = 4\pi \sin^2(\theta/2), \quad (9)$$

where R=1 may be the radius of the unit sphere, H=R−z may be the height of the polar hat, z may be the vertical coordinate of the node (e.g., where z=1 at the north pole, z=−1 at the south pole, and z=0 at the equator), and θ, may be the dip angle, where z=R cos θ=cos θ. At north pole 390, the area of the northern polar hat may be zero, and at south pole 395, the area of the southern polar hat may be equal to the surface area of the full sphere.

Other formulae or series of formulae may be used.

The LAD as a Double Uniform Spherical Spiral

Figure 8:
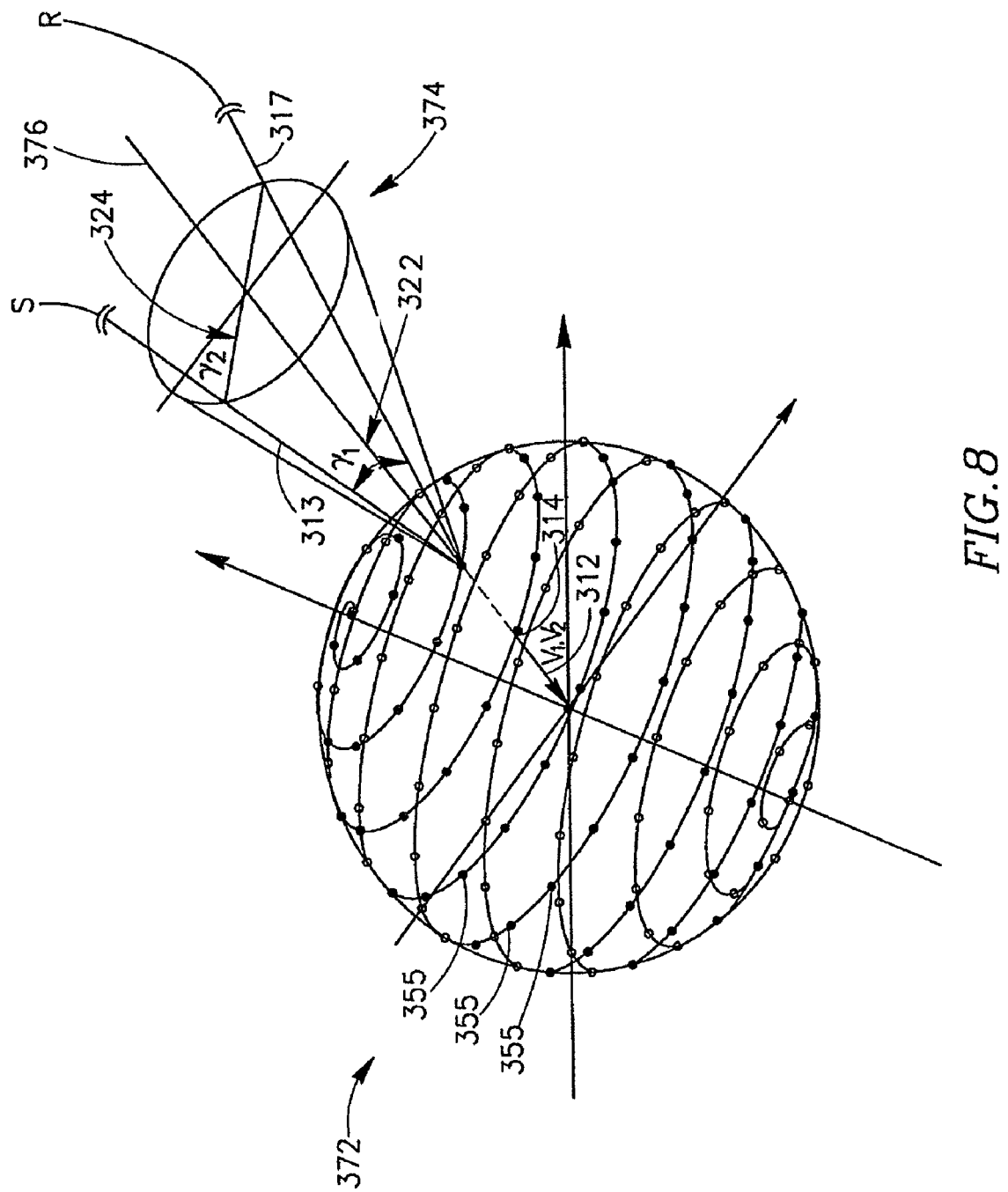
FIG. 8 is a schematic illustration of the LAD, where the ray pair directional angle subsystem is represented using a uniform spherical spiral coordinate system according to an embodiment of the invention.

Reference is made to FIG. 8, which is a schematic illustration of a LAD, where the ray pair directional angle subsystem is represented using a uniform spherical spiral coordinate system according to an embodiment of the invention. Two LAD subsystems may be described, including, for example, a directional subsystem 372, and a reflection subsystem 374. The reflection subsystem 374, (e.g., as described in reference to FIG. 3) may be illustrated by an axial cross-section of a cone, having an opening angle 322, equal to the angle between the incident and the reflected rays and the orientation of the axial cross-section of the cone may be defined by an opening azimuth 324. For a general anisotropic medium, the cone axis is the bisector of the opening angle $\gamma_1$ (e.g., the axis of symmetry of the opening angle). In the case of an isotropic medium, the axis of the cone 376 may represent the ray pair normal. Otherwise the ray pair normal does not coincide with the cone axis, because the incidence and the reflection angles may be substantially different. Different opening azimuth angles $\gamma_2$ may be obtained by rotation of the axial cross section of the cone about the ray pair normal. Generally, due to anisotropy and/or converted waves, the rotation axis of the axial cross section does not necessarily coincide with the axis of symmetry of this cross section. The lateral sides of the axial cross-section may be an incident ray 313 and a reflected ray 317. The directional subsystem 372 may be represented by a uniform spherical spiral coordinate system according to an embodiment of the invention. The directional subsystem 372 may include two angles, for example, a zenith angle $v_1$, 312, and an azimuth angle $v_2$, 314. The locations of spiral nodes 355, may correspond to, for example, equal area segments.

Figure 9:
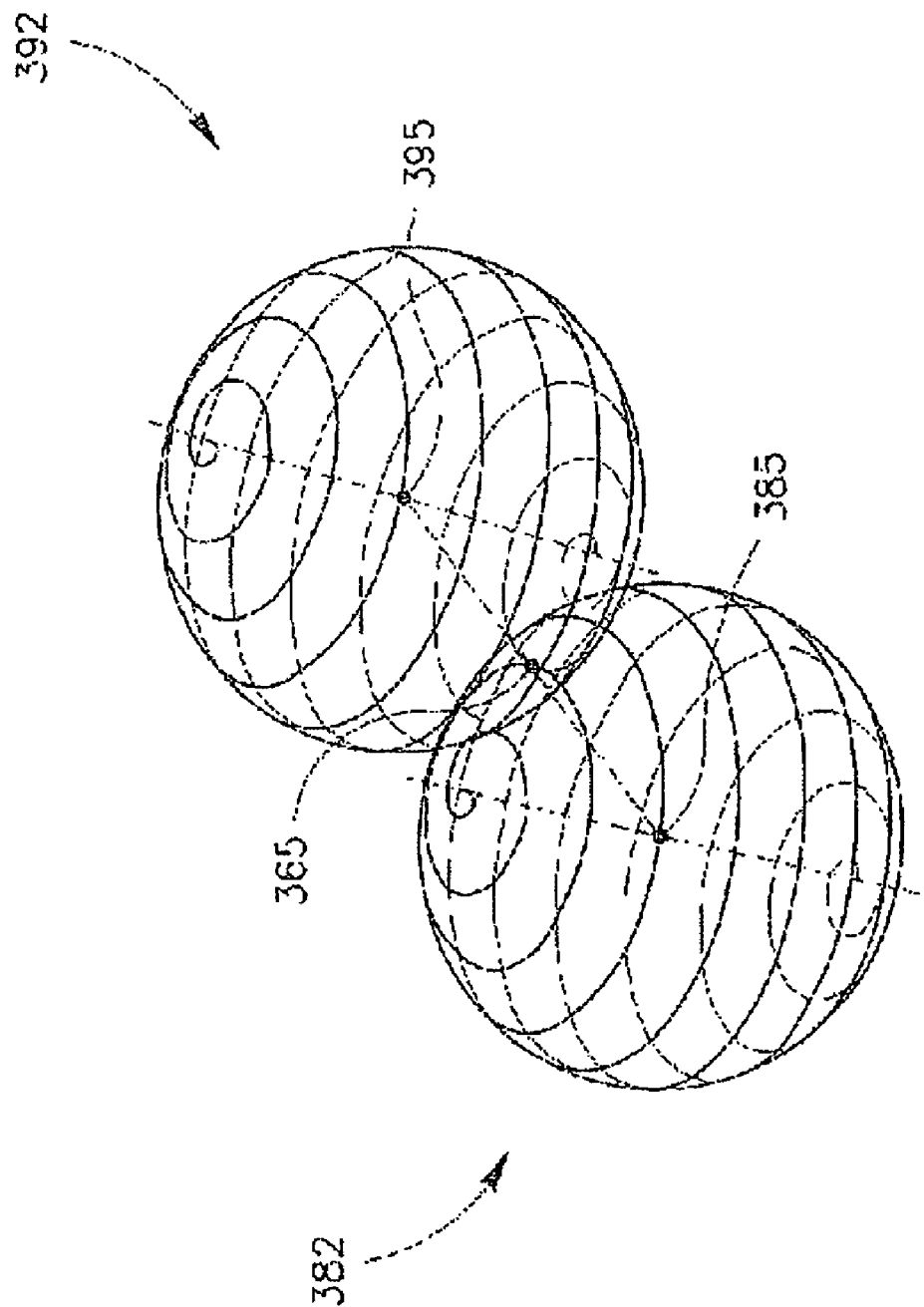
FIG. 9 is a schematic illustration of the LAD, where two subsystems: directional and reflection, are represented using the uniform spherical spiral coordinate systems according to an embodiment of the invention.

Reference is made to FIG. 9, which is a schematic illustration of the LAD, where two subsystems: directional and reflection, are represented using the uniform spherical spiral coordinate systems according to an embodiment of the invention. In FIG. 9, a directional LAD subsystem 382, and a reflection LAD subsystem 392, may be represented by a uniform spherical spiral coordinate system. The four-dimensional LAD system, including the directional and reflection LAD subsystems 382 and 392, at each image point may be represented by double subsystem angles. In some embodiments, each double subsystem angle may be parameterized by a reduced coordinate system, for example, the uniform spherical spiral. Thus, instead of the four dimensional angle domain system described, for example in FIG. 3, according to embodiments of the invention, any data point related to a given ray pair, for example a data point 365, may be a function of only two parameters, one for a directional angle in directional LAD subsystem 382 and one for a reflection angle in the reflection LAD subsystem 392.

For example, the uniform spherical spiral 382, may represent the directional components (e.g., dip angle $v_1$ and azimuth angle $v_2$ of a ray pair normal) of the data point 365, and the uniform spherical spiral 392, may represent the reflection components (e.g., opening angle $\gamma_1$ and opening azimuth angle $\gamma_2$ of the ray pair) of the same data point 365. Spiral representations 382 and 392 may be translated or rotated relative to one another, while maintaining an accurate representation of seismic data. The spheres may be slid and rolled through the other's surfaces, so that a common point (e.g., a contact point) may belong to both spirals and is typically not located between the coils of any of the spirals. In the example depicted in FIG. 9, the direction of the ray pair may be defined by a 33° dip angle and a 297° azimuth angle of the ray pair normal and the reflection angle of the ray pair may be defined by a 30° opening angle and a 240° opening azimuth angle. Other values may be used.

Thus, in some embodiments, multi-dimensional data sets (e.g., represented in polar or Cartesian coordinate systems) may be divided into several two-dimensional subsets, where each two-dimensional subset may be represented by a spiral (e.g., direction spiral 382 and reflection spiral 392) according to an embodiment of the invention. Since uniform spherical spiral 382 and 392 representations may reduce the dimensionality of directional angle and reflection angle systems of the LAD, respectively, combining the two representations may be used to represent ray pairs with a further reduced dimensionality.

Imaging Mechanisms

An imaging mechanism used in accordance with an embodiment of the present invention may include, for example, conventional modeling mechanisms, such as wave equation modeling or ray tracing mechanisms that may generate simulated (or e.g., imaged) reflected signals. Imaging systems may use geophysical data generated, for example, by wide-azimuth mechanisms, by simulating, for example, rays incident to and reflected from target surfaces with a wide range of directional and reflection angles. Seismic data imaging the incident and reflected and/or diffracted signals at subsurface image points may be generated using, for example, simulation of wave propagation based on, for example, numerical solution of wave equations, or numerical solution of ray equations (e.g., using ray tracing methods). Angle domain reflectivity within CIGs may be constructed by applying imaging conditions based on Snell's law. In practice, an imaging mechanism in accordance with an embodiment of the present invention may include, for example, wave equation and/or ray-based Kirchhoff migration mechanisms for generating common image gathers (CIG).

An imaging mechanism in accordance with an embodiment of the present invention may include, for example, a 3D slant stack or 3D beam stack mechanism. The 3D beam stack mechanism may decompose reflected events in the neighborhood of a center signal that meets certain predetermined, automatic, manual, or user-selected conditions. For example, neighboring reflected events that surround a center signal may be imaged if they have the same arrival direction as the center signal. A slant stack mechanism may image reflected events that have substantially the same emergence angle. Other conditions for imaging may be used. The slant stack and/or beam stack mechanisms may be executed in the frequency domain, for example, using a Fourier transform or the like, or in the time domain, using a Radon transform or the like. 3D slant stack mechanisms may be described in more detail in the section, entitled, "Slant Stack Imaging Mechanisms and Angle Discretization".

Embodiments of the invention may provide a system and method for generating full-azimuth angle gathers using a wave-equation Common Shot Migration (CSM) mechanism (e.g., as represented by a Spiral-WADI, a Wave Equation Angle Domain Imaging). Such a mechanism may use a uniform spherical spiral representation for generating a 3D Radon transform (e.g., a 3D slant-stack), using a two dimensional Spiral representation.

Embodiments of the present invention may be used to represent any multi-variable data. For example, data may relate to geophysical data that may, for example, represent seismic waves from wide-azimuth seismic data acquisitions. In other embodiments, the data may be used, for example, for medical imaging; subsurface, marine and/or solar exploration; and the inspection of concealed items for security purposes.

Full-Azimuth Angle Domain Common Image Gathers

In some embodiments, CIGs generated using, for example, traces that share a single geometrical parameter (e.g., single azimuth opening angle), may image geophysical structures with insufficient accuracy. Imaging using, for example, multi-azimuth CIGs, instead of, for example, commonly used single-azimuth CIGs, may improve image accuracy and provide additional important information about azimuthal dependency. According to embodiments of the invention, full-azimuth, angle dependent, CIGs may be generated using traces that share a value for two variables. There may be different types of angle dependent CIGs, including for example, reflection angles CIGs which may be represented as functions of opening angles and opening azimuth angles, and directional CIGs, which may be represented as functions of the dip and azimuth angles of the ray-pair normal.

Spiral Common Image Gathers—Unique Display of Multi Azimuth Angle Domain CIGs

Figure 10:
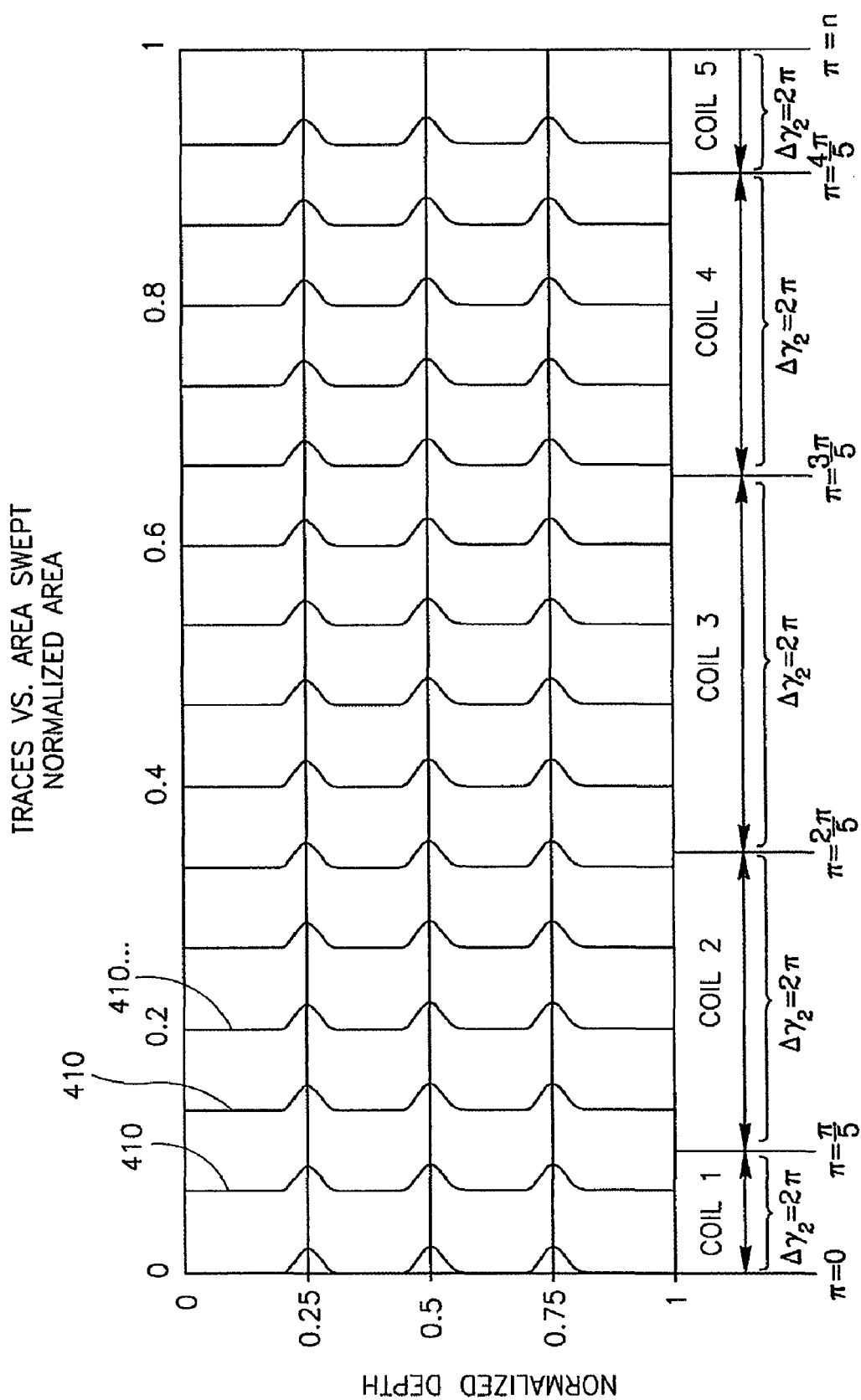
FIG. 10 is a schematic illustration of a display of a Spiral CIG, for example, a full azimuth reflection angle CIG display (e.g., referred to as a Spiral-R) according to an embodiment of the invention.

Reference is made to FIG. 10, which is a schematic illustration of a display of a Spiral CIG, for example, a full azimuth reflection angle CIG display (e.g., referred to as a Spiral-R) according to an embodiment of the invention. In an embodiment depicted in FIG. 10, a uniform spherical spiral parameterization may provide a one-dimensional representation, for example, Spiral-R, representing CIGs corresponding to ray pair reflection angles (e.g., including opening angle and opening azimuth angle) represented by spiral representations 392, or Spiral-D, representing CIGs corresponding to ray pair directional angles (e.g., including dip angle and azimuth angle) represented by spiral representations 382.

In one embodiment, FIG. 10 may display full-azimuth reflection angle domain CIGs (e.g., 3D ADCIGs) according to an embodiment of the invention. In an embodiment depicted in FIG. 10, a uniform spherical spiral parameterization may provide a single parameter representation, for example, a distribution of the image gather traces, representing reflectivity vs. ray pair reflection angles (e.g., including opening angle 222 and opening azimuth angle 224, as described in reference to FIG. 3) of a seismic data set. In another embodiment, such a display may depict a uniform spherical spiral representation of the ray pair direction angle (e.g., including dip angle 212 and azimuth angle 214 of a ray pair normal 215, as described in reference to FIG. 3). According to embodiments of the invention, a display based on the uniform spherical spiral may provide a representation with monotonously increasing zenith angle and periodic azimuth, as illustrated, for example, in FIGS. 10 and 11.

The display may represent a reflection system of the LAD representation of image points located along a given vertical line, for example, defined by the opening angle and the opening azimuth. The uniform spherical spiral representation unifies two reflection angles (e.g., the opening angle and the opening azimuth) into a single parameter (e.g., the normalized area swept by spiral coils). The parameter corresponds to a simultaneous change in both the opening angle and the opening azimuth angle. In some embodiments, Spiral-R (or Spiral-D) traces 410 may depict values along the spiral nodes 355, located at uniform area intervals. A vertical trace 410 may correspond to a variable depth within a whole depth range and may be related to a specific spiral node 355. Values along fixed horizontal levels of display may correspond to a fixed depth and/or to a whole set spiral nodes, located, for example, at uniform area intervals.

In some embodiments, FIG. 10 may display a subset of image gather traces that are typically displayed. In some embodiments, a display of 3D ADCIGs may contain several hundred (or even thousands) of such traces. In some embodiments, traces corresponding to CIGs other than ADCIGs may be generated and displayed according to embodiments of the present invention. In some embodiments, traces corresponding to one-dimensional or two-dimensional CIGs may be generated and displayed according to embodiments of the present invention.

As described herein, the single variable zenith angle 310 in the uniform spherical spiral coordinate system may be equivalent to the dual-variable zenith angle 210 and azimuth angle 220 in the dual-angle coordinate system. Therefore, 3D ADCIGs in FIG. 10 include traces 410 that share a value for zenith angle 210 and azimuth angle 220 in dual-angle coordinate systems. The uniform spherical spiral parameterization may thereby simplify a comparison of functions of two independent variables in the dual-angled coordinate system to a comparison of functions of one variable in the uniform spherical spiral coordinate system, thereby reducing the quantity of information that may be processed. Since 3D CIGs may increase the computational complexity of imaging, visualization, and/or interpretation systems, reducing the amount of information for processing may provide mechanisms that operate, for example, with reduced memory and storage capacities and improved computational efficiency. It may be appreciated by those skilled in the art that embodiments of the present invention may be used to generate 3D CIGs, including traces that have, for example, substantially the same directional angles of ray pairs, reflection angles, orientation angles of the tilted LAD, and/or angles defining a medium axis of symmetry.

The full-azimuth (e.g., 3D) ADCIGs may include multiple image traces 410, each of which has, for example, substantially the same opening azimuth angle at the reflecting surface, in addition to substantially the same opening angle. In some embodiments, a two-dimensional data set at a given image point may be converted to a one dimensional data set using a uniform spherical spiral parameterization. The two-dimensional data set may include, for example, a dual-angled coordinate system (e.g., a polar coordinate system) representation of reflection angles (e.g., including two independent variables, such as opening azimuth angles represented by azimuth angle 220 and opening angles represented by zenith angle 210) of data points, for example, data points 230. The one-dimensional data set may include, for example, a single variable coordinate system (e.g., a uniform spherical spiral coordinate system) representation of reflection angles of data points, for example, data points 330 in FIG. 4. The set may include two dependent variables, such as, opening angle and opening azimuth angle, which may be related, for example, by the relationship defined by equation (1).

In one embodiment, by using the uniform spherical spiral parameterization, the two angles may be unified by a relationship, for example, defined in equation (1), for example, by an elevation parameter, k. In some embodiments, a running parameter, that varies along the length of the spiral line may be the area swept by the coils of the uniform spherical spiral, with equal-area segments between successive nodes. This area may, for example, be normalized as described herein. The elevation parameter, k, may characterize a relationship between the opening angle and the opening azimuth angle. The CIG traces may be located at the spiral nodes with uniform area segments between them.

FIG. 10 depicts 3D ADCIGs across a "full" uniform spherical spiral. For example, the uniform spherical spiral may have end point nodes at its poles (e.g., north pole 390 and south pole 395, as depicted in FIG. 4). One end node of the spiral may be positioned at a north pole and may have a zenith angle, $\theta=0$ radians, and another end node of the spiral may be positioned at a south pole and may have a zenith angle, $\theta=\pi$ radians. When used herein, north and south are used for clarity only, and as relative terms, and of course the poles may be reversed, or may be described differently. For the purpose of demonstrating characteristics of the CIGs according to embodiments of the invention, the uniform spherical spiral used to produce the display in FIG. 10 may have a relatively small number of coils, for example, $n_{coils}=n_{coils}^{\pi}=5$. In some embodiments, using a full uniform spherical spiral, for example, as defined by equation (7), the elevation parameter, k, in the example under consideration may be for example, $k=2n_{coils}^{\pi}=10$. The difference in the zenith angle (e.g., the opening angle) between successive coils may be, for example, $\Delta\gamma_1=\pi/n_{coils}^{\pi}=\pi/5$ and the difference in the azimuth angle (e.g., the opening azimuth angle) between successive coils may be $\Delta\gamma_2=2\pi$. For the purpose of demonstrating characteristics of the CIGs according to embodiments of the invention, the uniform spherical spiral may have, for example, 16 nodes that may be equidistant (with, for example, 15 intervals between the nodes corresponding to a uniform area segment grid). Other numbers of nodes and intervals may be used. In one embodiment, the areas swept by individual coils are not equal. For example, FIG. 10 shows that a coil 1 and a coil 5 (e.g., spanning polar regions) each sweep about a 10% area, coil 2 and coil 4 (e.g., spanning regions of moderate latitudes) each sweep about a 25% area, and coil 3 (e.g., spanning equatorial region) sweeps about a 30% area. It may be noted that a typical 3D CIG may include several hundred traces, and a uniform spherical spiral may include several tens of coils. Various other visualizations or displays may be used to depict 3D CIG generated according to embodiments of the present invention. Such displays and characteristics thereof (e.g., color, contrast, data types displayed, etc.) may be set and/or adjusted automatically, manually, or according to user-selected and/or predetermined or derived settings selected by an automatic mechanism. For example, a background color display may be used to emphasize the variation of values of the opening azimuth angles across each of the coils, where each of multiple colors may be used to represent a specific value of the opening azimuth angle. In this case, for each coil the sequence of background colors may repeat.

A Wide Eye system may include the Spiral-R and Spiral-D CIGs. The Wide Eye system may generate 3D ADCIGs using, for example, a ray-based, full-azimuth angle domain imaging mechanism (e.g., referred to as a Spiral-RADI), and a wave equation mechanism (e.g., a common shot migration (CSM) mechanism, referred here as Spiral-WADI).

Embodiments of the invention may provide a system and method for generating spiral reflection angle ADCIGs (e.g., referred to as a Spiral-R) and spiral direction common image gathers (e.g., referred to as a Spiral-D). In some embodiments, the Spiral-R representation may represent local reflectivity distributions of waves, for example, as a function of opening angles and opening azimuth angles of the ray pairs (e.g., at reflection surfaces). In some embodiments, Spiral-D may represent specular and/or diffuse energy of waves, for example, as a function of local dips and/or azimuth angles of the waves (e.g., at reflection surfaces). In some embodiments, Spiral-R and Spiral-D migrated angle gathers, may provide an alternative representation of geophysical and geological data or other imaging data.

Example of Real Data Full Azimuth Reflection Angle CIG Display

Figure 11:
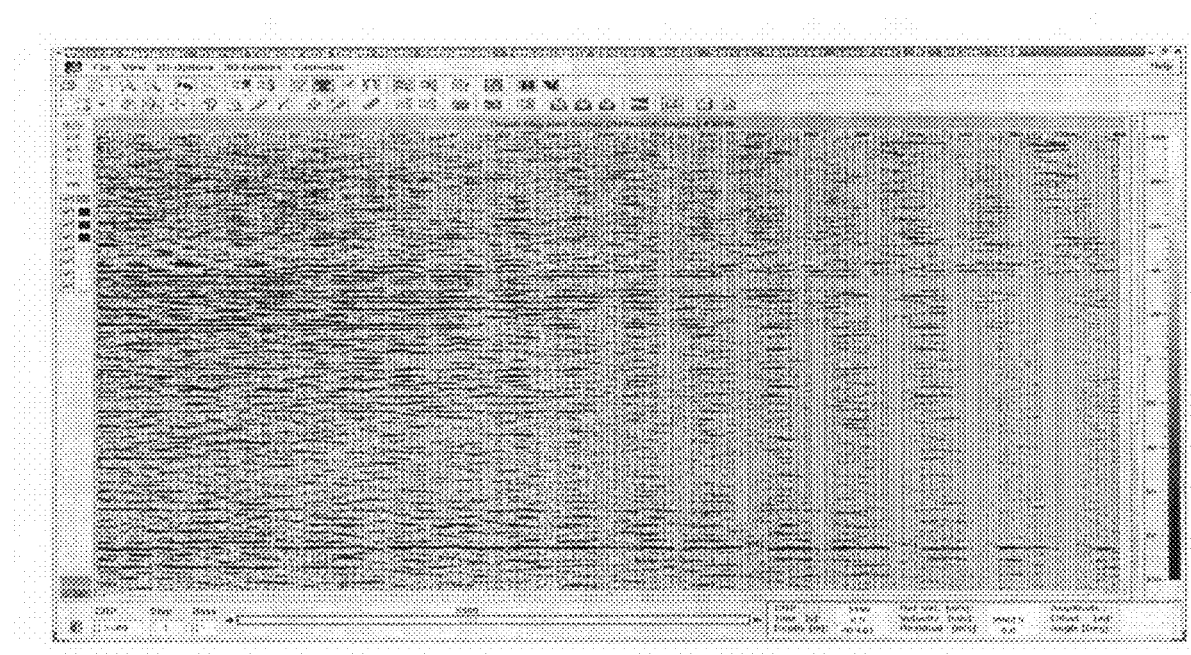
FIG. 11 is a real data example of a full azimuth reflection angle CIG display (e.g., referred to as a Spiral-R) for seismic data collected through a geophysical land survey according to an embodiment of the invention.

Reference is made to FIG. 11, which is a real data example of a full azimuth reflection angle CIG display (e.g., referred to as a Spiral-R) for seismic data collected through a geophysical land survey according to an embodiment of the invention. FIG. 11 may display a Spiral-R ADCIG constructed from seismic data collected during a geophysical land survey according to an embodiment of the invention. The seismic data used for constructing the Spiral-R may be recorded through substantially wide-azimuth acquisition survey using relatively low quality signals and relatively sparse acquisition grid parameters. Other seismic or imaging data may be used. The display 490 may show ADCIGs including for example approximately 400 traces (e.g., corresponding to 400 spiral nodes 355), each representing a reflectivity (e.g., specific values of both opening and opening-azimuth angles) using the uniform spherical spiral (e.g., Spiral-R) representation. A vertical or z-axis 470 may correspond to depth below the subsurface or signal source location and an x-axis 480 may correspond to a unified coordinate along the spiral line, e.g., a relative (e.g., normalized) area swept by the spiral coils or a relative arc length. A function defined with respect to the coordinates, x and z, and for example displayed, may be, for example, an angle dependent reflectivity. z-axis 470 may correspond to, for example, a range of approximately zero to approximately 4000 meter depth below the earth's surface. In some embodiments, the Spiral-R representation, for example, depicted in FIG. 10, may be a schematic illustration of the Spiral-R data representation depicted, for example, in FIG. 11. Traces in FIG. 11 may for example correspond to vertical lines for a fixed relative area swept (or relative arc length) and variable depth within the depth range.

Analysis of Directional and Reflection Spiral CIGs

Figure 12A:
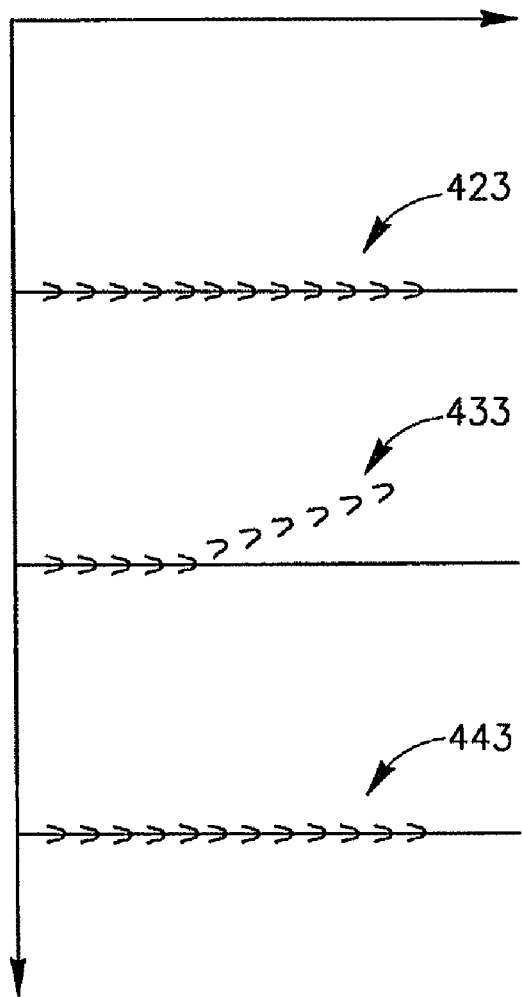
FIGS. 12A and 12B are schematic illustrations of displays of full azimuth ADCIG data representations, (e.g., referred to as Spiral-R and Spiral-D, respectively) of ray pair reflection angles and direction angles, respectively, according to an embodiment of the invention.
Figure 12B:
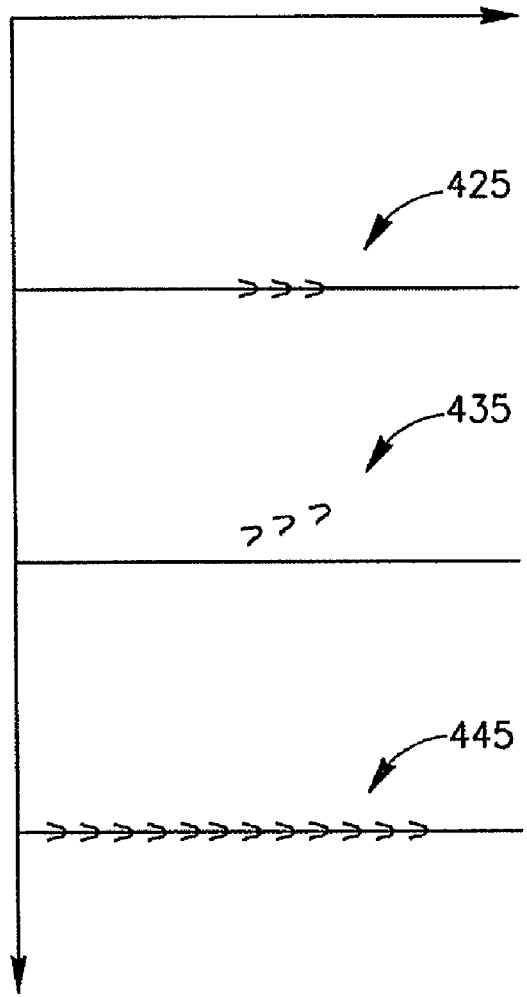

Reference is made to FIGS. 12A and 12B, which are schematic illustrations of displays of full azimuth ADCIG data representations, (e.g., referred to as Spiral-R and Spiral-D, respectively) of ray pair reflection angles and direction angles, respectively, according to an embodiment of the invention. In FIG. 12A, at various depths, the Spiral-R displays a relationship between image amplitude and the reflection angle system of a ray pair (e.g., including both the opening and opening azimuth angles of the ray pair). In FIG. 12B, at various depths, the Spiral-D displays a relationship between image amplitude and the direction angle system of a ray pair (e.g., including both the dip and azimuth angles of a ray pair normal). The velocity field may be determined at various depths using the combined Spiral-R and Spiral-D data displayed for determining the location and orientation of reflectors and the location of diffractors.

In some embodiments, Spiral-R gathers 423 and Spiral-D gathers 425 may depict reflection angles and direction angles 3D ADCIG, respectively, generated using a reflector with a substantially correct velocity field model. Reflected events along each of Spiral-R gathers 423 and Spiral-D gathers 425 may be substantially horizontal and/or flat at a given depth, for example, when a substantially correct velocity model is used. Such substantially horizontally reflected events may indicate that a reflection surface may be substantially uniformly illuminated or imaged using various opening and opening azimuth angles. In FIG. 12B, when a substantially correct velocity model is used, the Spiral-D gather 425 may have image amplitudes at substantially true depth levels, located in a neighborhood of the orientation of the reflection surface element. Spiral-D may include a function of image reflectors plotted against various (e.g., substantially all) directions of the ray-pair normal. Each direction may correspond to a different horizontal coordinate on the plot. However, the amplitude range of this function may lie within a window of a narrow horizontal width that corresponds to a true direction (e.g., the specular direction) or a very small range of directions of a physical reflection surface element. For spiral coordinate systems with a substantially large number of coils there may also be several periodically repeating sectors with high amplitudes for the reflectivity function.

In other embodiments, Spiral-R gathers 433 and Spiral-D gathers 435 may depict reflection angles and direction angles 3D ADCIG, respectively, generated using a reflector with a substantially incorrect velocity field model. Reflected events along each of Spiral-R gathers 433 and Spiral-D gathers 435 may be substantially non flat and/or curved (e.g., having a nonzero slope) at a given depth, for example, when a substantially incorrect velocity model is used. In one embodiment, the reflected events along each of Spiral-R gathers 433 and Spiral-D gathers 435 may curve upwards (e.g., with a positive slope), which may indicate that a migration velocity used at a point being imaged may be substantially below a correct migration velocity.

In other embodiments, Spiral-R gathers 443 and Spiral-D gathers 445 may depict reflection angles and direction angles 3D ADCIG, respectively, obtained by imaging in the vicinity of a diffractor with a substantially correct velocity field model. Reflected events along each of Spiral-R gathers 443 and Spiral-D gathers 445 may be substantially horizontal and/or flat at a given depth, for example, when a substantially correct velocity model is used. The reflected event, in this case, can be seen with any reflection angle in the Spiral-R and at any direction in the Spiral-D. Thus, FIGS. 12A and 12B correspond to three cases. The upper images, including Spiral-R gathers 423 and Spiral-D gathers 425, may correspond to a reflector with a substantially correct velocity, where the reflection occurs for only a definite orientation of the reflection surface, but for substantially all magnitudes and azimuths of the reflection angles. The middle images, including Spiral-R gathers 433 and Spiral-D gathers 435, may correspond to a reflector with an incorrect velocity. The lower images, including Spiral-R gathers 443 and Spiral-D gathers 445, may correspond to a diffractor with a correct velocity, where the diffraction occurs for any combination of the incident and reflected rays or for any orientation of the diffractor body surface and for any reflection angle magnitude and azimuth. In cases when the velocity is substantially correct, the Spiral-R and/or Spiral-D gathers may be substantially "flat". The reflector may be clearly seen for all reflection angles but with only a definite direction angle which corresponds to a physical reflection surface. Unlike the reflector, the diffractor typically dissipates energy in substantially all directions (e.g., and for substantially all opening angles).

Embodiments of the invention may provide a system and method for simultaneously generating and displaying (e.g., substantially juxtaposed or adjacent), 3D ADCIG data representations of ray pair reflection angles, Spiral-R, and 3D ADCIG data representations of ray pair direction angles, Spiral-D. Such simultaneous displays may provide geophysical exploration specialists with comparison capabilities and mathematical correlation tools for investigating and identifying subsurface structures. Displays described in reference to FIGS. 12A and 12B may simultaneously display various types of spiral gathers (e.g., Spiral-R and Spiral-D), for visualizing and interpreting data, as well as displaying various image areas, for example, from various angles and/or viewpoints (e.g., along a meridian or a specific latitude) in 2D and 3D graphics.

Displays described in reference to FIGS. 12A and 12B may include for example, a task-oriented and/or user-interactive display window with controls. Displays described in reference to FIGS. 12A and 12B, may aid interpreters to identify full-azimuth, angle domain residual moveouts, and for example, identify orientations of local reflecting surfaces.

Spiral Angle Domain Imaging Mechanisms

In various embodiments, 3D ADCIG data representations, for example, the Spiral-R and/or Spiral-D representations, of ray pair reflection angles and direction angles, respectively, may be generated using for example ray-based, full-azimuth angle domain imaging (Spiral-RADI) mechanisms or wave equation-based, full-azimuth angle domain imaging (Spiral-WADI) mechanisms.

Spiral-RADI: Ray-Based Full-Azimuth Angle Domain Imaging

Embodiments of the invention may include a Spiral-RADI, which may use a ray-based imaging tool for obtaining high-quality, amplitude-preserved, angle-dependent reflectivity images. The Spiral-RADI may be, for example, a target-oriented, multi-arrival migration that may for example use the whole wavefield within a controlled angle aperture. Ray tracing may be performed from image points in all directions oriented towards the surface, which may form a system for mapping recorded surface seismic data into the LAD at the image points.

Such migration mechanisms may be extremely versatile and may be performed, for example, using full volume and full aperture imaging. Such migration mechanisms may be operated, using, for example, PC clusters with a large amount of nodes. Such migration mechanisms may be run for specific small areas of interest with a model-driven aperture, which may result in substantially fast, high-resolution performance imaging.

The Spiral-RADI may support isotropy and anisotropy (e.g., TTI) models, and may have the ability to output a high-quality Spiral-R and/or Spiral-D. The angle gathers obtained by Spiral-RADI may be used, for example, for velocity model building (e.g., including tomography solutions) and for determining the orientation of local reflecting surfaces or faults. The ability to display azimuthal reflection events in a continuous fashion and to respectively pick azimuthal residual moveouts, makes this tomography very unique in the analysis of anisotropy effects. The image gathers may be further used for angle dependent amplitude analysis (AVA).

Spiral-WADI: Wave Equation Based Full-Azimuth Angle Domain Imaging

Two types of wave equation migrations are commonly used in seismic imaging. One may be based on the survey-sinking approach where both shot and receiver wavefields may be substantially simultaneously downward continued. The other may be a common shot migration (CSM) which may be more general and accurate and may use the entire recorded wavefield. Survey-sinking migration may be implemented through common azimuth migration, which may be suitable for example for narrow-azimuth marine data. Since in survey-sinking migration, only a single azimuth is typically migrated, the migration process may be relatively fast (e.g., compared to multi-azimuths or common shot migration).

In one embodiment of the invention, the uniform spherical spiral representation may generate full-azimuth angle domain image gathers within, for example, the common shot wave equation migration. At any image point, both wavefields, the down-going (or e.g., incident) and the up-going (or e.g., reflected and/or diffracted), may be decomposed into, for example, local plane waves. Angle domain image gathers may be formed using, for example, correlation, summation and binning of the four-dimensional angle components of the local plane waves (as discussed in more detail in the section entitled, "Local Angle Domain (LAD) Coordinate System"). The uniform spherical spiral representation may allow the dimensionality to be reduced from four to two, and may be used to significantly reduce the number of the output angle traces. Both Spiral-D and Spiral-R angle gathers may be created using the Spiral-WADI imaging tool. Although the creation of such 3D image gathers may require a relatively large amount of computation time, memory and disk space, the uniform spherical spiral angle representation may reduce such needs.

Spiral Tomography Mechanism

In some embodiments, seismic tomography mechanisms may be used for example to update and/or refine subsurface model parameters, such as seismic velocities and depths of horizons (or e.g., interfaces between geologically distinct layers).

According to some embodiments of the invention a full-azimuth angle domain tomography mechanism, for example, a Spiral-Tomo mechanism, may be used. Tomography mechanisms may, for example, use traveltime errors along incident and reflected rays. The Spiral-Tomo mechanism may be a tomography mechanism, which uses full-azimuth angle dependent traveltime errors that may be measured along reflection events of Spiral-R gathers, which represent reflectivity (e.g., including ray pair opening and opening azimuth angles) at all measured angles. Thus, the Spiral-Tomo mechanism may measure traveltime errors with respect to substantially all magnitudes and azimuths of opening angles measured, while conventional tomography mechanisms may measure traveltime errors with respect to a relatively few (e.g., one) azimuth angles. Thus, the Spiral-Tomo mechanism may provide substantially full-azimuth information for the detection of anisotropy effects with optimal accuracy.

In some embodiments, Spiral-D gathers represent the image, for example, as a function of local dips and/or azimuth angles of the waves (e.g., at reflection surfaces). Spiral-D may indicate a normal to a local reflection surfaces (e.g., providing specular direction). Ray tracing may be performed from an image point to a surface or signal source location (e.g., according to a Spiral-RADI mechanism) in order to generate a tomography matrix with a linear relationship between measured traveltime errors and model parameter updates. In some embodiments, using spiral image gathers may define ray pairs according to Spiral-R and Spiral-D angles. In some embodiments, a relatively small number of rays may optimally represent the 3D angle dependency within the model and data spaces. Concepts of data space and model space may be used in inversion problems, such as tomographic inversion. Data space may include traveltime errors for different ray pairs, and the volume of this space in conventional applications may be substantially large. The model space may include the characteristics of a medium (e.g., velocity and anisotropic parameters) and locations of the reflection and refraction horizons. The model parameters may be attached to the nodes of a coarse grid, and the volume of the model parameters may be relatively small. The spiraling geometry may reduce the volume of the data space needed for a substantially reliable inversion.

Seismic tomography may update and/or refine subsurface model parameters, such as seismic velocities and depth of horizons (e.g., interfaces between geological layers) using traveltime errors along incident and reflected rays (or e.g., waves).

In one embodiment, the Spiral-Tomo workflow may include, for example:

1) Direction angle gathers (Spiral-D) may be generated for example using the Spiral-RADI.
2) Dip and/or azimuth information of local reflecting surfaces (e.g., including specular directions) may be for example automatically picked.
3) High-quality, specular reflection angle gathers (e.g., Spiral-R) may be created.
4) Full-azimuth residual moveouts may be for example automatically picked.
5) Tomography may be performed by shooting ray pairs from the picked image points (e.g., surface elements), where the takeoff angles may be defined from the Spiral-R and Spiral-D angles.
6) A tomography matrix may be created using, for example, a least-squares mechanism.
7) A tomography equation set may be solved for retrieving, for example, anisotropy parameters and/or other model parameters.

Other operations or series of operations may be used.

Spheroid Spiral

Conventional imaging systems may assume that the information comes evenly from all directions within the range of interest (usually bounded, for example, by a conic surface). However, the quality of an image can be improved should we accumulate more info in a speculum direction and directions close to speculum, or—on the contrary—suppress the direction of lower interest. For this, in one embodiment of the invention, we may replace the imaging spherical spiral, for example, by a spiral on an oblate spheroid surface, where the direction of "reduced interest" or reduced data acquisition may coincide with the shorter axis of the oblate spheroid. The shorter axis may be normally the horizontal cross line direction, which may be normal to the course of the acquisition ship (in line). The polar (vertical) axis of the reference frame and the horizontal in-line axis may be long and equal. The cross-line axis may be different and short.

The spheroid imaging system can be attractive, for example, in cases where the sources and receivers are aligned in a narrow azimuth, rather than wide azimuth (e.g., marine narrow azimuth in seismic data acquisition). In this case, it can be assumed that the orientation of the physical data acquisition may be more dominant than the other directions, and therefore should be sampled more densely.

Technical Details of the Invention

Further details of embodiments for using a uniform spherical spiral, for example, for seismic data processing, imaging and analysis are described in more detail herein. For example, offset imaging techniques and the use of a planar spiral for offset imaging is described in Section A, entitled "Offset Domain Imaging Mechanism". For example, slant stack techniques and an example of estimating an optimal number of decomposed plane waves for a substantially accurate representation of a full wave field are described in Section B entitled "Slant Stack Imaging Mechanisms and Angle Discretization". For example, a relationship between an arc length and the zenith angle of the uniform spherical spiral is described in Section C, entitled, "Arc Length of Uniform Spherical Spiral". Comparison of a function "normalized arc length vs. zenith angle" with a function "normalized area swept vs. zenith angle" may be described in Section D entitled "Arc Length vs. Area Swept by Coils". A function for calculating the flux integral over the spherical surface with the uniform spherical spiral attached to this surface, is described in Section E entitled, "Integrating over a Spherical Surface with a Uniform Spherical Spiral". For example, the function may be an integral with a one-dimensional or scalar integration variable that may be an arc length of the uniform spherical spiral or the area swept by the coils. The discretization of nodes along the uniform spherical spiral is described in Section F entitled, "Uniform Area Discretization of the Spherical Spiral". The nodes may, for example, be positioned along the arc length in such a way that there is an equal area swept between successive nodes and approximately equal arc length between the successive nodes. The area swept between successive nodes may be used as an integration parameter in the imaging integral. For example, a relationship between a design or elevation parameter k of the uniform spherical spiral and a maximum zenith angle and/or an aspect-ratio parameter is described in Section G entitled, "Design of the Uniform spherical spiral". For example, a spiral binning mechanism to parameterize dual-variable data representations to generate single-variable data representations using normalization methods is described in Section H entitled, "Binning Index of a Uniform Spherical Spiral". Such characteristics may be set and/or adjusted automatically, manually, or according to user-selected and/or predetermined settings. Although specific coordinate systems may be used in these sections, it may be apparent to one skilled in the art that the present invention may use any appropriate coordinate system. Section I entitled "Local Angle Domain (LAD) Mechanisms" describes the technical details related to Local Angle Domain coordinate system.

Sections Providing Detailed Technical Information

Section A: Offset Domain Imaging Mechanism

In some embodiments, CIGs may be represented in the offset domain. In some embodiments, geophysical data may be plotted in relation to a two-dimensional offset representation. The offset may be a measure of distance/and or orientation between a source and a receiver of energy on the earth's surface used to generate geophysical data. The offset may be measured as a scalar or one-dimensional value such as distance, or it may be measured as a vector or two-dimensional value, such as an offset distance and an offset azimuth angle. In embodiments relating to wide-azimuth data acquisition, defining the offset by a two-dimensional value may provide more accurate and/or extensive data. In embodiments where data is acquired using a wide-azimuth acquisition, 3D CIGs may include traces having, for example, substantially different offset lengths and different offset azimuths. An offset represented by two variables in a polar coordinate system, for example, one variable defining an offset distance and another variable defining an offset azimuth angle, may be represented by a single variable, for example, one variable defining both the offset distance and the offset azimuth angle in the uniform planar spiral coordinate system.

In embodiments such as for example offset domain embodiments, a uniform planar spiral representation of data points may be used instead of the uniform spherical spiral representation. Instead of zenith and azimuth angles that simultaneously vary along the length of the uniform spherical spiral, radii and azimuth angles may simultaneously vary along the length of the uniform planar spiral. A parameterization may be used to convert or map two-dimensional data in a dual-variable coordinate system represented by two independent variables, for example, the offset distance and the offset azimuth angle, to one-dimensional data in the uniform planar spiral coordinate system. Such a parameterization may be defined, for example, by a relationship between radii (e.g., half of the offset distances) and the offset azimuth angles. In other embodiments, other dual variable coordinate systems such as a Cartesian coordinate system may be used. It may be appreciated that any of various planar spirals may be used, which may or may not be uniform. One example of a planar spiral that may be used according to some embodiments of the invention is an "Archimedes spiral", having a radius that may be proportional to an azimuth angle. For example, such a planar spiral may be defined by a relationship, $H(\phi)=k\phi$, where H may be for example half of the offset magnitude, and $\phi$ may be the offset azimuth. A normalized configuration of nodes (e.g., having uniform area segments between the successive nodes) may be used, for example, in a way similar to embodiments described in reference to the uniform spherical spiral.

Section B: Slant Stack Imaging Mechanisms and Angle Discretization

Imaging mechanisms according to embodiments of the invention may, for example, include slant stack mechanisms. These mechanisms, may, for example, be used for imaging seismic events having substantially the same emergence angle at the sources or arrival angle at the receivers, or incident or reflected/diffracted angles at the image points. For example, a slant stack mechanism may describe a relationship between a wave field value and a wave field propagation direction, such as a lateral slowness direction of the wave field. A wave field may depict a distribution of values of parameters that describe a medium or a state of geophysical structures. Such parameters may describe features such as pressure and/or components of particle displacements with respect to spatial coordinates, spatial wave numbers, time, and/or frequency. The magnitude of the slowness vector may be the reciprocal of the phase velocity magnitude. The slowness vector may have for example three Cartesian components, two of which may be lateral (e.g., horizontal), and the third of which may be vertical. The direction of slowness may coincide with the direction of the phase velocity, and the direction of lateral slowness may coincide with the direction of the lateral phase velocity. In some embodiments, the phase velocities may be the velocities of the propagating wave front of the wave field. Wave propagation may also be described by an additional vector describing a velocity of the ray energy propagation. In some embodiments, for a wave field for example, through an anisotropic medium or model, the velocities of ray energy propagation and the velocities of wave front propagation need not coincide and may have different directions and magnitudes.

In some embodiments, the slant stack mechanisms may decompose a wave field into multiple plane wave components. Each plane wave component may, for example, be a component of the wave field having a different direction of propagation. In one embodiment, the slant stack mechanism may be performed, for example, in the frequency domain, using a Fourier transform or the like, or in the time domain, using a Radon transform or the like.

In one embodiment, the wave field may be decomposed in the frequency domain, for example, by applying a temporal Fourier transform to the wave field, followed by applying a spatial Fourier transform. For example, the temporal Fourier transform may be a one-dimensional transform (e.g., from time to frequency or vice versa) and the spatial Fourier transform may be a two-dimensional transform. For example, the temporal and spatial Fourier transforms may be applied to the wave field as follows:

$$\tilde{P}(x,y,\omega) = F_{t \to \omega}[P(x,y,t)],$$
$$\tilde{\tilde{P}}(k_x, k_y, \omega) = F_{(x,y) \to (k_x, k_y)}^2 [\tilde{P}(x, y, \omega)], \quad (10)$$

where

P(x,y,t) may be a wave field in the space and time domain;

$\tilde{P}(x,y,\omega)$ may be a one-dimensional temporal Fourier transform of P(x,y,t);

$\tilde{\tilde{P}}(k_x, k_y, \omega)$ may be a two-dimensional spatial Fourier transform of $\tilde{P}(x,y,\omega)$; and $k_x$ and $k_y$ may be lateral wave numbers in the direction of the x-axis and y-axis, respectively.

In some embodiments, the slant stack mechanism may provide two lateral slowness direction components of the wave field, $p_x$ and $p_y$, in the direction of an x-axis and y-axis, respectively, for example, by dividing each of the wave numbers, $k_x$ and $k_y$, by a temporal frequency, $\omega$, for example as follows:

$$p_x = k_x/\omega, \ p_y = k_y/\omega \quad (11)$$

In some embodiments, the slant stack mechanism may provide a third (e.g., vertical) slowness component of the wave field, $p_z$, in a direction of the z-axis, for example, by applying a function to the lateral slowness components $p_x$ and $p_y$. The function relates to the physical properties of the medium associated with a location of the target surface being imaged, for example, as follows:

$$p_z = f[p_x, p_y, \text{medium properties}(x,y,z)] \quad (12)$$

The slant stack mechanism may provide a relationship between the wave field and lateral slowness directions of the wave field, for example, including the following mapping:

$$\tilde{\tilde{P}}(k_x, k_y, \omega) \to \tilde{U}(p_x, p_y, \omega), \quad (13)$$

where $\tilde{U}(p_x, p_y, \omega)$ may represent slant stack data in the frequency domain.

It may be noted that current slant stack mechanisms typically provide relationships between a wave field and lateral wave numbers or lateral slowness components.

In some embodiments, the slant stack mechanism may apply inverse Fourier transform mapping slant stack data, $\tilde{U}(p_x, p_y, \omega)$, from the frequency domain to the time domain, for example, as follows:

$$U(p_x, p_y, t) = F_{\omega \to t}^{-1} \tilde{U}(p_x, p_y, \omega) \quad (14)$$

Alternatively, a slant stack mechanism may generate slant stack data exclusively in the time domain, for example, using the Radon transform, as follows:

$$U(p_x, p_y, \tau) = \int_{-\infty}^{\infty} \int_{-\infty}^{\infty} P(x, y, \tau = t - p_x x - p_y y) dx dy, \quad (15)$$

where $\tau = t - \Delta t$ may represent a time shift by a negative time delay, $\Delta t$, where the time delay, $\Delta t$, may be defined by the two lateral slowness components and a running lateral location, which may be the internal parameter of integration.

Embodiments of the present invention may provide three slowness components of the wave field, $p_x$, $p_y$, and $p_z$, for example, represented in a dual-variable coordinate system, such as a Cartesian coordinate system. The slowness components, $p_x$, $p_y$, and $p_z$, may be represented, for example, by a zenith angle, an azimuth angle, and the absolute value of slowness, p, as follows:

$$\cos\theta = \frac{p_z}{p}, \quad (16)$$
$$\cos\varphi = \frac{p_x}{p_h},$$
$$\sin\varphi = \frac{p_y}{p_h},$$
$$p_h = \sqrt{p_x^2 + p_y^2},$$
$$p = \sqrt{p_h^2 + p_z^2},$$

Where $p_h$ may be the lateral slowness magnitude.

In one embodiment, two components θ and φ (e.g., represented in the dual-angle Cartesian coordinate system) may be transformed or mapped to one-dimensional components, using, for example, a uniform spherical spiral parameterization of slant stack data that may be continuous and/or one-to-one, according to some embodiments of the invention. The uniform spherical spiral parameterization described herein may be used as an example for reducing the dimensionality or volume of data. Other methods may be used. In one embodiment, the uniform spherical spiral parameterization may include combining the relationship between dual-angled components, for example, defined in equation (16), with a relationship between the two variables of the polar angle, θ and φ, that may be continuous and/or one-to-one, for example, defined in equation (1). Other formulae or series of formulae may be used. Embodiments of a uniform spherical spiral parameterization of data are discussed in further detail, herein. It may be appreciated by those skilled in the art that embodiments of the present invention may include other parameterizations, coordinate systems, functions and/or transforms and/or different dimensionalities thereof.

Slant-stack mechanisms including, for example, interpolation mechanisms for traces, mechanisms for filtering dip angle data, multiple suppression mechanisms, refraction inversion mechanisms, wave equation and Kirchhoff migration mechanisms, and mechanisms for analyzing velocities of seismic data points, that may be used according to embodiments of the invention, may be described, for example, in Yilmaz, O., 1994, Seismic Data Processing, published by the Society of Exploration Geophysics, Tulsa. Other slant-stack mechanisms may be used. In some embodiments, the slant-stack mechanism may be used to generate CIGs using wave equation migration mechanisms. Applying uniform spherical spiral parameterizations may reduce the amount or dimension of plane wave data used to represent a wave field, thereby reducing the computation efficiency required to sample direction-dependent data for generating slant-stack data, as demonstrated herein. In some embodiments, imaging mechanisms according to embodiments of the invention may use local beam stack mechanisms, for example, including pre-stack Gaussian beam migration mechanisms, described, for example, in Hill, N. R., 2001, Geophysics 66 (4), pp. 1240-1250 and target-oriented beamlet migration mechanisms based on Gabor-Daubechies frame decomposition described, for example, by Chen, L., R. S. Wu, and Y. Chen, 2006, in Geophysics 71 (2), pp. 37-52. Other beam stack mechanisms may be used. A local beam may be generated using local slant-stack mechanisms, described according to embodiments of the invention. Applying uniform spherical spiral parameterizations according to embodiments of the invention may reduce the amount or dimension of beam data used to generate migration traces.

Conventional imaging algorithms may require relatively dense samplings of the directions of the plane wave components of wave fields. For example, during wide-azimuth imaging, each plane wave may be generated by a slant-stack mechanism according to embodiments of the invention. One embodiment of the invention may include estimating a sufficient number of, for example, in-line directional components, for obtaining quality images. A spherical grid, for example, with a uniform discretization of the two polar angle components $\Delta\theta$=const and $\Delta\phi$=const, may have cells of uneven areas $\Delta A$, $$\Delta A = R^2 \sin\theta \cdot \Delta\theta \Delta\phi \neq \text{const}, \quad (17)$$

where R=1 is unit radius. The cell areas may reach maximum at the vicinity of the equator, $\theta=\pi/2$. The cell areas may have smaller values at moderate latitudes, and the cell areas may almost vanish at the poles, $\theta=0$ (north pole) and $\theta=\pi$ (south pole). The amount of nodes in such grid may be, approximately $$N_p^{grid} = \frac{\pi}{\Delta\theta} \cdot \frac{2\pi}{\Delta\varphi} = \frac{2\pi^2}{\Delta\theta \cdot \Delta\varphi} \quad (18)$$

In some embodiments, the area of a cell in the proximity of the equator, $\theta \approx \pi/2$, may be, for example $$\Delta A \approx \Delta\theta \Delta\phi. \quad (19)$$

Alternatively, we a uniform spherical spiral grid with equal-area segments $\Delta A$=const, may be used according to the embodiment of the invention. In this case the value $\Delta A$ may be selected and may be the same as the cell area in the proximity of the equator of the spherical grid (equation (19)), and the number of grid nodes may be, approximately $$N_p = \frac{A}{\Delta A} = \frac{4\pi}{\Delta\theta \cdot \Delta\varphi}, \quad (20)$$

which may be less than the number of grid points in the spherical grid, $$N_p^{grid}/N_p = \pi/2 \quad (21)$$

According to the embodiment of the invention, an optimal imaging can be obtained by even smaller number of nodes $N_p$. This further reduction may be due to continuity and simultaneous change of both components of a polar angle along the spiral line and due to a discretization with equal-area segments.

For grid resolution values $\Delta\theta$ and $\Delta\phi$ in degrees rather than in radians, the conversion relationship may be $$\Delta\theta = \frac{\pi \Delta\theta^\circ}{180} \text{rad}, \quad (22)$$

$$\Delta\varphi = \frac{\pi \Delta\varphi^\circ}{180} \text{rad}.$$

The number of directional components for the spherical spiral grid may be, for example, $$N_p = \frac{4 \cdot 180^2}{\pi \Delta\theta^\circ \Delta\varphi^\circ} \approx \frac{4 \cdot 10^4}{\Delta\theta^\circ \Delta\varphi^\circ}. \quad (23)$$

Assuming, for example, $\Delta\theta^\circ = \Delta\phi^\circ = 2^\circ$, then the number of directional components becomes, for example, $N_p \approx 10,000$. For the upward directions only, which may correspond to the nodal points in the northern hemisphere, this number may reduce, for example, to $N_p = 5,000$.

The number of directional components may be also estimated, for example, following the sampling rule. It may be considered first, for example, the in-line lateral direction. The slant stack should obey the sampling rule of the Discrete Fourier Transform, $$\omega \cdot \Delta p_x \leq \Delta k_x, \quad (24)$$

where $\omega = 2\pi f$ may be the angular frequency, $f$ may be the frequency, $p_x$ is the in-line lateral slowness, $\Delta p_x$ is the in-line lateral slowness increment, and $\Delta k_x$ may be increment (i.e., step) of the in-line lateral wave-number. The lateral slowness in the in-line direction may be $$p_x = \frac{\Delta t}{\Delta x} = \frac{\sin\alpha}{V}, \quad (25)$$

where $\alpha$ may be the ray angle, and V may be a characteristic medium velocity. The inline slowness increment $\Delta p_x$ may be, for example, $$\Delta p_x = \frac{p_{max} - p_{min}}{N_{px}} = \frac{\sin\alpha_{max} - \sin\alpha_{min}}{N_{px} \cdot V}, \quad (26)$$

where $p_{max}$ and $p_{min}$ may be the maximum and the minimum lateral slowness in the lateral in-line direction, $\alpha_{min}$ and $\alpha_{max}$ may be the minimum and the maximum ray angles, respectively, and $N_{px}$ may be the number of directional components for an in-line. For the upward directions, the range of the ray angles may be $$-\pi/2 \leq \alpha \leq \pi/2 \rightarrow \sin \alpha_{max} - \sin \alpha_{min} = 2 \qquad (27)$$

The in-line slowness increment then may be, for example, $$\Delta p_x = \frac{2}{N_{px} \cdot V}. \qquad (28)$$

With the use of the sampling rule, equation (24), the number of directional components may become, for example, $$N_{px} = \frac{2}{\Delta p_x \cdot V} \geq \frac{2 \cdot 2\pi f}{\Delta k_x \cdot V}. \qquad (29)$$

The step of the in-line lateral wave-number may be, for example, $$\Delta k_x = 2\pi/L_x, \qquad (30)$$

where $L_x$ may be the size of the aperture, for example, above the image point, in the in-line direction. Then finally, the number of directional components may be, for example:

$$N_{px} \geq 2L_x f/V, \qquad (31)$$

A similar estimation for a sufficient number of cross-line components or components laterally normal to the in-line direction, $N_{py}$, may be used, $$N_{py} \geq 2L_y f/V. \qquad (31)$$

Thus, the total number of lateral slowness direction components may be, for example:

$$N_p = N_{px} \cdot N_{py} \geq 4L_x L_y f^2/V^2 = 4Sf^2/V^2, \qquad (32)$$

where $$S = L_x L_y \qquad (33)$$

may be the area of a rectangular aperture, and $L_x, L_y$ are the lengths of its sides in the in-line and cross-line directions, respectively.

In a demonstrative embodiment, where $L_x = L_y = 10$ km, $f = 50$ Hz, $V = 2$ km/s, $N_{px} = N_{py} \approx 500$, and the total estimated number of lateral slowness direction plane wave components may be $N_p \approx 250,000$. For a smaller aperture, for example, $L_x = L_y = 1$ km, the required number of directions may be $N_p \approx 2,500$.

Alternatively, one may assume that the amount of plane wave components is given, and the maximum allowed size of the aperture may be estimated, to obtain quality image. Assume, for example, a squared aperture, $L_x = L_y \equiv L$. Then the size L of the aperture above the image point may be, approximately $$N_p \geq 4L^2 f^2/V^2 \rightarrow L \leq \frac{V\sqrt{N_p}}{2f}. \qquad (34)$$

Assume, for example, the total number of plane waves $N_p = 5000$, the medium velocity $V = 2$ m/s, and the maximum frequency $f = 50$ Hz. In this case, the side of the squared aperture may be $L \leq 1.4$ km.

It may be appreciated that the values used in the example herein are used for illustrative purposes only and are not meant to be limiting. Other values may be used. These calculations demonstrate that by applying the uniform spherical spiral parameterizations, the number and dimension of direction-dependent lateral slowness components required for generating a specific resolution of slant-stack data may reduce volume data, for example, by about one order or by about a factor of ten, as compared with conventional mechanisms. For example, a volume of seismic data represented in a conventional, for example, a dual-angle coordinate system, may be greater, for example, than a volume of the corresponding seismic data, parameterized by a uniform spherical spiral mechanism. It may be appreciated by those skilled in the art that similar estimations may be used for imaging using ray-based Kirchhoff migrations, as described herein.

Section C: Arc Length of Uniform Spherical Spiral

A relationship between arc length and zenith angle for data points along the uniform spherical spiral may be derived, for example, as follows; other methods may be used.

For the purpose of demonstration, a data point, such as a data point 330, described in reference to FIG. 4, may be defined in relation to origin 360, for example, by a measure of zenith angle 310. A relationship defined between the Cartesian coordinate system and uniform spherical spiral coordinate system may include, for example:

$$x = R \cdot \sin \theta \cdot \cos \phi, y = R \cdot \sin \theta \cdot \sin \phi, z = R \cdot \cos \theta. \qquad (35)$$

For example, in some embodiments, for a unit sphere, $R = 1$ and equation (35) simplifies to:

$$x = \sin \theta \cdot \cos \phi, y = \sin \theta \cdot \sin \phi, z = \cos \theta. \qquad (36)$$

Combining equations (1) and (36) gives:

$$x = \sin \theta \cdot \cos(k \cdot \theta), y = \sin \theta \cdot \sin(k \cdot \theta), z = \cos \theta. \qquad (37)$$

A change in arc length (e.g., referred to as an arc length differential) for data points (x,y,z), along the uniform spherical spiral may be defined, for example, as follows:

$$ds = \sqrt{dx^2 + dy^2 + dz^2} \rightarrow \frac{ds}{d\theta} = \sqrt{\left(\frac{dx}{d\theta}\right)^2 + \left(\frac{dy}{d\theta}\right)^2 + \left(\frac{dz}{d\theta}\right)^2}. \qquad (38)$$

Using equation (38), a change in the coordinates of data points 330 on the uniform spherical spiral with respect to a change in the zenith angle 310 of the uniform spherical spiral may be defined, for example, as follows:

$$dx/d\theta = \cos \theta \cdot \cos(k \cdot \theta) - k \cdot \sin \theta \cdot \sin(k \cdot \theta)$$

$$dy/d\theta = \cos \theta \cdot \sin(k \cdot \theta) + k \cdot \sin \theta \cdot \cos(k \cdot \theta).$$

$$dz/d\theta = -\sin \theta \qquad (39)$$

Using equation (39), it may be derived that:

$$\left(\frac{dx}{d\theta}\right)^2 + \left(\frac{dy}{d\theta}\right)^2 + \left(\frac{dz}{d\theta}\right)^2 = \sin^2\theta + \cos^2\theta \cdot \cos^2(k \cdot \theta) + k^2 \cdot \qquad (40)$$

$$\sin^2\theta \cdot \sin^2(k \cdot \theta) - 2k \cdot \sin\theta \cdot \cos\theta \cdot$$

$$\sin(k \cdot \theta) \cdot \cos(k \cdot \theta) + \cos^2\theta \cdot$$

$$\sin^2(k \cdot \theta) + k^2 \cdot \sin^2\theta \cdot \cos^2(k \cdot \theta) +$$

$$2k \cdot \sin\theta \cdot \cos\theta \cdot \sin(k \cdot \theta) \cdot \cos(k \cdot \theta) +$$

$$= 1 + k^2 \cdot \sin^2\theta$$

Using equation (40), a change in the arc length with respect to a change in zenith angle 310 (e.g., referred to as the arc length derivative) may be defined, for example, as follows:

$$\frac{ds}{d\theta} = \sqrt{1+k^2\sin^2\theta}. \tag{41}$$

For example, in some embodiments, a starting node may be located at the north pole of the uniform spherical spiral, for example, at pole 390. The zenith angle 310 at north pole 390 and south pole 395, may be zero and $\pi$ radians, respectively. Therefore, the length of the uniform spherical spiral may be, for example:

$$s(\theta) = \int_0^\theta \sqrt{1+k^2\sin^2\tilde{\theta}} \, d\tilde{\theta} \tag{42}$$
$$= \sqrt{1+k^2} \cdot E(\alpha, m) - \frac{k^2\sin\theta\cos\theta}{\sqrt{1+k^2\sin^2\theta}},$$

where $E(\alpha, m)$ may be an elliptic integral of the second kind, having a parameter $\alpha$ and a modulus m, where $$\alpha = \arcsin\frac{\sqrt{1+k^2}\sin\theta}{\sqrt{1+k^2\sin^2\theta}}, \tag{43}$$
$$m = \frac{k}{\sqrt{1+k^2}}.$$

Elliptic integrals of the first and second kind, F and E, respectively, may be defined, for example, as follows:

$$F(\theta, m) = \int_0^\theta \frac{d\tilde{\theta}}{\sqrt{1-m^2\sin^2\tilde{\theta}}} \quad 0 \le \theta \le \pi/2 \tag{44}$$
$$E(\theta, m) = \int_0^\theta \sqrt{1-m^2\sin^2\tilde{\theta}} \, d\tilde{\theta}$$

According to some embodiments of the invention, zenith angle 310, $\theta$, described in reference to FIG. 4, may assume values in a range of zero to $\pi$ radians. The arc length of the uniform spherical spiral at data points 335 defined by zenith angles 310 in the range of $\pi/2<\theta\le\pi$, (e.g., in the southern hemisphere) may include relationships for example as follows:

$$s(\theta)=s(\pi)-s(\pi-\theta)=2\cdot s(\pi/2)-s(\pi-\theta), \tag{45}$$

where $s(\pi/2)$ is proportional to the full elliptic integral of the second kind for a modulus m, where $$s(\pi/2) = \sqrt{1+k^2} \cdot E(m), \tag{46}$$
$$m = \frac{k}{\sqrt{1+k^2}}.$$

Figure 7A:
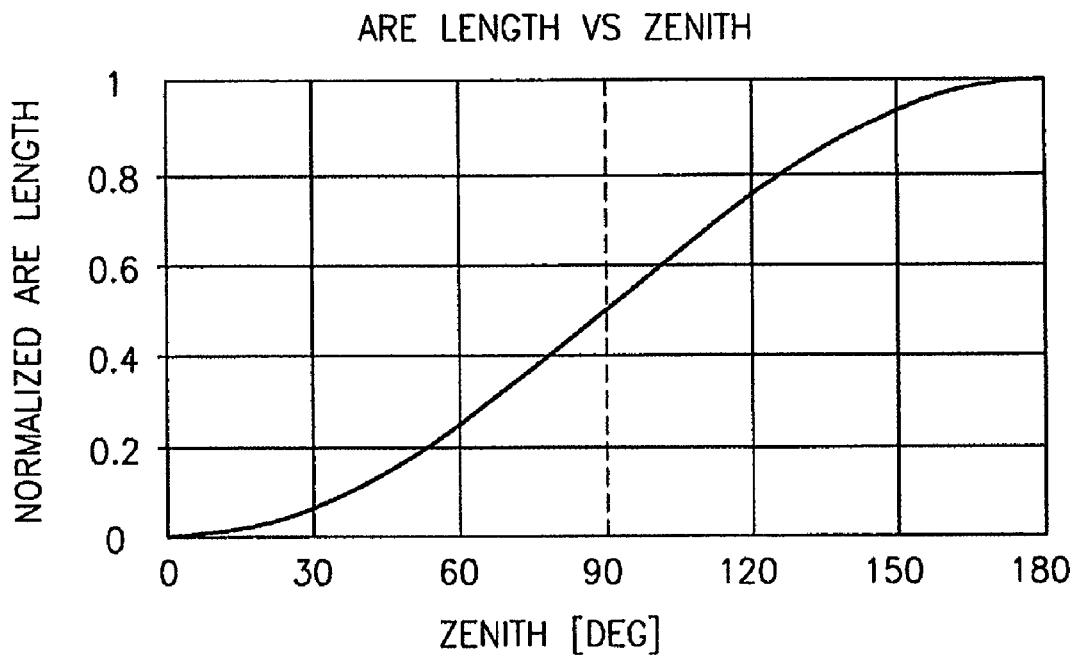
FIG. 7A is a graph illustrating a relationship between the arc length and the zenith angle along the spherical spiral according to an embodiment of the invention.
Figure 7B:
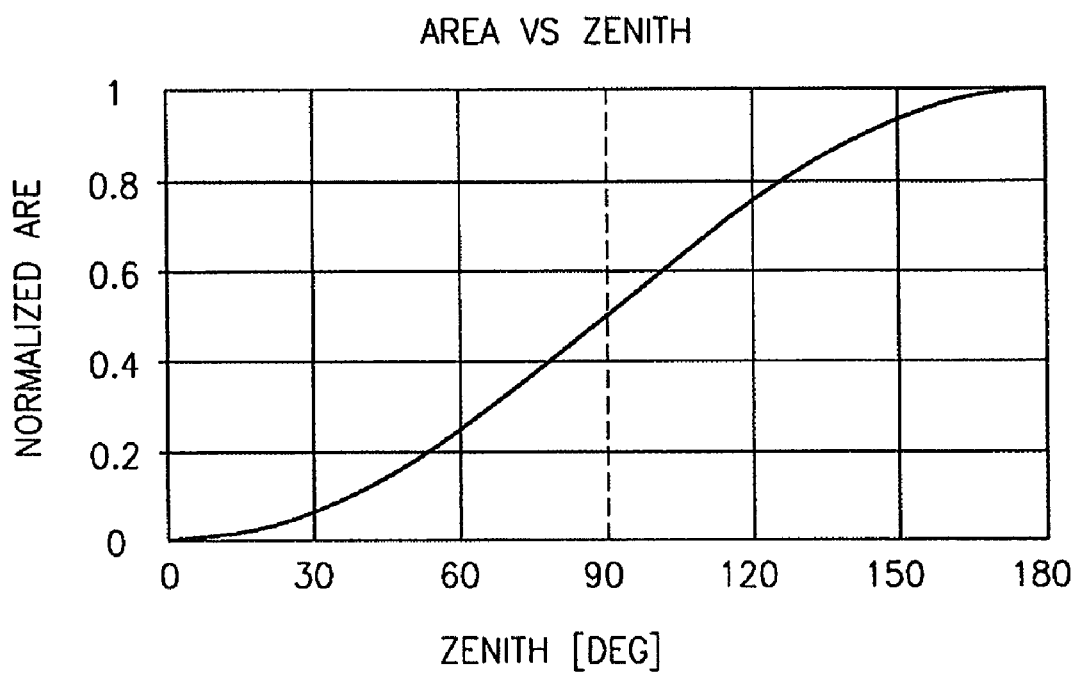
FIG. 7B is a graph illustrating the relationship between the area swept by the spiral coils and the zenith angle along the spherical spiral according to an embodiment of the invention.

Other formulae or series of formulae may be used.
Section D: Arc Length vs. Area Swept by Coils Reference is made to FIGS. 7A and 7B, which are graphs illustrating the relationship between the arc length and the zenith angle along the spherical spiral, and the relationship between the area swept by the spiral coils and the zenith angle along the spherical spiral, respectively, according to an embodiment of the invention. In some embodiments, the zenith angles may define data points along a uniform spherical spiral. Other coordinate systems, parameterizations, functions and/or shapes may be used. The relationship between arc lengths and zenith angles in one embodiment, for example, where the zenith angles are in the range of $\pi/2<\theta\le\pi$ (e.g., in the southern hemisphere), may be defined, for example, according to equation (45). Data points along a uniform spherical spiral (e.g., data points 330 and 335) may be defined by zenith angles (e.g., zenith angles 310), for example, according to a uniform spherical spiral parameterization, discussed herein. FIG. 7A may include normalized arc lengths and FIG. 7B may include normalized areas swept by the uniform spherical spiral. For example, values of the arc lengths along the uniform spherical spiral may be divided by the full length of the spiral. Areas swept by the uniform spherical spiral may be divided by the full area of the spherical surface (e.g., $4\pi R^2$). In embodiments where the spherical surface has unit radius, the full area of the spherical surface may be, for example, $4\pi$. In the embodiments depicted in FIGS. 7A and 7B, for example, $\theta_{max}=\pi$ or and $n_{coils}=21$. Of course, other number of coils and other parameters are possible.

Section E: Integrating Over a Spherical Surface with a Uniform Spherical Spiral

Embodiments of the invention may provide a system and method for integrating arbitrary functions over the spherical surface with a uniform spherical spiral, for example, using an integral having a one-dimensional integration variable. In one embodiment, the integration variable may include, for example, arc lengths along the uniform spherical spiral. In another embodiment, the integration variable may include, for example, area swept by the coils of the uniform spherical spiral.

The nodes along the spiral may be discretized according to some embodiments of the present invention. In some embodiments, the nodes may be equally spaced along the arc length of the spiral. In other embodiments, the nodes may be arranged in such a way that the area segments swept by the spiral between two successive nodes may be substantially equivalent. Other arrangements of nodes are possible. Embodiments using such discretization may simplify integration over a spherical surface with the uniform spherical spiral, using area swept as the integration variable.

In some embodiments of the invention, imaging may include integrating over a spherical surface with the uniform spherical spiral. In some embodiments, integrating may include estimating integrals along the arc length of a uniform spherical spiral, where an integrand function may be defined, for example, at discrete nodes along the spiral. For example, an integrand function, $f(\theta,\phi)$, may be a bounded, continuous and/or piecewise continuous function, that may be defined at substantially every location along the uniform spherical spiral. However, typically the function may only be specified at discrete nodes along the uniform spherical spiral.

Embodiments of the invention may provide estimated solutions for integrals, I, having integrand function, for example, $f(\theta,\phi)$, at substantially every location along the uniform spherical spiral. For example:

$$I = \int\int_A f(\theta, \varphi) dA, \tag{47}$$

where $$dA = R^2 \sin\theta d\theta d\varphi,$$

where A may be a full surface of a unit sphere. For example, in some embodiments R=1 and equation (47) simplifies to:

$$I = \int\int_A f(\theta, \varphi) dA \qquad (48)$$
$$= \int_0^\pi \int_0^{2\pi} f(\theta, \varphi) \sin\theta d\varphi d\theta.$$

Figure 6:
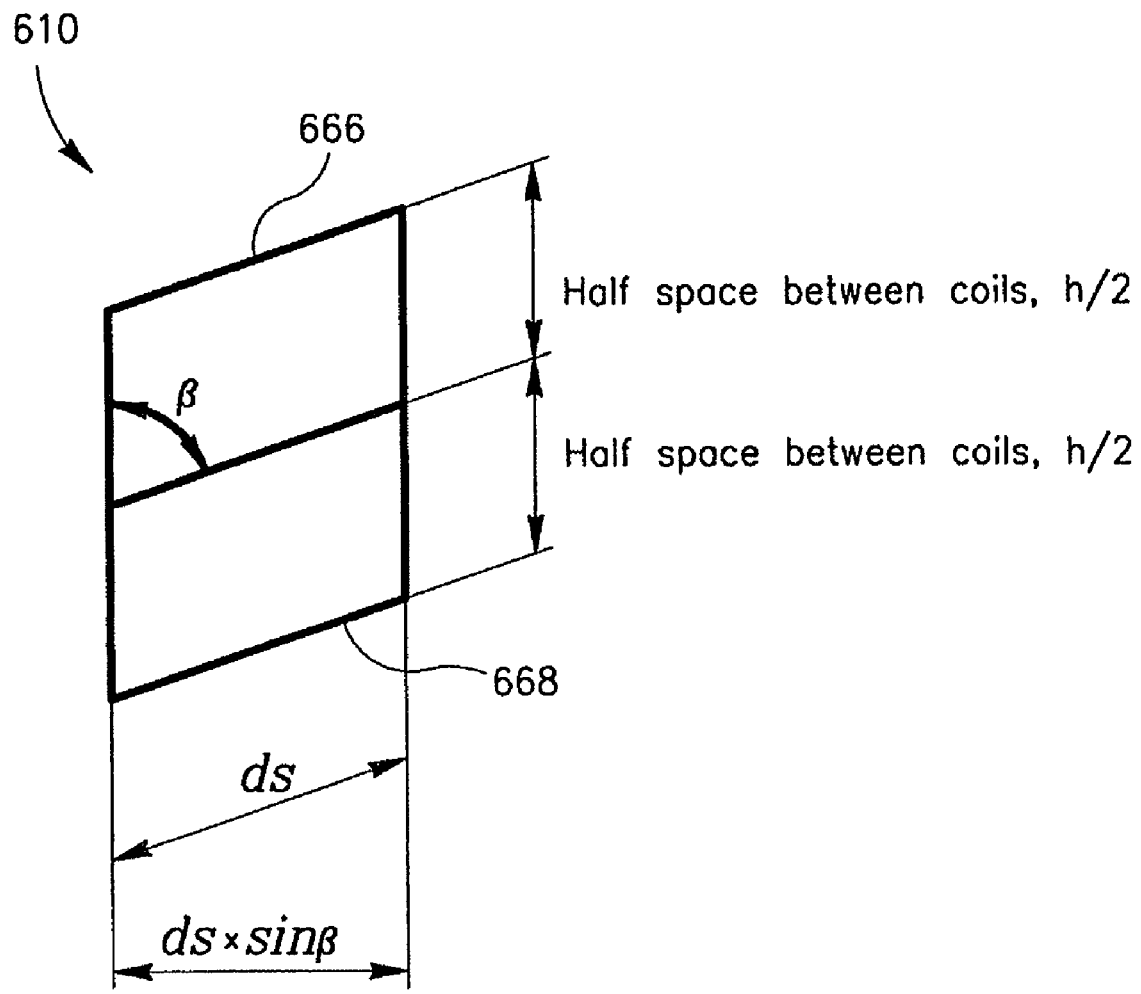
FIG. 6 is a schematic illustration of an area element swept by the uniform spherical spiral according to an embodiment of the invention.

Reference is made to FIG. 6, which is a schematic illustration of an area element swept by the uniform spherical spiral according to an embodiment of the invention. The area element may be approximated by, for example, a parallelogram, with length equal to the distance between the successive nodes along the spiral arc length, ds, and a height, h, for example, equal to the distance between the successive coils along a meridian direction, with an angle β therebetween, as shown in FIG. 6. The area element, dA may, for example, be approximated as follows:

$$dA = h \cdot ds \cdot \sin\beta. \qquad (49)$$

In some embodiments, the height, h, of the parallelogram approximating the area element, dA, may be a finite distance between the successive coils, for example, measured along a meridian line, and the length, ds, may be infinitesimal.

The following may be derived, for example, using standard algebra:

$$h = \frac{\pi R}{n_{coils}} = \frac{2\pi R}{k}; \qquad (50)$$

and $$ds \cdot \sin\beta = R \cdot \sin\theta d\varphi, \qquad (51)$$

where ds·sin β may be a projection of the infinitesimal parallelogram length, ds, onto a vector normal to the meridian line (e.g., a latitude line), as shown in FIG. 6.

Using a uniform spiral parameterization, for example, defined by equation (1), gives, for example:

$$\varphi = k \cdot \theta \text{ and } d\varphi = k \cdot d\theta \qquad (52)$$

For example, in embodiments when R=1, the area element, defined by equation (49), simplifies, for example, to:

$$dA = \frac{2\pi R}{k} \cdot R\sin\theta k d\theta \qquad (53)$$
$$= 2\pi \sin\theta d\theta.$$

Use of the arc length derivative, for example, defined by equation (41), gives, for example:

$$d\theta = \frac{ds}{\sqrt{1 + k^2 \cdot \sin^2\theta}}, \qquad (54)$$

$$\sin\beta = \frac{k\sin\theta}{\sqrt{1 + k^2 \cdot \sin^2\theta}}.$$

Therefore, the area element may be defined, for example, as follows:

$$dA = \frac{2\pi \sin\theta(s) ds}{\sqrt{1 + k^2 \sin^2\theta(s)}}. \qquad (55)$$

Therefore, the integral, I, defined by equation (47), may be, for example:

$$I = \int\int_A f(\theta, \varphi) dA \qquad (56)$$
$$= 2\pi \int_0^{s_{max}} \frac{f(s) \cdot \sin\theta(s) ds}{\sqrt{1 + k^2 \sin^2\theta(s)}}.$$

Consider an arc length along the spiral, s(θ), for example, defined as follows:

$$s(\theta) = \int_0^\theta \sqrt{1 + k^2 \sin^2\tilde\theta} \, d\tilde\theta, \qquad (57)$$
$$0 \le \theta \le \pi.$$

In some embodiments, the relationship θ(s) between a dip or zenith angle and the arc length may be an inverse function of the relationship s(θ) between the arc length and the dip. This inverse relationship θ(s) should be used in equation 40.

Other formulae or series of formulae may be used.

Section F: Uniform Area Discretization of the Spherical Spiral

In some embodiments, since the integrand function ƒ(s) of the integral defined, for example, by equation (56) may be assumed to be constant over the height of the area element (e.g., within a vertical distance ±h/2 from a center line ds of the segment on one of the successive coils), the integral defined, for example, by equation (56) may be an approximation of the integral defined, for example, by equation (48). However, the error of the approximation may decrease to a substantially negligible value if the number of coils is substantially large. In some embodiments, the integrand function, ƒ(s), may be substantially only be defined along the uniform spherical spiral. Assuming the integrand function, ƒ(s), is constant over the height of the area element may provide discontinuities between successive coils of the uniform spherical spiral.

In some embodiments, a specific integrand function may be chosen, for example, ƒ=1, for testing the validity of equation (56). In the example described herein, the result of integrating may be the area of a unit sphere. The integral, I, defined for example by equation (47), may simplify, for example, to:

$$\int\int_A dA = 2\pi \int_0^{s_{max}} \frac{\sin\theta(s) ds}{\sqrt{1 + k^2 \sin^2\theta(s)}} = 4\pi, \qquad (58)$$

(e.g., the area of a sphere with R=1, referred to as a unit sphere). Other formulae or series of formulae may be used.

In some embodiments, arrangements of nodes may be selected or determined, for example, to normalize an area swept between successive nodes (e.g., nodes 355) as described in further detail in reference to FIG. 5. The nodes may, for example, be positioned along the arc length in such a way that there may approximately be an equal or uniform area swept between successive nodes. For example, nodes may be positioned in an array of a uniform area grid. Such arrangements may result in a non-uniform distance between successive nodes. In some embodiments, the area swept between successive nodes may be used, for example, as a new integration parameter in the imaging integral. Uniform area discretization may provide segments of the uniform spherical spiral that are close to the poles with relatively long arc lengths and segments of the spiral that are farther from the poles, for example, at "moderate latitudes" or near the equatorial region of the spiral with relatively short arc lengths. In various embodiments, this discrepancy in arc lengths for segments along the spiral may be minimized according to the design of the spiral. For example, for a spiral that has 25-35 coils or more, the discrepancy in arc lengths for segments along the spiral may substantially only be recognized or significant at the first and last segments, which start and end at the north and south poles, respectively. In such embodiments, the discrepancy in arc lengths for various segments along the spiral may be substantially negligible.

In some embodiments, the uniform spherical spiral may have $n_{int}+1$ nodes and, for example, $n_{int}$ intervals between successive nodes. The area between successive nodes may be, for example:

$$\Delta A = \frac{A_{max}}{n_{int}}, A_{max} = 2\pi(1 - \cos\theta_{max}) = 4\pi\sin^2\frac{\theta_{max}}{2} \tag{59}$$

For example, if the uniform spherical spiral has nodes at the end points of the sphere (e.g., the full uniform spherical spiral shown in FIG. 4), the area swept by the uniform spherical spiral may simplify to the area of the unit sphere, for example:

$$A = A_{max} = 4\pi. \tag{60}$$

For example, using a relationship between arc lengths and zenith angles along the uniform spherical spiral described according to an embodiment of the invention, the area between two successive nodes may be, for example:

$$2\pi \int_{s_{j-1}}^{s_j} \frac{\sin\theta(s)ds}{\sqrt{1 + k^2\sin^2\theta(s)}} = \Delta A = \frac{A_{max}}{n_{int}}. \tag{61}$$

Combining equations (59) and (61) gives, for example:

$$\int_{s_{j-1}}^{s_j} \frac{\sin\theta(s)ds}{\sqrt{1 + k^2\sin^2\theta(s)}} = \frac{2\sin^2(\theta_{max}/2)}{n_{int}}. \tag{62}$$

For example, equation (41), arranged as for example, $$\frac{ds}{\sqrt{1 + k^2\sin^2\theta(s)}} = d\theta, \tag{63}$$

and known algebraic operations may be applied to equation (62), giving an area swept between two successive nodes defined by, for example:

$$\int_{\theta_{j-1}}^{\theta_j} \sin\theta d\theta = \cos\theta_{j-1} - \cos\theta_j = \frac{2\sin^2(\theta_{max}/2)}{n_{int}}. \tag{64}$$

Therefore, it may be determined, for example:

$$\cos\theta_j = \cos\theta_{j-1} - \frac{2\sin^2(\theta_{max}/2)}{n_{int}}. \tag{65}$$

For example, if the uniform spherical spiral has a start node at the north pole, the zenith angle, $\theta_o$, (e.g., zenith angle 310) at the node may be, for example:

$$\theta_o = 0 \text{ and } \cos\theta_o = 1. \tag{66}$$

Therefore, if the area arc length between each pair of successive nodes is equal, then, for example:

$$\cos\theta_j = 1 - \frac{2j\sin^2(\theta_{max}/2)}{n_{int}} \text{ or } \theta_j = \arccos\left[1 - \frac{2j\sin^2(\theta_{max}/2)}{n_{int}}\right], \tag{67}$$
$$j = 0, 1 \ldots n_{int}.$$

Combining equations (41) and (58) may provide a relationship between zenith angles and swept areas along the uniform spherical spiral, for example, given by:

$$A(\theta) = 2\pi(1 - \cos\theta) = 4\pi\sin^2\frac{\theta}{2}. \tag{68}$$

Therefore, a node with a maximum zenith angle, $\theta_{max}$ radians may have a maximum area swept. In particular, for a full spiral the maximum zenith angle may be at the south pole, where $\theta_{max} = \pi$.

In some embodiments, a normalized area between successive nodes may be, for example:

$$\frac{A(\theta)}{A_{max}} = \frac{\sin^2(\theta/2)}{\sin^2(\theta_{max}/2)}, \tag{69}$$

where $A/A_{max}$ may be a normalized area for each zenith angle, $\theta$, node, and/or data point along the uniform spherical spiral.

In some embodiments, if the integrand function is specified at nodes, $\theta_j$, for example, where $\cos\theta_j$ is defined by equation (67), then the normalized area swept at the locations of the nodes, $\theta_j$, for example, according to the normalization defined by equation (69), may be used as an integration variable.

In some embodiments, a parabolic rule, as is known, may be applied for one-dimensional numerical integration, for example, as follows:

$$I = \int_0^{A_{max}} f(A)dA \tag{70}$$
$$= \frac{\Delta A}{3} \cdot (f_0 + 4f_1 + 2f_2 + \ldots + 2f_{n-2} + 4f_{n-1} + f_n)$$

$$\Delta A = \frac{4\pi\sin^2(\theta_{max}/2)}{n_{int}}.$$

Since the function defined by equation (69) may be a continuous and one-to-one function, an inverse function may be applied, for example, as follows:

$$\theta(A/A_{max}) = 2 \arcsin \sqrt{A/A_{max}} \cdot \sin(\theta_{max}/2), \phi = k\theta. \quad (71)$$

Therefore, a normalized area, for example, for nodes along the uniform spherical spiral may be, for example:

$$\frac{A}{A_{max}} = \frac{i}{n_{int}}, i = 0, 1, \ldots n_{int}. \quad (72)$$

Other formulae or series of formulae may be used.

Section G: Design of the Uniform Spherical Spiral

Embodiments of the invention may provide a relationship between the elevation parameter k, and, for example, the number of nodes of a uniform spherical spiral, the aspect ratio and/or a maximum zenith angle. In some embodiments, a design of a uniform spherical spiral may define these relationships.

In some embodiments, when a uniform spherical spiral has nodes at its poles (e.g., a full uniform spherical spiral), by equation (7), the elevation parameter k may be, for example, $k=2 \cdot n_{coils}$, where $n_{coils}$ may be a number of spiral coils in a full uniform spherical spiral, from a north pole to a south pole. For example, $n_{points}$ may be a number of nodes along the uniform spherical spiral and $n_{int}=n_{points}-1$ may be a number of intervals between successive nodes. In some embodiments, the intervals along the uniform spherical spiral may have equal areas swept or, alternatively, for example, equal arc lengths. In some embodiments, although the areas swept by spiral coils on each of the intervals may be equal, the arc lengths are not exactly equal.

In some embodiments, an average arc length for each of the intervals along the uniform spherical spiral may be, for example:

$$\Delta s_{ave} = s_{max}/n_{int}. \quad (73)$$

Thus, the total length of the uniform spherical spiral may be, for example:

$$s_{max} = \int_0^{\theta_{max}} \sqrt{1 + k^2 \sin^2\theta} \, d\theta = n_{int} \cdot \Delta s_{ave}. \quad (74)$$

In some embodiments, the elevation parameter k may be determined, for example, when a number of nodes along the uniform spherical spiral and an aspect ratio, $\xi$, may be given, selected and/or known. The aspect ratio, $\xi$, may be, for example, a relationship between the average arc length of the intervals, $\Delta s_{ave}$, for example, defined by equation (73), and a distance between the two successive coils $$h = \Delta\theta = \pi/n_{coils}^\pi \quad (75)$$

(e.g., measured along a meridian line, as described with reference to FIG. 6). In some embodiments, the aspect ratio, $\xi$, may be, for example:

$$\xi = \frac{\Delta s_{ave}}{\Delta\theta} = \frac{\Delta s_{ave} \cdot n_{coils}^\pi}{\pi} = \frac{k \cdot \Delta s_{ave}}{2\pi} \rightarrow \Delta s_{ave} = \frac{2\pi\xi}{k}. \quad (76)$$

Combining equations (74) and (76), gives, for example:

$$k \int_0^{\theta_{max}} \sqrt{1 + k^2 \sin^2\theta} \, d\theta = 2\pi\xi n_{int}. \quad (77)$$

Thus, it follows, for example, that:

$$k\left[\sqrt{1+k^2} \cdot E(\alpha, m) - \frac{k^2 \sin\theta \cos\theta}{\sqrt{1+k^2 \sin^2\theta}}\right] = \pi\xi n_{int}. \quad (78)$$

In some embodiments, solutions for the parameter k may be found using, for example, equation (78) and known mathematical methods, such as the Newton method, as is known. Other mathematical methods may be used. Such methods may require, for example, an initial estimate for parameter k. The initial estimate, $k^{init}$, may be determined, for example, using the following formulae:

$$k \int_0^{\theta_{max}} \sqrt{1 + k^2 \sin^2\theta} \, d\theta \approx k \int_0^{\theta_{max}} k \sin\theta \, d\theta \quad (79)$$
$$= k^2(1 - \cos\theta_{max})$$
$$= 2k^2 \sin^2(\theta_{max}/2)$$
$$= 2\pi\xi n_{int} \rightarrow k^{init} = \frac{\sqrt{\pi\xi n_{int}}}{\sin(\theta_{max}/2)}.$$

Such methods may require, for example, a derivative with respect to parameter k of the formulae defined in equation (77). In some embodiments, the derivative may be given by, for example:

$$\frac{d}{dk}\left(k \int_0^{\theta_{max}} \sqrt{1+k^2\sin^2\theta} \, d\theta\right) = \quad (80)$$
$$\int_0^{\theta_{max}} \sqrt{1+k^2\sin^2\theta} \, d\theta + k \cdot \frac{d}{dk} \int_0^{\theta_{max}} \sqrt{1+k^2\sin^2\theta} \, d\theta.$$

Combining equations (42) and (80), where $F(\alpha, m)$ may be an elliptic integral of the first kind, gives, for example:

$$k \cdot \frac{d}{dk} \int_0^{\theta_{max}} \sqrt{1+k^2 \cdot \sin^2\theta} \, d\theta = \int_0^{\theta_{max}} \frac{k^2 \sin^2\theta \, d\theta}{\sqrt{1+k^2 \sin^2\theta}} \quad (81)$$
$$= \int_0^{\theta_{max}} \frac{1+k^2\sin^2\theta - 1}{\sqrt{1+k^2\sin^2\theta}} d\theta$$
$$= \int_0^{\theta_{max}} \sqrt{1+k^2\sin^2\theta} \, d\theta -$$
$$\int_0^{\theta_{max}} \frac{d\theta}{\sqrt{1+k^2\sin^2\theta}}$$
$$= s(\theta_{max}) - \frac{F(\alpha, m)}{\sqrt{1+k^2}}.$$

In some embodiments, parameter $\alpha$ and modulus m, may be defined, for example by equation (43), in such a way that for example, $$\alpha = \arcsin\frac{\sqrt{1+k^2}\sin\theta}{\sqrt{1+k^2\sin^2\theta}} \text{ and } m = \frac{k}{\sqrt{1+k^2}}. \quad (82)$$

Therefore, the following equation may be provided, which may be used to obtain the derivative in equation (81), which may be used, for example in some iterative methods for solving nonlinear equation, $$\frac{d}{dk}\left[k\int_0^{\theta_{max}}\sqrt{1+k^2\cdot\sin^2\theta}\,d\theta\right] = 2\cdot s_{max} - \frac{F(\alpha,m)}{\sqrt{1+k^2}}. \quad (83)$$

Other formulae or series of formulae may be used.

The above design equations are related specifically to spherical spiral. Other methods encompassed by embodiments of the present invention may use spiral lines on other surfaces. For example, a modified algorithm with a different equation series can be applied to design a spiral on the surface of an oblate or prolate spheroid (e.g., an ellipsoid with two axes of equivalent length and a third axis shorter and longer, respectively), or on the surface of a general (e.g., a scalene) ellipsoid where all three axes may have different lengths. Although embodiments of the invention describe using a coordinate system with a uniform spherical spiral shape for converting data from a conventional coordinate system to a uniform spherical spiral coordinate system, with minor modifications to the calculations described herein, any shape may be used which provides a relationship between two or more variables in the conventional coordinate system, reduces the dimensionality of data points, or has representations of two or more variables of the conventional coordinate system that both simultaneously change along the spiral. Such shapes may include for example an ellipsoid, a torus, a spheroid, a hyperboloid, a paraboloid, an elliptic paraboloid, a hyperbolic paraboloid, and/or a hyperbolic cylinder, which may be real or imaginary, symmetric or asymmetric, and regular or irregular.

Section H: Binning Index of a Uniform Spherical Spiral

In some embodiments, a data point, $(\theta^*,\phi^*)$, may not intersect, pass through, or lie on one of the coils of the uniform spherical spiral. For example, the data point may fall between successive coils of the uniform spherical spiral. In some embodiments, the data point may be binned to a nearest node of a nearest coil of the uniform spherical spiral. Embodiments of the invention may provide a system and method for determining the nearest node of a nearest coil of the uniform spherical spiral. The binning may be done in, for example, two steps. Firstly the data point may be binned to the nearest spiral coil, measured to the north or to the south along a meridian line. Thus, the data point may be adjoined to the spherical spiral, but need not necessarily coincide with a spiral node. Second, the data point may be binned to the nearest spiral node measured along the spiral line. Other steps or series of steps may be used.

In some embodiments, a data point $(\theta^*,\phi^*)$, in a dual-variable coordinate system may be represented by zenith angle and azimuth angle values in ranges, for example, of $0\leq\theta^*\leq\pi$, and $0\leq\phi^*<2\pi$, respectively. In some embodiments, a data point $(\theta,\phi)$, in the uniform spherical spiral coordinate system may be represented by zenith angle and azimuth angle values in ranges, for example, of $0\leq\theta\leq\pi$, and $0\leq\phi<2\pi n_{coils}$, respectively, where $n_{coils}$ may be a number of coils in the uniform spherical spiral. Other values and/or value ranges may be used.

In some embodiments, the coil nearest to the original data point $(\theta^*,\phi^*)$, may be determined first and the node nearest to data point $(\theta^*,\phi^*)$, (e.g., along the nearest coil) may be determined second, for example, as follows: The coil nearest to data point $(\theta^*,\phi^*)$, may have an index, m, in the uniform spherical spiral coordinate system. A fixed meridian line that passes through data point, $(\theta^*,\phi^*)$, may be defined. In some embodiments, the fixed meridian line may extend from the north pole to the data point, $(\theta^*,\phi^*)$, across m full coils and a portion of an additional coil. In some embodiments, a relationship between the zenith angle and azimuth angle for a data point, $(\theta^*,\phi^*)$, (e.g., according to equation (1)) may include, for example:

$$k\cdot\theta^* = \phi^* + 2\pi m, \quad (84)$$

where k may be a parameter of the spiral; and m may be the index of the nearest coil to data point, $(\theta^*,\phi^*)$.

Index, m, may be, for example:

$$m = \text{integer}\left(\frac{k\cdot\theta^* - \phi^*}{2\pi}\right), m \geq 0, \quad (85)$$

where the operator "integer" may determine the nearest integer value for any number.

In some embodiments, a relationship between the zenith angle and the azimuth angle of an intermediate point $(\theta,\phi^*)$, which may be a point that lies on the nearest coil of the uniform spherical spiral, may be defined, for example, as follows:

$$\theta = \frac{\phi^* + 2\pi m}{k}. \quad (86)$$

In one embodiment, the intermediate point $(\theta,\phi^*)$ may be a point on the uniform spherical spiral and may be shifted along a meridian line from an original data point $(\theta^*,\phi^*)$, which may lie away from the spiral, for example, in the direction of the north or south poles (e.g., as described in reference to FIG. 4). For example, the intermediate point $(\theta,\phi^*)$ may be a point that belongs to both the uniform spherical spiral and the meridian line of the original data point $(\theta^*,\phi^*)$. Although the intermediate point $(\theta,\phi^*)$ may lie on the uniform spherical spiral, the point need not coincide with one of the spiral nodes (e.g., nodes 355). In order to determine a nearest node to the intermediate point $(\theta,\phi^*)$, a second operation may proceed for example as follows:

In some embodiments, the intermediate point $(\theta,\phi^*)$, may not coincide with a node of the uniform spherical spiral. For example, the intermediate point $(\theta,\phi^*)$, may lie in a segment of the nearest coil, for example, in an interval between the nodes. The nodes along the uniform spherical spiral may be arranged, for example, according to embodiments described in the section entitled, "Uniform Area Discretization of the Spherical Spiral". For example, nodes may be arranged in an array of a uniform area grid or so that the interval between two successive nodes containing the intermediate point $(\theta,\phi^*)$, may have a known area swept. In such embodiments, at the location of the intermediate point, the area swept by the spiral coils may be defined, for example, by equation (69), where $$A(\theta) = \frac{\sin^2(\theta/2)}{\sin^2(\theta_{max}/2)} \cdot A_{max}. \tag{87}$$

A single index, for example, a binning or area index for the intermediate point $(\theta,\phi^*)$, along the uniform spherical spiral may be defined, for example, as follows:

$$i = \text{integer}\left[\frac{A}{\Delta A}\right] = \text{integer}\left[n_{int}\frac{\sin^2(\theta/2)}{\sin^2(\theta_{max}/2)}\right], \tag{88}$$

where $n_{int}$ may be a total number of nodes along the length of the spiral curve. In some embodiments, different coils on the spiral may have different numbers of nodes. For example, coils relatively close to poles (e.g., north pole 390 and south pole 395, as described in reference to FIG. 4) may have relatively fewer nodes than coils closer to the "equator" of the spiral. In one embodiment, the number of nodes along coils may increase monotonically from the polar regions to the equatorial regions of the spiral.

Embodiments of the invention may provide a system and method for determining or using a single index for the uniform spherical spiral coordinate system. In some embodiments, data points, $(\theta^*,\phi^*)$, of a dual-variable coordinate system (e.g., where data may be represented using zenith and azimuth angles) may be converted, mapped, or parameterized to data points, $(\theta,\phi)$, of a uniform spherical spiral coordinate system (e.g., where data may be represented using a single parameter, such as a zenith angle, an area index, or other single parameter), or of another spiral coordinate system, for example, having a shape such as a spheroid, an ellipsoid, a torus, a hyperboloid, a paraboloid, etc. After the binning index i is determined, the components of the dual angle may be determined, for example, as follows:

$$\theta = 2\arcsin\left(\sqrt{\frac{i}{n_{int}}} \cdot \sin\frac{\theta_{max}}{2}\right) \text{ and } \varphi = k \cdot \theta \tag{89}$$

Zenith and azimuth $(\theta,\phi)$ obtained from this equation may belong to a binned spiral node, nearest to the data point.

In some embodiments, dual-variable coordinate systems include two separate indices. Embodiments of the invention may provide a system and method for unifying, converting or parameterizing the two separate indices of the dual variable coordinate system (e.g., one for the zenith angle and another for the azimuth angle) to a single index for the uniform spherical spiral coordinate system (e.g., for the zenith angle). For example, the single index may include a unified zenith-azimuth binning index or area index.

Section I: Local Angle Domain (LAD) Mechanisms

Embodiments including mechanisms for imaging and processing using a spiral parameterization are described in more detail herein, for example, for determining target surface orientations, ray pair directional and reflection angles, and relative angles therebetween. For example, while the methods and embodiments shown in these sections are not limiting, ray pairs in the local and global frames and rotational transforms may be described in the sections entitled, "Ray Pairs in Local and Global Frames" and "Relationships between Local and Global Frames". While the embodiments shown in this section are not limiting, components of the LAD may be described in the section entitled, "Local Angle Domain—Enhancements". While the embodiments shown in this section are not limiting, a directional angle of ray pairs (e.g., including zenith and azimuth angles) may be described in the section entitled, "Ray Pair Normal". While the embodiments shown in this section are not limiting, opening angles of the dual variable reflection angles, for example, angles between incident and reflected rays of ray pairs, may be described in the section entitled, "Opening Angle". While the embodiments shown in these sections are not limiting, opening azimuth angles of dual-variable reflection angles may be described in the sections entitled, "Opening Reference (Zero Opening Azimuth)" and "Opening Azimuth". While the embodiments shown in this section are not limiting, additional information for defining opening azimuth angles may be described in the section entitled, "Projection of a Vector onto a Plane". Although specific coordinate systems may be used in these sections, it may be apparent to one skilled in the art that the present invention may use any appropriate coordinate system.

A local imaging system may be used to represent a system of local plane waves incident on a target surface and the reflections thereof. The directions of incident and reflected rays may be converted to the normal direction to a reflecting object and reflection angle magnitude and orientation. The four angles resulting from this conversion may be referred to as the Local Angle Domain (LAD).

In one embodiment, each ray pair in the LAD, which may include an incident and reflected ray, may be represented by multiple, for example, four variables (e.g., two angles representing the zenith directions of the incident and reflected rays (e.g., zenith angle 310, as described in reference to FIG. 4) and two representing the azimuth orientation of the incident and reflected rays (e.g., azimuth angle 320, as described in reference to FIG. 4). The imaging system may use alternate or additional multi-variable representations of each ray pair. In one embodiment, each ray pair may be represented by four variables, including, for example, two directional angles, such as the zenith and azimuth angles, representing the direction of the ray pair normal, and two components of the dual reflection angle, such as the opening angle and opening azimuth angle, representing the relative orientation of the incident and reflected rays of the ray pair. Each of the directional angles and reflection angles may be represented by two independent dual-angle systems. Although it may be apparent to one skilled in the art that either isotropic or anisotropic models may be used for imaging, in a demonstrative embodiment described herein, anisotropic models, for example, with tilted transverse isotropy, are used. In some embodiments, anisotropic models having relatively less or lower types of symmetry may be used, such as for example, orthorhombic, monoclinic and/or triclinic symmetries. In some embodiments, anisotropic models may require more parameters than transverse isotropy models. In embodiments described herein, transverse isotropy models may be used for simplicity and demonstration.

Embodiments of the present invention may provide a uniform spherical spiral parameterization for each, or some, of the dual-angled systems. In some embodiments, a distinct uniform spherical spiral representation may be used for each dual-angle system. For example, one uniform spherical spiral may be used to represent directional angles (e.g., including zenith and azimuth angles) and another uniform spherical spiral may be used to represent reflection angles (e.g., including opening angles and opening azimuth angles) for each ray pair. Representations including spirals that are not uniform or spherical may be used.

Ray Pairs in Local and Global Frames

Figure 13:
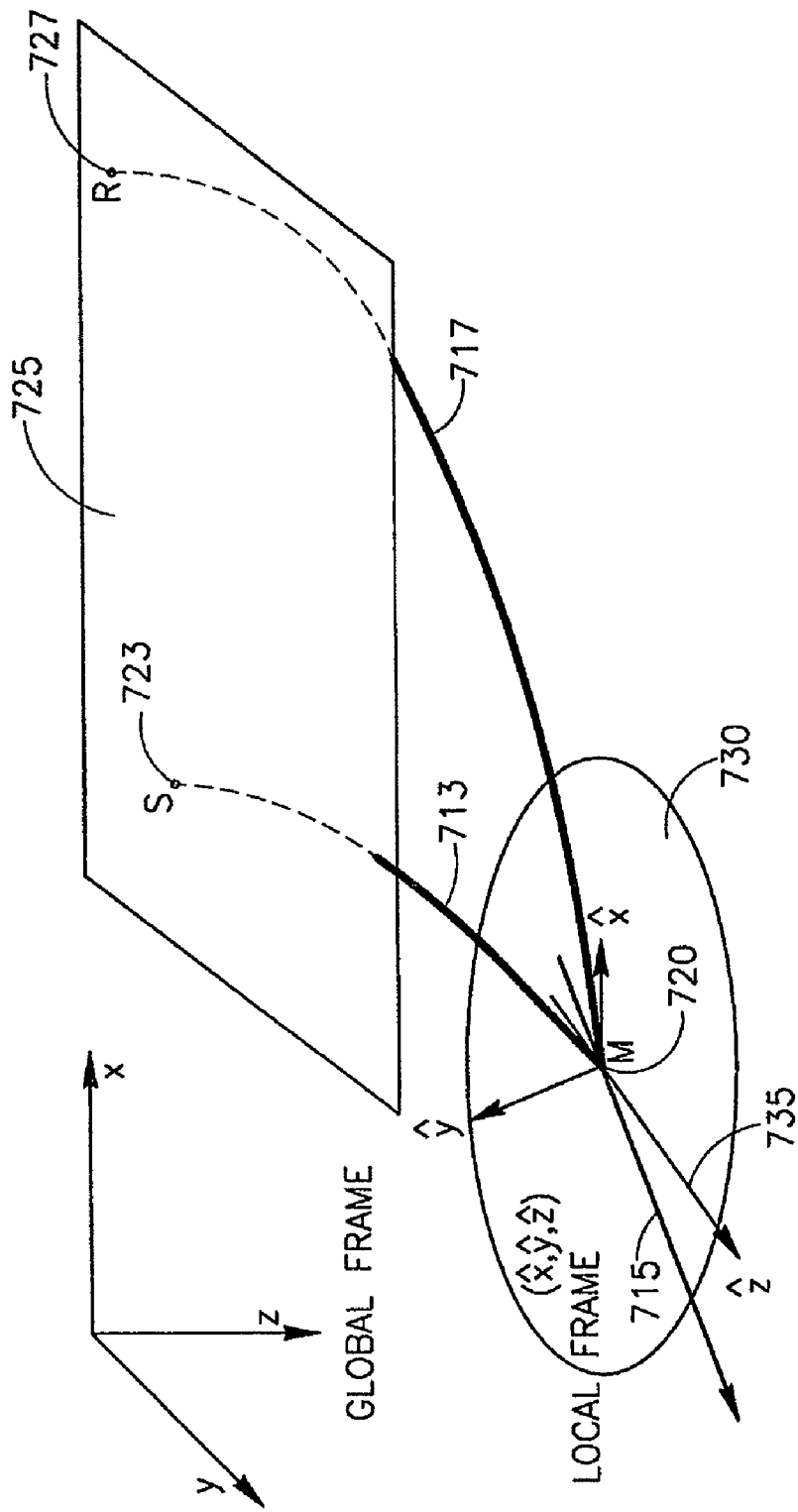
FIG. 13 is a schematic illustration of a ray pair in a local and global frame according to an embodiment of the invention.
Figure 14:
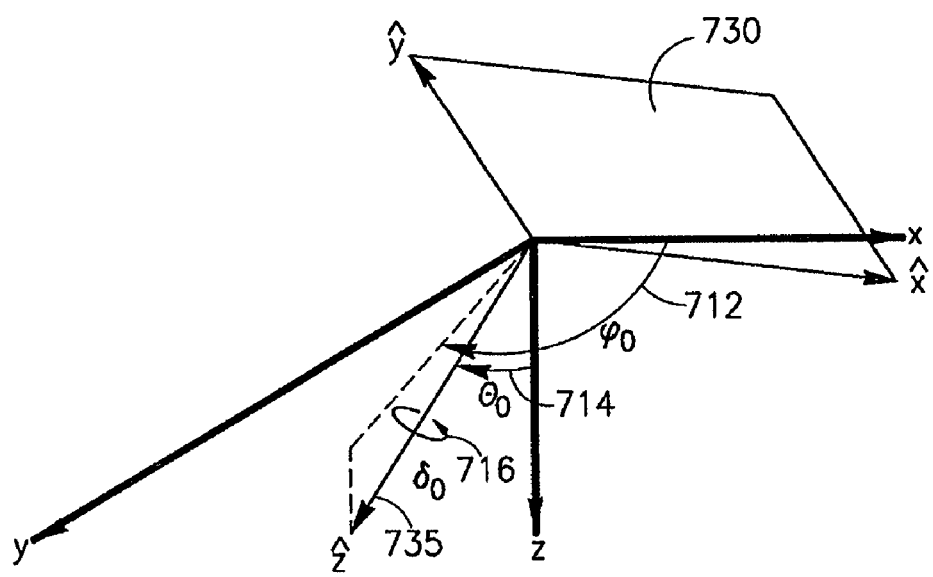
FIG. 14 is a schematic illustration of relationships between a local and global frame at an image point of a reflection surface according to an embodiment of the invention.

Reference is made to FIGS. 13 and 14. FIG. 13 is a schematic illustration of a ray pair in a local and global frame according to an embodiment of the invention. FIG. 14 is a schematic illustration of relationships between a local and global frame at an image point of a reflection surface according to an embodiment of the invention. A ray pair may include, for example, corresponding incident ray SM 713 and reflected ray RM 717, for example, which arrive to substantially the same reflection point M 720 (e.g., also referred to as an "image point") of a reflection surface (e.g., also referred to as a "target surface"). In some embodiments, incident ray SM 713 may emerge from a source point S 723, and reflected ray RM 717 may emerge from a receiver point R 727. Source point S 723 and receiver point R 727 may, for example, be the approximate locations on the earth's surface of sources and receivers, respectively, from which seismic data may be generated and/or collected. For example, a parallelogram 725 in FIG. 13 containing source point S 723 and receiver point R 727 may indicate a portion of the earth's surface.

Figure 16:
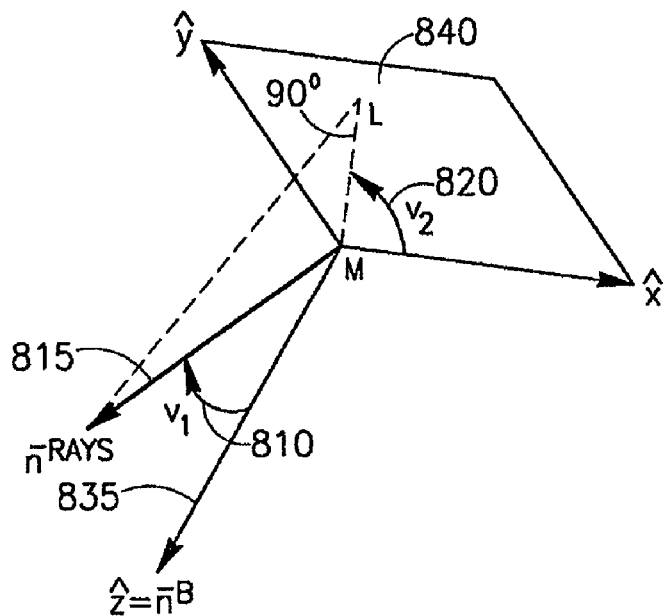
FIG. 16 is a schematic illustration of a dual direction angle system in a local frame of reference according to an embodiment of the invention.
Figure 17:
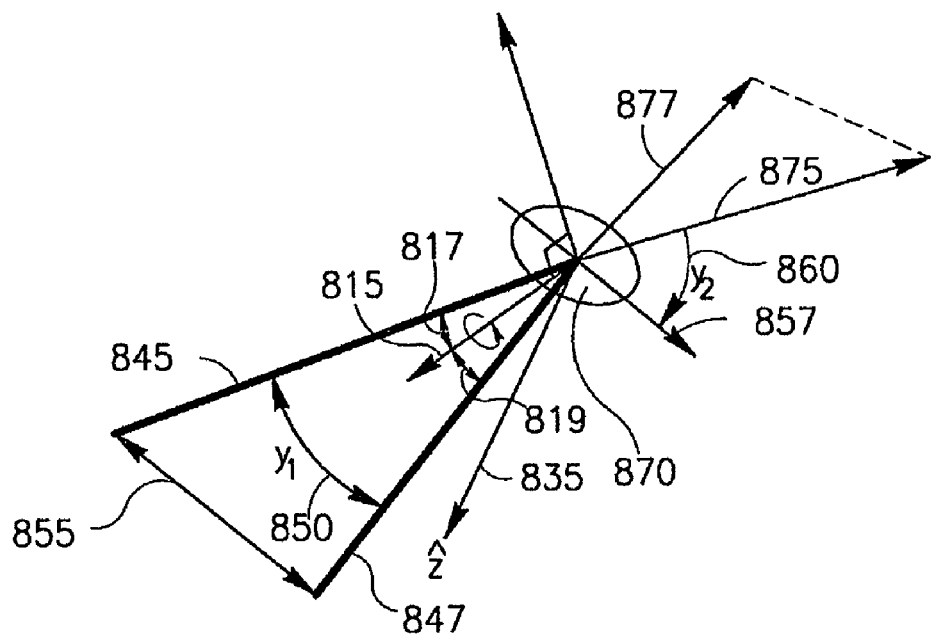
FIG. 17 is a schematic illustration of a dual reflection angle system in a local frame of reference according to an embodiment of the invention.

In some embodiments, each ray pair may have a corresponding ray pair normal 715, $\vec{n}^{Rays}$, described further, (e.g., as ray pair normal 815, $\vec{n}^{Rays}$) in reference to FIGS. 16 and 17. Ray pair normal 715, $\vec{n}^{Rays}$, may be a vector normal to the ray pair reflection surface. The ray pair reflection surface does not necessarily coincide with the background reflection surface 730, and may depend on various factors, including, for example, the directions of incident ray 713 and reflected ray 717, and properties of a subsurface medium. In some embodiments, each reflection point 720, M, (or e.g., "image point") may have a corresponding background reflection surface normal 735, $\vec{n}^{B}$, (e.g., also referred to as "background normal"). Background reflection normal 735, $\vec{n}^{B}$, may be a vector normal to background reflection surface 730 and may be represented by directional angles, for example, including a zenith angle, $\theta_o$, and azimuth angle, $\phi_o$. In the embodiment depicted in FIG. 14, the axis $\hat{z}$ of the local frame coincides with background reflection normal 735, $\vec{n}^{B}$, (e.g., $\hat{z}=\vec{n}^{B}$), and the $\hat{x}\hat{y}$ plane coincides with background reflection surface 730. In various embodiments, background reflection normal 735, $\vec{n}^{B}$ and ray pair normal 715, $\vec{n}^{Rays}$, may or may not coincide. In one embodiment, the global frame may be defined by coordinate axes x, y, and z, for example, with the z-axis oriented vertical downward.

It may be appreciated by those skilled in the art that embodiments of the invention describing LAD transformations between the local and global frames including rotational transformations may also include for example translation shifts, which may have any suitable value. In some embodiments, when the translation shift is, for example, zero, the origins of the local and global frames may substantially coincide. In such embodiments, the orientation of the axes of the global and the local frames need not coincide.

Relationships Between Global and Local Frames

Reference is again made to FIG. 14, which is a schematic illustration of relationships and transformations between a local and global frame at a reflection point of a reflection surface according to an embodiment of the invention. Embodiments of the present invention may provide relationships, for example, transformations or other functions, such as a series of rotations, between coordinates of the global frame, (x, y, z), and coordinates of the local frame, ($\hat{x},\hat{y},\hat{z}$). In one embodiment, transformations of a vector may include, for example, three rotations, such as a first rotation 712 corresponding to an azimuth angle $\theta_o$ of the directional angle defined by background reflection normal 735, $\vec{n}^{B}$, a second rotation 714 corresponding to a zenith or dip angle $\theta_o$ of the directional angle defined by background reflection normal 735, $\vec{n}^{B}$, and a third rotation 716 about background reflection normal 735, $\vec{n}^{B}$. For example, the three rotations are as follows:

First rotation 712 may include a rotation of global frame, (x,y,z) about an axis, for example, a $z=z_v$-axis, where the $z_v$ axis coincides with the global axis z, and the rotation angle may be defined by azimuth angle $\theta_o$ of the background reflection normal 735, $\vec{n}^{B}$. First rotation 712 may provide an intermediate frame with axes, ($x_v,y_v,z_v$). Second rotation 714 may include a rotation of intermediate frame, $x_v y_v z_v$, about an axis, for example, a $y_v=y_w$ axis, where the $y_w$ axis coincides with $y_v$, and the rotation angle may be defined by dip angle, $\theta_o$, of background reflection normal 735, $\vec{n}^{B}$. Second rotation 714 may provide another intermediate frame with axes, ($x_w$, $y_w,z_w$). In some embodiments, second rotation 714 does not change the azimuth angle, $\theta_o$. Third rotation 716 may include a rotation of intermediate frame, $x_w y_w z_w$, about an axis, for example, a $z_w=\hat{z}$ axis, where the $z_w$ axis of the rotated intermediate frame, $x_w y_w z_w$, coincides with the local background normal $\hat{z}=\vec{n}^{B}$, and the rotation angle for example, may be defined by a supplementary angle $\theta_o$, (e.g., which may be referred to as a "twist" angle). Third rotation 716 may provide a local frame with coordinates, ($\hat{x},\hat{y},\hat{z}$). In some embodiments, third rotation 716 does not change both azimuth angle, $\phi_o$, and dip angle, $\theta_o$. Therefore, any of a range of supplementary angles, $\delta_o$, may be used according to embodiments of the invention. In one embodiment, the supplementary angle $\delta_o$ may be selected in such a way that the third rotation may provide a local frame with an $\hat{x}$-axis normal to the y-axis of the global frame (e.g., where $\hat{x}\perp\hat{y}$). In some embodiments, using different values for twist angle, $\delta_o$, may provide different presentations of the directions of incident ray SM 713 and reflected ray RM 717 of a ray pair in the LAD.

Figure 15:
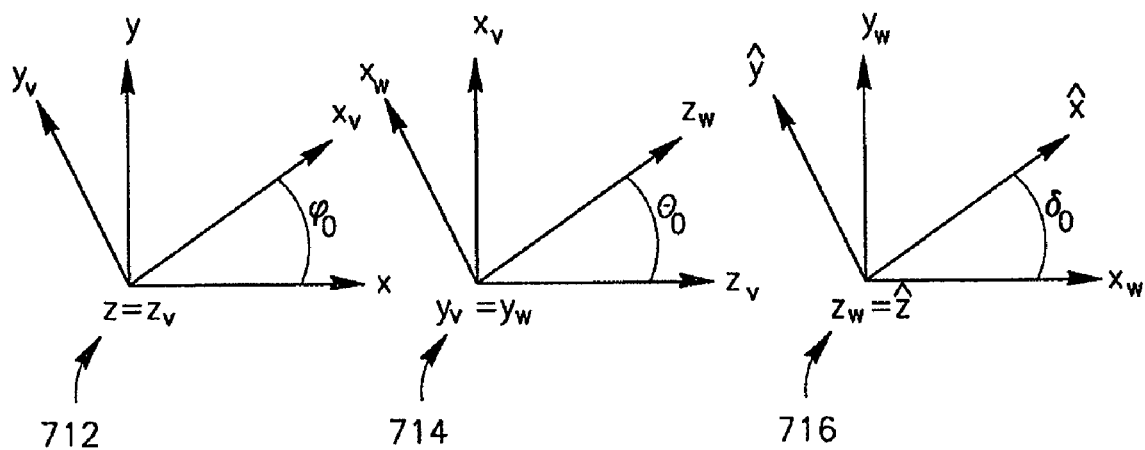
FIG. 15 is a schematic illustration of three rotations used to transform data between a global frame and a local frame according to an embodiment of the invention.

Reference is made to FIG. 15, which is a schematic representation of three rotations used to transform data between a global frame and a local frame according to an embodiment of the invention. In some embodiments, the three rotations described in reference to FIG. 15 may correspond to first rotation 712, second rotation 714, and third rotation 716, described in reference to FIG. 14. In some embodiments, first rotation 712, second rotation 714, and third rotation 716 may be represented by a first matrix (e.g., defined by equation (73)), a second matrix (e.g., defined by equation (74)), and a third matrix (e.g., defined by equation (75)), respectively, which may be described as follows.

The first rotation matrix (e.g., representing a rotation about a $z=z_v$ axis) may be, for example:

$$R_{z\varphi} = \begin{bmatrix} \cos\varphi_o & \sin\varphi_o & 0 \\ -\sin\varphi_o & \cos\varphi_o & 0 \\ 0 & 0 & 1 \end{bmatrix}, \begin{bmatrix} x_v \\ y_v \\ z_v \end{bmatrix} = R_{z\varphi} \begin{bmatrix} x \\ y \\ z \end{bmatrix}. \tag{90}$$

The second rotation matrix (e.g., representing a rotation about a $y_v=y_w$ axis) may be, for example:

$$R_{y\theta} = \begin{bmatrix} \cos\theta_o & 0 & -\sin\theta_o \\ 0 & 1 & 0 \\ \sin\theta_o & 0 & \cos\theta_o \end{bmatrix}, \begin{bmatrix} x_w \\ y_w \\ z_w \end{bmatrix} = R_{y\theta} \begin{bmatrix} x_v \\ y_v \\ z_v \end{bmatrix}. \tag{91}$$

The third rotation matrix (e.g., representing a rotation about a $\hat{z}=z_w$ axis) may be, for example:

$$R_{z\delta} = \begin{bmatrix} \cos\delta_o & \sin\delta_o & 0 \\ -\sin\delta_o & \cos\delta_o & 0 \\ 0 & 0 & 1 \end{bmatrix}, \begin{bmatrix} \hat{x} \\ \hat{y} \\ \hat{z} \end{bmatrix} = R_{z\delta} \begin{bmatrix} x_w \\ y_w \\ z_w \end{bmatrix}. \quad (92)$$

Therefore, a transformation from coordinates of the global frame, (x,y,z), to coordinates of the local frame, $(\hat{x},\hat{y},\hat{z})$, may include a series of rotations, for example, as follows:

$$\begin{bmatrix} \hat{x} \\ \hat{y} \\ \hat{z} \end{bmatrix} = R_{z\delta} R_{y\varphi} R_{z\theta} \cdot \begin{bmatrix} x \\ y \\ z \end{bmatrix}. \quad (93)$$

In some embodiments, a transformation from coordinates of the local frame, $(\hat{x},\hat{y},\hat{z})$, to coordinates of the global frame, (x,y,z), may be defined by an inverse transformation of the transformation defined by equation (93). The inverse transformation may operate, for example, on a series of transposed matrices, A, where the matrices may include the first, second, and third matrices defined by equation (90), (91), and (92), respectfully, and where the order of transpose matrices in the triple matrix product in equation (94) may be the inverse of the order in equation (76) of the matrices from which the matrices are transposed. Such a transformation may be defined for example, as follows:

$$\begin{bmatrix} x \\ y \\ z \end{bmatrix} = R_{z\theta}^T R_{y\varphi}^T R_{z\delta}^T \cdot \begin{bmatrix} \hat{x} \\ \hat{y} \\ \hat{z} \end{bmatrix}, R_{z\theta}^T R_{y\varphi}^T R_{z\delta}^T = A, \quad (94)$$

where for example, $$A = \begin{bmatrix} +\cos\theta_o\cos\varphi_o\cos\delta_o - \sin\varphi_o\sin\delta_o & -\cos\theta_o\cos\varphi_o\sin\delta_o - \sin\varphi_o\cos\delta_o & \sin\theta_o\cos\varphi_o \\ +\cos\theta_o\sin\varphi_o\cos\delta_o + \cos\varphi_o\sin\delta_o & -\cos\theta_o\sin\varphi_o\sin\delta_o + \cos\varphi_o\cos\delta_o & \sin\theta_o\sin\varphi_o \\ -\sin\theta_o\cos\delta_o & \sin\theta_o\sin\delta_o & \cos\theta_o \end{bmatrix} \quad (95)$$

In a demonstrative embodiment, a unit vector, $\hat{x}$, in the local frame, may be defined by, for example:

$$\hat{x}^{loc} = \{1,0,0\}. \quad (96)$$

Transforming the unit vector, $\hat{x}$, from coordinates of the local frame, $(\hat{x},\hat{y},\hat{z})$, to coordinates of the global frame, (x,y,z), (e.g., according to the transformation defined by equation (94)), may provide a unit vector, $\hat{x}^{glob}$, in the global frame, which may be defined by, for example:

$$\hat{x}^{glob} = A\hat{x}^{loc} = \begin{Bmatrix} +\cos\theta_o\cos\varphi_o\cos\delta_o - \sin\varphi_o\sin\delta_o \\ +\cos\theta_o\sin\varphi_o\cos\delta_o + \cos\varphi_o\sin\delta_o \\ -\sin\theta_o\cos\delta_o \end{Bmatrix} \quad (97)$$

In some embodiments, $\hat{x}^{glob}$ may be the first column of matrix A.

Thus, a relationship may be defined, for example:

$$\cos\varphi_o \sin\delta_o = -\cos\theta_o \sin\varphi_o \cos\delta_o, \quad (98)$$

which gives for example the following:

$$\tan\delta_o = -\cos\theta_o \tan\varphi_o, \delta_o = -\arctan(\cos\theta_o \tan\varphi_o). \quad (99)$$

In some embodiments, if $|\delta_o| \leq \pi/2$, then, for example:

$$\cos\delta_o = \frac{1}{\sqrt{1+\cos^2\theta_o\tan^2\varphi_o}} \quad (100)$$

$$\sin\delta_o = \frac{-\cos\theta_o\tan\varphi_o}{\sqrt{1+\cos^2\theta_o\tan^2\varphi_o}}.$$

Combining equations (95), (98), and (100), gives, for example:

$$A = \begin{bmatrix} \dfrac{\cos\theta_o}{\cos\varphi_o\sqrt{1+\cos^2\theta_o\tan^2\varphi_o}} & \dfrac{-\sin^2\theta_o\sin\varphi_o}{\sqrt{1+\cos^2\theta_o\tan^2\varphi_o}} & \sin\theta_o\cos\varphi_o \\ 0 & \cos\varphi_o\sqrt{1+\cos^2\theta_o\tan^2\varphi_o} & \sin\theta_o\sin\varphi_o \\ \dfrac{-\sin\theta_o}{\sqrt{1+\cos^2\theta_o\tan^2\varphi_o}} & \dfrac{-\sin\theta_o\cos\theta_o\tan\varphi_o}{\sqrt{1+\cos^2\theta_o\tan^2\varphi_o}} & \cos\theta_o \end{bmatrix}, \quad (101)$$

or equivalently:

$$A = \begin{bmatrix} \dfrac{\cos\theta_o\cos\delta_o}{\cos\varphi_o} & -\sin^2\theta_o\sin\varphi_o\cos\delta_o & \sin\theta_o\cos\varphi_o \\ 0 & \dfrac{\cos\varphi_o}{\cos\delta_o} & \sin\theta_o\sin\varphi_o \\ -\sin\theta_o\cos\delta_o & \sin\theta_o\sin\delta_o & \cos\theta_o \end{bmatrix}. \quad (102)$$

Therefore, a transformation and a corresponding inverse transformation of an arbitrary vector V from the global frame to the local frame and from the local frame to the global frame, respectively (e.g., defined by equations (93) and (94), respectively), may be defined by a relationship, for example:

$$V^{glob} = AV^{loc} \text{ and } V^{loc} = A^T V^{glob}, \quad (103)$$

respectively.

Other formulae or series of formulae may be used.

Local Angle Domain—Enhancements

Reference is made to FIGS. 16 and 17, which are schematic illustrations of dual direction angle systems in local frames of reference according to an embodiment of the invention. A ray pair may include an incident ray and a reflected ray, which may be used according to embodiments of ray pairs described in reference to FIG. 13). In one embodiment, each ray pair in a LAD system may be represented by, for example, four angles, including angles $v_1, v_2, \gamma_1,$ and $\gamma_2$ (e.g., zenith angle $v_1$ 810 and azimuth angle $v_2$ 820 of ray pair normal 815, shown in, and described in reference to, FIG. 16, and opening angle $\gamma_1$ and opening azimuth angle $\gamma_2$ shown in, and described in reference to, FIG. 17).

In one embodiment, for example, depicted in FIG. 16, a ray pair normal 815, $\vec{n}^{Rays}$, may be represented by, for example, a zenith angle 810, $v_1$, and an azimuth angle 820, $v_2$. For example, zenith angle 810, $v_1$, (e.g., which may be unsigned or positive) may represent an angle between ray pair normal 815, $\vec{n}^{Rays}$, and a background reflection normal 835, $\vec{n}^B$, which may be, for example, a normal vector to a background reflection surface 840, for example, an $\hat{x}\hat{y}$ plane. For example, azimuth angle 820, $v_2$, (e.g., which may be signed) may be an angle between an $\hat{x}$-axis and vector ML, which may be a projection of ray pair normal 815, $\vec{n}^{Rays}$, on background reflection surface 840, for example, the $\hat{x}\hat{y}$ plane.

In one embodiment, for example, depicted in FIG. 17, angle 850, $\gamma_1$, may be an opening angle. In one embodiment, a vector 845, $\vec{p}^{in}$, and a vector 847, $\vec{p}^{re}$, may represent the directions of phase velocities of the incident ray and reflected ray, respectively, of a ray pair. In embodiments where an isotropic or anisotropic medium may be used, a ray pair plane may be defined as a plane built on the slowness directions of the incident and the reflected rays, for example, vector 845, $\vec{p}^{in}$, and vector 847, $\vec{p}^{re}$, respectively. The plane that passes through the incident and the reflected slowness vectors, may be defined as a ray-pair plane. Equivalently, the cross product of the incident and the reflected slowness vectors may be determined. The cross product may define a plane (e.g., normal to the cross product) that passes through the image point. The plane may be the same ray-pair plane. In some embodiments, the ray pair plane and ray pair reflection surface 870, $S^{Refl}$ may be orthogonal. In the anisotropic medium and/or in case of a converted wave, the ray pair may have, for example, different incident angle 817 and/or reflection angle 819, $\alpha^{in}$ and $\alpha^{re}$, respectively. The incident and the reflection angles may be for example defined in FIG. 17. The incident angle 817, $\alpha^{in}$, may be the angle between the incident ray slowness direction $\vec{p}^{in}$, 845, and the ray pair normal $\vec{n}^{Rays}$, 815. The reflection angle 819, $\alpha^{re}$, may be the angle between the reflected ray slowness direction $\vec{p}^{re}$, 847, and the ray pair normal $\vec{n}^{Rays}$, 815. In some embodiments, the sum of the incident angle between vector 845, $\vec{p}^{in}$ and ray pair normal 815, $\vec{n}^{Rays}$, and the reflected angle between vector 847, $\vec{p}^{re}$, and ray pair normal 815, $\vec{n}^{Rays}$, may be the opening angle $\gamma_1$. In some embodiments, the incident angle between vector 845, $\vec{p}^{in}$ and ray pair normal 815, $\vec{n}^{Rays}$ and the reflection angle between vector 847, $\vec{p}^{re}$, and ray pair normal 815 $\vec{n}^{Rays}$, may be different and one of the angles may be greater than half of the opening angle 850, $\gamma_1$, and the other may be less than half of the opening angle 850, $\gamma_1$.

In some embodiments, depicted for example in FIG. 17, an angle 860, $\gamma_2$, may be an opening azimuth angle. Opening azimuth angle 860, $\gamma_2$, may represent an orientation of an opening shift 855, $\Delta\vec{p}$, which may be defined, for example, as a difference between the directions of phase velocity vectors 845, $\vec{p}^{in}$, and 847, $\vec{p}^{re}$. Opening azimuth angle 860, $\gamma_2$, may be, for example, the orientation of opening shift 855, $\Delta\vec{p} = \vec{p}^{re} - \vec{p}^{in}$, measured in a ray pair reflection surface 870, $S^{Refl}$. A reflection surface opening shift 857, $\Delta\vec{p}_S$, may be defined, for example, as a projection of opening shift 855, $\Delta\vec{p}$, onto the ray pair reflection surface 870, $S^{Refl}$. Reflection surface opening shift 857, $\Delta\vec{p}_S$, may be, for example, the difference between opening shift 855, $\Delta\vec{p}$, and a component thereof, $\Delta\vec{p}_n$, normal to ray pair reflection surface 870, $S^{Refl}$ and/or parallel to ray pair normal 815, $\vec{n}^{Rays}$.

Thus, reflection surface opening shift 857, $\Delta\vec{p}_S$, may be defined, for example, as:

$$\Delta\vec{p}_S = \Delta\vec{p} - \Delta\vec{p}_n = \Delta\vec{p} - (\Delta\vec{p} \cdot \vec{n}^{Rays}) \cdot \vec{n}^{Rays} \text{ where } \Delta\vec{p} = \vec{p}^{re} - \vec{p}^{in} \quad (104)$$

In some embodiments, opening azimuth angle 860, $\gamma_2$, may represent the orientation of reflection surface opening shift 857, $\Delta\vec{p}_S$, and thus an orientation of a projection of opening shift 855, $\Delta\vec{p}$, onto ray pair reflection surface 870, $S^{Refl}$. In some embodiments, opening reference 875, $\vec{n}^A$, may be a vector in ray pair reflection surface 870, $S^{Refl}$, with an opening azimuth angle 860, $\gamma_2$, of zero. In some embodiments, opening azimuth angle, 860, $\gamma_2$, may be defined by the orientation of the reflection surface opening shift 857, $\Delta\vec{p}_S$ with respect to opening reference 875, $\vec{n}^A$. For example, opening reference 875, $\vec{n}^A$, may be a projection of an $\hat{x}$-axis 877 onto ray pair reflection surface 870, $S^{Refl}$. Thus, opening azimuth angle, 860, $\gamma_2$, may be the (e.g., signed) angle between opening reference 875, $\vec{n}^A$, and the projection of the opening shift 855, $\Delta\vec{p}$, onto the ray pair reflection surface 870, $S^{Refl}$, for example, reflection surface opening shift 857, $\Delta\vec{p}_S$. Other angles, vectors, geometries, coordinate systems, or formulae may be used.

Ray Pair Normal

Embodiments of the present invention may describe a ray pair normal, $\vec{n}^{Rays}$, for example, ray pair normal 815, described in reference to FIGS. 13, 14, 16, and 17. Embodiments of the present invention may provide a mechanism for inputting parameters in the global frame, for example, including $\vec{p}^{in}, \vec{p}^{re}, \theta_{axis}, \phi_{axis}$, Thomsen parameters, $\delta$ and $\epsilon$, and outputting a ray pair normal, $\vec{n}^{Rays}$, in a local frame. In some embodiments, $\vec{p}^{in}$ and $\vec{p}^{re}$, the directions of phase velocities of incident and reflected rays of a ray pair, respectively, may have unit length. In some embodiments, a TTI medium may be used. For example, a zenith (e.g., dip) angle, $\theta_{axis}$, and an azimuth angle, $\phi_{axis}$, may define the orientation of a tilted axis of symmetry in the TTI medium. Zenith angles, $\theta_{axis}$, and azimuth angles, $\phi_{axis}$, may be used to describe the orientation of the symmetry axis. For example, parameters $\delta$ and $\epsilon$ may be Thomsen anisotropy parameters. In such embodiments, a ratio, for example, of each of the phase velocities, $V_{phs}^{in}$ and $V_{phs}^{re}$, to a compression velocity parameter, $V_P$, may be used for computing the ray pair normal, $\vec{n}^{Rays}$. Compression velocity parameter, $V_P$, may be, for example, an absolute value of the compression wave velocity in the direction of a tilted axis of symmetry. Although the compression velocity parameter $V_P$ (e.g., along with the two Thomsen parameters) is typically used for computing compression wave, according to embodiments of the invention, compression waves may be computed without using the compression velocity parameter $V_P$. In some embodiments, compression waves may be computed using ratios of phase velocities, $V_{phs}^{in}$ and $V_{phs}^{re}$, to compression velocity parameter $V_P$, without using the parameter $V_P$, itself. Such ratios may, for example, be calculated using the geometry of ray reflections and the Thomsen parameters.

Reference is again made to FIGS. 13, 14, 16, and 17. In some embodiments, an incident ray SM 713 and reflected ray RM 717 that have substantially the same reflection point 720, M, may emerge from a source point 723, S, and a receiver point 727, R, respectively, as described in reference to FIG. 13. In some embodiments, a reflection normal, $\vec{n}^B$, may have an inward direction (e.g., an inward normal) oriented towards a subsurface body. In embodiments described in reference to FIGS. 13, 16 and 17, reflection normal $\vec{n}^B$, 735 and 835, respectively, may have outward direction (e.g., outward normal), emerging from a reflection surface (e.g., ray pair reflection surface 870, $S^{Refl}$).

Using Snell's law, (e.g., in a general anisotropic model) the direction of ray pair normal, $\vec{n}^{Rays}$, may be determined, for example, using the following equation:

$$(\vec{S}^{in} + \vec{S}^{re}) \times \vec{n}^{Rays} = 0, \quad (105)$$

where $\vec{S}^{in}$ and $\vec{S}^{re}$ may be slowness vectors of incident ray SM and reflected ray RM, respectively, for example, defined by:

$$\vec{S}^{in} = \frac{\vec{p}^{in}}{V_{phs}^{in}}, \vec{S}^{re} = \frac{\vec{p}^{re}}{V_{phs}^{re}}, \quad (106)$$

and $V_{phs}^{in}$, $V_{phs}^{re}$ may be absolute values of the incident and reflected phase velocities, respectively.

Equation (105) provides collinear co-factors, $(\vec{S}^{in} + \vec{S}^{re})$ and $\vec{n}^{Rays}$, for example, in the same or opposite directions, when $(\vec{S}^{in} + \vec{S}^{re})$ and $\vec{n}^{Rays}$ are nonzero. For example:

$$\vec{n}^{Rays} = \alpha(\vec{S}^{in} + \vec{S}^{re}), \text{ where } \alpha \text{ may be a scalar value.} \quad (107)$$

In some embodiments, $\alpha = V_P$ where $V_P$ may be a compression velocity parameter of the compression wave in a general anisotropy model (e.g., not necessarily a TTI model). Thus, by equation (107), ray pair normal $\vec{n}^{Rays}$ may have no units. For example:

$$\vec{n}^{Rays} = \frac{V_P}{V_{phs}^{in}} \cdot \vec{p}^{in} + \frac{V_P}{V_{phs}^{re}} \cdot \vec{p}^{re}, \quad (108)$$

where a ratio of phase velocities $V_{phs}$, (e.g., $V_{phs}^{in}$ and $V_{phs}^{re}$) to the vertical compression velocity, $V_P$, may be given for example, by:

$$\frac{V_{phs}^2}{V_P^2} = \frac{1+f}{2} + \varepsilon \sin^2\theta_{phs} + \frac{1}{2}\sqrt{(1-f+2\varepsilon\sin^2\theta_{phs})^2 - 2(\varepsilon-\delta)(1-f)\sin^2 2\theta_{phs}}, \quad (109)$$

where $$f = V_S^2/V_P^2, \quad (110)$$

$V_S$ may be a velocity of the shear wave in the direction of an axis of symmetry, and angle $\theta_{phs}$ may be an angle between the directions of the phase velocity and the axis of symmetry, for example, $f = \frac{1}{4}$ or any other suitable value.

In some embodiments, when a TTI model having a vertical axis of symmetry (e.g., a vertical transverse isotropic (VTI) model), angle $\theta_{phs}$ becomes a zenith or dip angle of the phase velocity, (e.g., an angle between the directions of a phase velocity and a vertical axis). In some embodiments, the ray pair normal vector, $\vec{n}^{Rays}$, may be normalized, for example, to have unit length.

Figure 18:
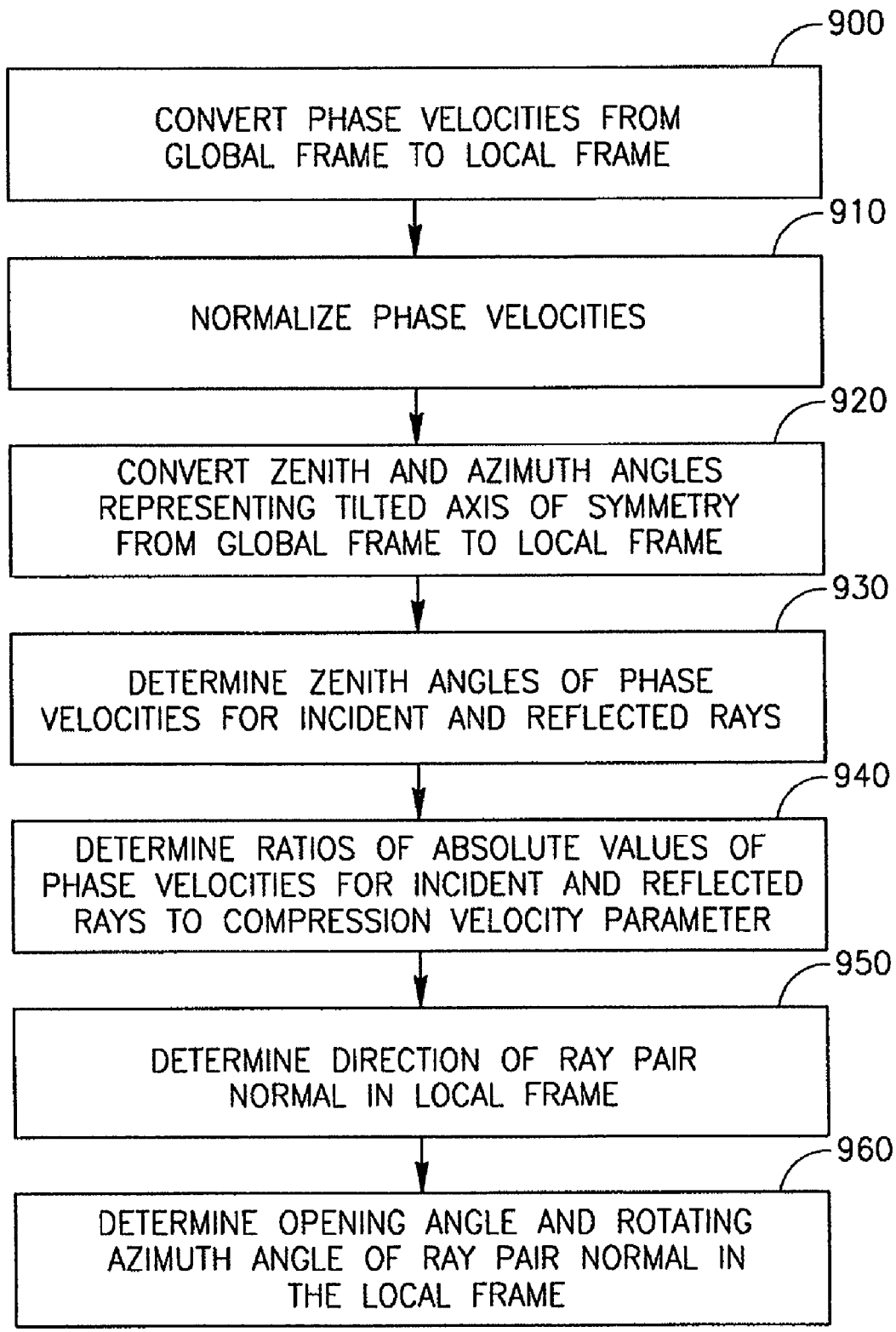
FIG. 18 is a flow diagram of a method for generating four components of the LAD according to an embodiment of the present invention.

Reference is made to FIG. 18, which is a flow diagram of a method for generating four components of the LAD according to an embodiment of the present invention. The embodiment shown in FIG. 18, and the other methods shown herein, may be carried out for example by the system shown in FIG. 1, but of course other systems may be used to carry out the methods described herein.

For example, a mechanism for generating a ray pair normal, $\vec{n}^{Rays}$, in a local frame, using parameters in the global frame, for example, including $\vec{p}^{in}$, $\vec{p}^{re}$, $\theta_{axis}$, $\phi_{axis}$, $\delta$, and $\varepsilon$, may proceed as follows:

In operation 900, the directions of phase velocities, $\vec{p}^{in}$ and $\vec{p}^{re}$, for example, of incident and reflected rays, respectively, may be converted from the global frame to the local frame, for example, according to for example the following equations:

$$\vec{p}_{loc}^{in} = A^T \vec{p}_{glob}^{in} \text{ and } \vec{p}_{loc}^{re} = A^T \vec{p}_{glob}^{re}, \quad (111)$$

where the rotation matrix A may be defined, for example, by equation (102), or according to embodiments described in the section entitled, "Relationships between Local and Global Frames", in reference to FIGS. 14 and 15. $A^T$ may be the transpose matrix of A. Directions of phase velocities, $\vec{p}^{in}$ and $\vec{p}^{re}$, may be defined according to embodiments of vectors 845, $\vec{p}^{in}$, and 847, $\vec{p}^{re}$, respectively, described in reference to FIG. 17.

In operation 910, vectors representing the direction of phase velocities, $\vec{p}^{in}$ and $\vec{p}^{re}$, may be normalized, for example, to have unit length. For example:

$$|\vec{p}_{glob}^{in}| = 1 \text{ and } |\vec{p}_{glob}^{re}| = 1. \quad (112)$$

In operation 920, a tilted axis of symmetry, for example, in a TTI model or a zenith angle, $\theta_{axis}$, and azimuth angle, $\phi_{axis}$, for example, representing an orientation of the tilted axis of symmetry, may be converted from the global frame to the local frame.

The tilted axis of symmetry may be represented in the global frame (e.g., in a Cartesian coordinate system), for example, by:

$$n_{xglob}^{axis} = \sin\theta_{axis}\cos\phi_{axis}, n_{yglob}^{axis} = \sin\theta_{axis}\sin\phi_{axis}, n_{zglob}^{axis} = \cos\theta_{axis}. \quad (113)$$

In some embodiments, converting the tilted axis of symmetry from the global frame to the local frame may include converting from the dual-angle representation in the global frame to a Cartesian coordinate system in the global frame, (e.g., as defined by equation (113)) and then converting from the Cartesian coordinate system in the global frame to the local frame, for example, according to the following equation:

$$\vec{n}_{loc}^{axis} = A^T \vec{n}_{glob}^{in}, \quad (114)$$

according to, for example, embodiments described in the section entitled, "Relationships between Local and Global Frames", in reference to FIG. 14, or by other methods.

In operation 930, the phase velocity dips, including $\theta_{phs}^{in}$ and $\theta_{phs}^{re}$, for the incident ray SM and reflected ray RM, respectively, may be determined, for example, with respect to the tilted axis of symmetry, converted in operation 920. In some embodiments, vectors $\vec{n}_{loc}^{axis}$, $\vec{p}_{loc}^{in}$ and $\vec{p}_{loc}^{re}$ may be normalized to have unit length, and zenith angles $\theta_{phs}^{in}$ and $\theta_{phs}^{re}$ for phase velocity $\vec{p}^{in}$ and $\vec{p}^{re}$ respectively, may be, for example:

$$\theta_{phs}^{in}=\arccos(\vec{n}_{loc}^{axis}\cdot\vec{p}_{loc}^{in}),\ \theta_{phs}^{re}=\arccos(\vec{n}_{loc}^{axis}\cdot\vec{p}_{loc}^{re}). \quad (115)$$

It may be noted that scalar products, for example, $\vec{n}_{loc}^{axis}\cdot\vec{p}_{loc}^{in}$ and $\vec{n}_{loc}^{axis}\cdot\vec{p}_{loc}^{re}$ may be invariant under transformation of rotations between the local and global frames. Thus, equation (115) may be equivalent, for example, to the following.

$$\theta_{phs}^{in}=\arccos(\vec{n}_{glob}^{axis}\cdot\vec{p}_{glob}^{in}),\ \theta_{phs}^{re}=\arccos(\vec{n}_{glob}^{axis}\cdot\vec{p}_{glob}^{re}). \quad (116)$$

In operation 940, using equation (109), ratios $\beta^{in}$ and $\beta^{re}$, e.g., ratios of absolute values of phase velocities to a compression velocity parameter, $V_P$, for the incident and reflected rays, respectively, may be determined, for example, by $$\beta^{in} \equiv \frac{V_{phs}^{in}}{V_P},\ \beta^{re} \equiv \frac{V_{phs}^{re}}{V_P},\ \text{respectively.} \quad (117)$$

In operation 950, Snell's law may be used, (e.g., in a general anisotropic model) and the direction of ray pair normal $\vec{n}^{Rays}$, represented in the local frame (e.g., in a Cartesian coordinate system), may be determined, for example, by:

$$\vec{n}^{Rays} = \frac{\vec{p}^{in}}{\beta^{in}} + \frac{\vec{p}^{re}}{\beta^{re}}. \quad (118)$$

In some embodiments, ray pair normal $\vec{n}^{Rays}$ may be normalized, for example, to have unit length. For example:

$$|\vec{n}_{Rays}|=1. \quad (119)$$

In operation 960, opening angle $\gamma_1$ and rotating azimuth angle $\gamma_2$ represented in the local frame may be determined, for example, using coordinates of the ray-pair normal in the local frame determined in operation 950. Opening angle $\gamma_1$ and rotating azimuth angle $\gamma_2$ may represent the mutual orientation of the incident and the reflected rays in a ray pair, and may be used according to embodiments of opening angle 850, $\gamma_1$, and opening azimuth angle 860, $\gamma_2$, as described in the section entitled, "Local Angle Domain—Enhancements", in reference to FIGS. 16 and 17. Other suitable formulae or series of formulae may be used.

Other operations or series of operations may be used.

Opening Angle

In some embodiments of the present invention, an opening angle, $\gamma_1$, may include, for example, an angle between phase velocities, $\vec{p}^{in}$ and $\vec{p}^{re}$, of incident and reflected rays, respectively. The directions of phase velocities $\vec{p}^{in}$ and $\vec{p}^{re}$, may be normalized, for example, to have unit length. Thus, a scalar product of the phase velocities, $\vec{p}_{loc}^{in}\cdot\vec{p}_{loc}^{re}$, may be the cosine of opening angle $\gamma_1$. Since scalar products may be invariant under rotational transformations between the local and global frames, opening angle $\gamma_1$, may be defined, for example, as:

$$\gamma_1=\arccos(\vec{p}_{loc}^{in}\cdot\vec{p}_{loc}^{re})=\arccos(\vec{p}_{glob}^{in}\cdot\vec{p}_{glob}^{re}). \quad (120)$$

It may be noted that, when an anisotropic medium is used, the ray pair normal $\vec{n}^{Rays}$, the directions of phase velocities $\vec{p}^{in}$ and $\vec{p}^{re}$, and ray velocities of incident and reflected rays, respectively, may lie in the same ray pair plane, but the respective angles $\alpha^{in}$ (e.g., the incident angle) and $\alpha^{re}$ (e.g., the reflected angle) thereof are typically not equivalent. For example, an angle $\alpha^{in}$ between $\vec{p}^{in}$ and $\vec{n}^{Rays}$ and an angle $\alpha^{re}$ between $\vec{p}^{re}$ and $\vec{n}^{Rays}$, may be different. For example, one of the angles may be greater than a half-opening angle $\gamma_1/2$, and the other may be less than the half-opening angle $\gamma_1/2$.

Opening Reference (Zero Opening Azimuth)

Embodiments of the present invention may describe opening azimuth angles, $\gamma_2$, which may represent an orientation of reflection surface opening shift, $\Delta\vec{p}_S$, for example, a projection of the opening shift, $\Delta\vec{p}=\vec{p}_{re}-\vec{p}^{in}$, on a ray pair reflection surface $S^{Refl}$, as described in reference to FIGS. 16 and 17. In some embodiments, a zero azimuth in a ray pair reflection surface, $S^{Refl}$, referred to as an opening reference, $\vec{n}^A$, may be used to define the opening azimuth angles, $\gamma_2$. For example, the rotating reference $\vec{n}^A$, may be a projection of an $\hat{x}$-axis onto the ray pair reflection surface $S^{Refl}$. Thus, the opening azimuth angle, $\gamma_2$, may be the (e.g., signed) angle between opening reference $\vec{n}^A$ and a projection of the opening shift, $\Delta\vec{p}$, for example, the reflection surface opening shift, $\Delta\vec{p}_S$. The vector $\Delta\vec{p}$ may be the opening shift itself and the vector $\Delta\vec{p}_S$ may be the projection of the opening shift onto the reflection plane. The ray pair reflection surface $S^{Refl}$ may be a surface normal to the ray pair normal $\vec{n}^{Rays}$, defined (e.g., in a Cartesian coordinate system), as described in the section entitled, "Ray Pair Normal". In some embodiments, the ray pair normal, $\vec{n}^{Rays}$, may be normalized, for example, to have unit length. The opening reference, $\vec{n}^A$, positioned in the ray pair reflection surface $S^{Refl}$, may be described in more detail in the section entitled, "Projection of a Vector onto a Plane". In one demonstrative embodiment, for example, components of the local x axis in a local frame of reference may include, for example:

$$A_x=1,\ A_y,A_z=0. \quad (121)$$

Thus, the opening reference, $\vec{n}^A$, may be defined for example, in the local frame, as:

$$\vec{n}^A=\{1-(n_x^{Rays})^2,-n_x^{Rays}n_y^{Rays},-n_x^{Rays}n_z^{Rays}\}, \quad (122)$$

where the opening reference, $\vec{n}^A$, may be a projection of the inline direction (e.g., the direction of the $\hat{x}$-axis) on the ray pair reflection surface $S^{Refl}$. Thus, the opening reference, $\vec{n}^A$, may have a length defined by, for example:

$$|\vec{n}^A| = \sqrt{\left(n_y^{Rays}\right)^2 + \left(n_z^{Rays}\right)^2} \quad (123)$$

In some embodiments, when $n_x^{Rays}=1$, $n_y^{Rays}=n_z^{Rays}=0$, and $|\vec{n}^A|$ may be a nonzero number. In some embodiments, opening reference $\vec{n}^A$, may be normalized, for example, to have unit length. Thus, opening reference $\vec{n}^A$, may be defined for example, in the local frame, as:

$$\vec{n}^A = \left\{ \sqrt{\left(n_y^{Rays}\right)^2 + \left(n_z^{Rays}\right)^2}, \right. \tag{124}$$

$$\left. -\frac{n_x^{Rays} n_y^{Rays}}{\sqrt{\left(n_y^{Rays}\right)^2 + \left(n_z^{Rays}\right)^2}}, -\frac{n_x^{Rays} n_z^{Rays}}{\sqrt{\left(n_y^{Rays}\right)^2 + \left(n_z^{Rays}\right)^2}} \right\},$$

where components of ray pair normal $\vec{n}^{Rays}$, may be represented for example, in the local plane.

In some embodiments, the ray pair reflection surface $S^{Refl}$ may substantially coincide with a $\hat{y}\hat{z}$ plane. In such embodiments, the projection of the inline direction (e.g., the direction of the $\hat{x}$-axis) on the ray pair reflection surface $S^{Refl}$ may be approximately zero and thus, the opening reference, $\vec{n}^A=0$, when the ray pair reflection surface $S^{Refl}$ substantially coincides with a $\hat{y}\hat{z}$ plane. In such embodiments, the opening reference, $\vec{n}^A$, may be redefined as a projection of a $\hat{y}$ axis on the ray pair reflection surface $S^{Refl}$, which may only be approximately zero when the ray pair reflection surface $S^{Refl}$ substantially coincides with a $\hat{x}\hat{z}$ plane. Since the ray pair reflection surface $S^{Refl}$ typically does not substantially coincide with both the $\hat{y}\hat{z}$ and the $\hat{x}\hat{z}$ planes, the appropriate definition may be selected so that, $\vec{n}^A \neq 0$.

Other formulae or series of formulae may be used.

Opening Azimuth

Embodiments of the present invention may describe opening azimuth angles $\gamma_2$ for example, of a reflection surface component of the opening shift, $\Delta \vec{p}_S$ (e.g., which may also be referred to as a reflection surface opening shift), with respect to a opening reference $\vec{n}^A$, for example, in ray pair reflection surface $S^{Refl}$, as described in reference to FIG. 17. In some embodiments the opening azimuth angles $\gamma_2$ may be defined as the (e.g., signed) angle between the reflection surface opening shift, $\Delta \vec{p}_S$, and the opening reference, $\vec{n}^A$. In some embodiments, the sign of the opening azimuth angles $\gamma_2$, for example, may be positive when the rotation from the opening reference $\vec{n}^A$ to the reflection surface opening shift, $\Delta \vec{p}_S$, is clockwise, for example, when viewed "from the arrow" of the direction of the ray pair normal $\vec{n}^{Rays}$ on the ray pair reflection surface $S^{Refl}$. In some embodiments, the reflection surface opening shift, $\Delta \vec{p}_S$, and the opening reference, $\vec{n}^A$, may be in a ray pair reflection surface $S^{Refl}$, as described in reference to FIGS. 16 and 17. In a demonstrative embodiment, the reflection surface opening shift, $\Delta \vec{p}_S$, may be, for example:

$$\Delta \vec{p}_S = \Delta \vec{p} = \Delta \vec{p}_n = \Delta \vec{p} - (\Delta \vec{p} \cdot \vec{n}^{Rays}) \cdot \vec{n}^{Rays} \text{ where } \Delta \vec{p} = \vec{p}^{re} - \vec{p}^{in}, \tag{125}$$

as described in equation (104).

In some embodiments, when phase velocities $\vec{p}^{in}$ and $\vec{p}^{re}$, coincide, an opening shift, $\Delta \vec{p}$, and a projection thereof, for example, projection $\Delta \vec{p}_S$ on the ray pair reflection plane, (e.g., the reflection surface opening shift, $\Delta \vec{p}_S$) may be negligible, may be approximately zero, or may vanish. In embodiments described herein, the opening angle may be zero, and the opening azimuth angle may be undefined and typically does not affect other parameters.

In one embodiment, each of the reflection surface opening shift $\Delta \vec{p}_S$, the ray pair normal $\vec{n}^{Rays}$ to the ray pair reflection surface $S^{Refl}$, and the rotating reference $\vec{n}^A$, may be normalized, for example, to have unit length. For example:

$$|\vec{n}^{Rays}|=1, |\Delta \vec{p}_S|=1, |\vec{n}^A|=1. \tag{126}$$

In such embodiments, the reflection surface opening shift, $\Delta \vec{p}_S$, for example, defined by equation (125) may provide the absolute value of the sine of the rotating azimuth angle $\gamma_2$. For example:

$$|\sin \gamma_2| = |\vec{n}^A \times \Delta \vec{p}_S| \tag{127}$$

In some embodiments, the cross-product, for example, defined by equation (127) may either have a direction that is the same as, or opposite to, the direction of a ray pair normal $\vec{n}^{Rays}$ to the ray pair reflection surface, $S^{Refl}$, (e.g., ray-pair normal $\vec{n}^{Rays}$ described in reference to FIGS. 16 and 17). Therefore, the rotating azimuth angle, $\gamma_2$, may be defined by, for example:

$$\sin \gamma_2 = \vec{n}^A \times \Delta \vec{p}_S \cdot \vec{n}^{Rays} \tag{128}$$

For example, expanding the mixed product on the right-hand side of equation (128), may give:

$$\sin \gamma_2 = n_y^A \Delta p_{S,z} n_x^{Rays} + n_z^A \Delta p_{S,x} n_y^{Rays} + n_x^A \Delta p_{S,y} n_z^{Rays} - \\ n_z^A \Delta p_{S,y} n_x^{Rays} - n_x^A \Delta p_{S,z} n_y^{Rays} - n_y^A \Delta p_{S,x} n_z^{Rays} \tag{129}$$

In such embodiments, the cosine of the opening azimuth angle $\gamma_2$, may be defined, for example, by:

$$\cos \gamma_2 = \vec{n}^A \cdot \Delta \vec{p}_S = n_x^A \cdot \Delta p_{S,x} + n_y^A \cdot \Delta p_{S,y} + n_z^A \cdot \Delta p_{S,z} \tag{130}$$

Thus, the sine and the cosine of the opening azimuth angle $\gamma_2$, may be defined, for example, according to equations (129) and (130), and the opening azimuth angle may be established in a range of $-\pi < \gamma_2 \leq \pi$. Other formulae or series of formulae may be used.

Projection of a Vector onto a Plane

Embodiments of the present invention may describe a projection of an arbitrary vector $\vec{A}$ onto a plane P, for example, where the plane P, may be defined for example by a normal component thereof, $\vec{n}$. For example, such embodiments may be used to determine the component of the opening shift $\Delta \vec{p}$, in the ray pair reflection surface, $S^{Refl}$, for example, discussed in reference to FIGS. 16 and 17. In some embodiments, when the vector $\vec{A}$ lies in the plane, P, the projection of vector $\vec{A}$, onto plane P, may be equivalent to vector $\vec{A}$, itself. In other embodiments, when vector $\vec{A}$ lies outside of the plane, this projection may be determined as follows.

In one embodiment, the normal, $\vec{n}$, to the plane, P, may be normalized, for example, to have unit length $|\vec{n}|=1$. Vector $\vec{A}$ may have any suitable length.

In one embodiment, the projection of vector $\vec{A}$ onto a plane, P, with normal vector $\vec{n}$, may, for example, be defined by a difference between vector $\vec{A}$ and a projection, $\vec{A}_n$, of vector $\vec{A}$ onto vector $\vec{n}$. The projection of vector $\vec{A}$ on the direction $\vec{n}$ may be given, for example, by:

$$l = \vec{n} \cdot \vec{A}. \tag{131}$$

Thus, the projection $\vec{A}_t$ of vector $\vec{A}$ onto a plane, P, may be, for example:

$$\vec{A}_t = \vec{A} - \vec{A}_n, \text{ where} \tag{132}$$

$$l = \vec{n} \cdot \vec{A} \text{ and}$$

$$\vec{A}_n = l \cdot \vec{n} = \begin{Bmatrix} n_x^2 A_x + n_x n_y A_y + n_x n_z A_z \\ n_x n_y A_x + n_y^2 A_y + n_y n_z A_z \\ n_x n_z A_x + n_y n_z A_y + n_z^2 A_z \end{Bmatrix}.$$

Thus the projection of vector $\vec{A}$ onto a plane, P, may be, for example:

$$\vec{A}_t = \begin{Bmatrix} A_x(n_y^2 + n_z^2) - n_x n_y A_y - n_x n_z A_z \\ -n_x n_y A_x + A_y(n_x^2 + n_z^2) - n_y n_z A_z \\ -n_x n_z A_x - n_y n_z A_y + A_z(n_x^2 + n_y^2) \end{Bmatrix}. \tag{133}$$

Other formulae or series of formulae may be used.

In some embodiments, vectors $\vec{A}_n$ and $\vec{n}$ are collinear. In such embodiments, when the sign of $\vec{A}_t = \vec{A} - \vec{A}_n$ is positive, the two collinear vectors $\vec{A}_n$ and $\vec{n}$ have the same direction, and when the sign of $\vec{A}_t = \vec{A} - \vec{A}_n$ is negative, the two vectors $\vec{A}_n$ and $\vec{n}$ have opposite directions.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method comprising:
   accepting a plurality of coordinates representing a data point in a first coordinate system;
   mapping with a processor in a computing system two of the plurality of coordinates to a single coordinate in a second coordinate system, wherein the second coordinate system is constrained by a parameterization that defines a relationship between two coordinates in two dimensions of the first coordinate system such that values of the two coordinates in two dimensions of the first coordinate system simultaneously vary along one dimension of the second coordinate system according to the relationship; and
   on a display, generating an image of the data point by processing data including the single coordinate representing the data point in the second coordinate system;
   wherein the second coordinate system has a spiraling geometry defined by nodes.

2. The method of claim 1, wherein mapping comprises applying a function to the plurality of coordinates in the first coordinate system, wherein the function is continuous and one-to-one.

3. The method of claim 1, wherein the single coordinate in the second coordinate system defines a location at a node along an arc length of a spiraling geometry.

4. The method of claim 3, wherein there is substantially equal distance along the arc length of the spiraling geometry between successive nodes.

5. The method of claim 1, wherein the single coordinate in the second coordinate system is associated with an area swept by an arc of the spiraling geometry between successive nodes.

6. The method of claim 1, wherein the dimensionality of the second coordinate system is less than that of the first coordinate system by an integer value.

7. The method of claim 1, wherein a volume of data in the first coordinate system required for generating an image of a specific resolution is greater than a volume of data in the second coordinate system required for generating an image of the same resolution by a factor of about ten.

8. The method of claim 1, wherein the data point is represented by two coordinates in the first coordinate system and the data point is represented by one coordinate in the second coordinate system.

9. The method of claim 1, wherein the data point is represented by coordinate values at nodes positioned along a line of the spiraling geometry of the second coordinate system.

10. The method of claim 9, wherein the plurality of coordinates in the first coordinate system positioned within a curved surface are two dimensional and the single coordinate positioned along the length of the spiraling geometry in the second coordinate system is one dimensional.

11. The method of claim 1, wherein the data point represents a ray pair.

12. The method of claim 11, wherein the plurality of coordinates representing the data point in the first coordinate system comprises a dual dimensional directional angle or a dual dimensional reflection angle.

13. The method of claim 1, wherein the second coordinate system has a lower dimension than the first coordinate system, and wherein two independent coordinates in the first coordinate system are represented by a single coordinate in the second coordinate system.

14. The method of claim 1, wherein the first coordinate system is a Cartesian coordinate system.

15. The method of claim 1, wherein the first coordinate system is a polar coordinate system.

16. The method of claim 1, wherein the spiraling geometry of the second coordinate system is uniform and spherical.

17. The method of claim 1, wherein the spiraling geometry of the second coordinate system is uniform and ellipsoidal.

18. The method of claim 1, wherein the data point is seismic data.

19. The method of claim 1, wherein the data point is seismic model data.

20. The method of claim 1, wherein the data point is seismic image data.

21. The method of claim 1, wherein the data point is selected by a user.

22. The method of claim 1, wherein the data point is selected by an automated mechanism.

23. A method for imaging a set of data, the method comprising:
   accepting a plurality of variables representing the set of data in a first coordinate system;

converting, with a processor in a computing system, the plurality of variables from the first coordinate system to a second coordinate system, wherein the dimension of the first coordinate system is greater than the dimension of the second coordinate system, wherein the second coordinate system is constrained by a parameterization that defines a relationship between at least a pair of two independent variables of the first coordinate system, and wherein each pair of variables in the first coordinate system that is defined by a relationship in the second coordinate system is represented by a single variable in the second coordinate system; and on a display, generating an image of the set of data by processing the converted set of variables in the second coordinate system;

wherein an integration with respect to one variable in the second coordinate system represents an integration with respect to two variables in the first coordinate system.

24. The method of claim 23, wherein each pair of variables in the first coordinate system vary simultaneously along one dimension of the second coordinate system.

25. The method of claim 23, wherein converting comprises mapping each pair of two variables in an n-dimensional space to a single variable in an m-dimensional space using a map, wherein n is greater than m.

26. The method of claim 25, wherein the mapping uses a continuous and one-to-one function.

27. A method for imaging a set of data points, the method comprising:
accepting a plurality of coordinates in a first coordinate system representing each data point in the set of data points;
mapping with a processor in a computing system two or more of the plurality of coordinates in the first coordinate system to a single coordinate in a second coordinate system, wherein the second coordinate system has a spiraling geometry, wherein the shape of the spiraling geometry is constrained to define a relationship between the two or more coordinates of the first coordinate system, in which a change along a line of the spiraling geometry in one dimension of the second coordinate system simultaneously represents changes in values of each of the two or more coordinates along two or more respective dimensions in the first coordinate system according to the relationship; and
on a display, generating an image of the set of data points using values of the single coordinate in the second coordinate system to represent the data points.

28. The method of claim 27, wherein the spiraling geometry conforms to the shape of a continuous three-dimensional surface.

29. The method of claim 27, wherein the spiraling geometry includes a substantially spherical shape.

30. The method of claim 27, wherein the set of data points includes seismic data.

31. The method of claim 27, wherein the change in one dimension corresponds to a change in the location along the spiral line in the second coordinate system, and the changes along the two or more respective dimensions in the first coordinate system span a—surface of two or more dimensions in the first coordinate system.

32. The method of claim 27, wherein the first coordinate system is a Cartesian coordinate system and wherein the change along the spiral line of the spiraling geometry of the second coordinate system simultaneously represents linear changes in two or more respective perpendicular axes of the Cartesian coordinate system.

33. The method of claim 27, wherein the first coordinate system is a polar coordinate system and wherein the change along the spiral line of the spiraling geometry of the second coordinate system simultaneously represents distance and angle changes in two or more respective dimensions of the polar coordinate system.

34. The method of claim 27, wherein the set of data points represents electromagnetic waves.

35. The method of claim 27, wherein the set of data points represents medical imaging data.

36. A system for imaging data comprising:
a receiver to record a set of data points;
a processor in a computing system to represent a data point in the set of data points by a plurality of coordinates in a first coordinate system and to map two of the plurality of coordinates in a first coordinate system to a single coordinate in a second coordinate system, wherein the second coordinate system is constrained by a parameterization that defines a relationship between two coordinates in two dimensions of the first coordinate system such that values of the two coordinates in two dimensions of the first coordinate system simultaneously vary along one dimension of the second coordinate system according to the relationship; and
a display to visualize an image of the set of data points generated using the single coordinate in the second coordinate system representing the data point;
wherein the second coordinate system has a spiraling geometry defined by nodes.

37. The system of claim 36, wherein the processor maps the plurality of coordinates in a first coordinate system using a transformation operator that is a continuous and one-to-one function.

38. The system of claim 36, wherein the data in the second coordinate system is parameterized by the nodes along an arc having a spiraling geometry.

39. The system of claim 38, wherein there is substantially equal distance along the arc length of the spiraling geometry between successive nodes.

40. The system of claim 38, wherein the single coordinate in the second coordinate system is associated with an area swept by an arc of the spiraling geometry between successive nodes.

41. The system of claim 36, wherein the processor converts coordinate systems from a first coordinate system to a second coordinate system, the second coordinate system having a lower dimension than that of the first coordinate system.

42. The system of claim 41, wherein the first coordinate system is a Cartesian coordinate system.

43. The system of claim 41, wherein the first coordinate system is a polar coordinate system.

44. The system of claim 41,
wherein the spiraling geometry of the second coordinate system is uniform and spherical.

45. The method of claim 1, wherein the second coordinate system has a planar spiraling geometry.

46. The method of claim 45, wherein two independent coordinates of offset distance and azimuth angle in the first coordinate system vary simultaneously along one dimension of the second coordinate system.

47. The method of claim 46, wherein the offset distance varies monotonically with the azimuth angle in the second coordinate system.

* * * * *